United States Patent
Tajima

(10) Patent No.: US 10,118,973 B2
(45) Date of Patent: Nov. 6, 2018

(54) MODIFIED CONJUGATED DIENE POLYMER, AND POLYMER COMPOSITION CONTAINING SAID POLYMER

(71) Applicant: SUMITOMO CHEMICAL COMPANY, LIMITED, Tokyo (JP)

(72) Inventor: Koichiro Tajima, Pittsburgh, PA (US)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/539,011

(22) PCT Filed: Dec. 24, 2015

(86) PCT No.: PCT/JP2015/086064
§ 371 (c)(1),
(2) Date: Jun. 22, 2017

(87) PCT Pub. No.: WO2016/104628
PCT Pub. Date: Jun. 30, 2016

(65) Prior Publication Data
US 2017/0369599 A1    Dec. 28, 2017

(30) Foreign Application Priority Data
Dec. 25, 2014 (JP) .................................. 2014-261998

(51) Int. Cl.
| C08C 19/25 | (2006.01) |
| C08F 36/14 | (2006.01) |
| C08L 15/00 | (2006.01) |
| C08F 36/02 | (2006.01) |

(52) U.S. Cl.
CPC .............. C08C 19/25 (2013.01); C08F 36/02 (2013.01); C08L 15/00 (2013.01)

(58) Field of Classification Search
CPC .................................................. C08C 19/25
See application file for complete search history.

(56) References Cited

U.S. PATENT DOCUMENTS

| 4,957,976 A * | 9/1990 | Takao ..................... C08C 19/42 |
| | | 525/102 |
| 8,367,765 B2 * | 2/2013 | Ito ......................... C08F 236/10 |
| | | 524/547 |
| 2005/0203251 A1 * | 9/2005 | Oshima ................... C08C 19/44 |
| | | 525/192 |
| 2010/0016499 A1 * | 1/2010 | Oshima ................... C08C 19/25 |
| | | 524/547 |
| 2011/0146877 A1 | 6/2011 | Tanaka et al. |
| 2012/0041136 A1 * | 2/2012 | Ito ........................... C08C 19/25 |
| | | 524/547 |
| 2012/0252966 A1 * | 10/2012 | Ito ........................... C08C 19/25 |
| | | 524/575 |
| 2013/0310512 A1 | 11/2013 | Imoto et al. |
| 2014/0011910 A1 | 1/2014 | Mabuchi et al. |
| 2014/0296459 A1 * | 10/2014 | Tajima .................. C08F 236/10 |
| | | 526/175 |
| 2015/0376321 A1 | 12/2015 | Lee et al. |

FOREIGN PATENT DOCUMENTS

| DE | 102014004417 A1 | 10/2014 |
| EP | 2366557 A1 | 9/2011 |
| JP | 63186748 A | 8/1988 |
| JP | 2005290355 A | 10/2005 |
| JP | 2010270212 A | 12/2010 |
| WO | 2009113546 A1 | 9/2009 |
| WO | 2014104169 A1 | 7/2014 |
| WO | 2014175561 A1 | 10/2014 |

OTHER PUBLICATIONS

International Preliminary Report on Patentability issued from the International Bureau in counterpart International Application No. PCT/JP2015/086064, dated Jul. 6, 2017.
International Search Report, issued by International Searching Authority in corresponding International Application No. PCT/JP2015/086064, dated Mar. 29, 2016.
Communication dated Aug. 13, 2018, from the European Patent Office in counterpart European Application No. 15873196.8.

* cited by examiner

Primary Examiner — Vu A Nguyen
(74) Attorney, Agent, or Firm — Sughrue Mion, PLLC

(57) ABSTRACT

There is disclosed a modified conjugated diene polymer including a structural unit derived from a compound represented by formula (1), and a structural unit derived from a conjugated diene.

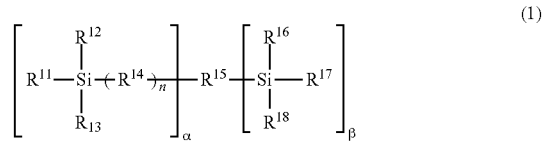

(1)

When n is 0, at least two of $R^{11}$, $R^{12}$, $R^{13}$, $R^{16}$, $R^{17}$ and $R^{18}$ are substituted amino groups, and at least one is a hydroxy group or hydrocarbyloxy group.

5 Claims, No Drawings

MODIFIED CONJUGATED DIENE POLYMER, AND POLYMER COMPOSITION CONTAINING SAID POLYMER

CROSS REFERENCE TO RELATED APPLICATIONS

This application is a National Stage of International Application No. PCT/JP2015/086064 filed Dec. 24, 2015, claiming priority based on Japanese Patent Application No. 2014-261998 filed Dec. 25, 2014, the contents of all of which are incorporated herein by reference in their entirety.

TECHNICAL FIELD

The present invention relates to a modified conjugated diene polymer and to a polymer composition containing the polymer.

BACKGROUND ART

Rubber compositions containing conjugated diene polymers such as polybutadiene and styrene-butadiene copolymers have been used in the prior art as rubber compositions for vehicle tires.

PTL 1 describes a modified rubber composition including a modified conjugated diene-based polymer obtained by reacting a diene-based polymer rubber having an alkali metal end or an alkali metal-added conjugated diene-based rubber, with a specific aminosilane compound having a dialkylamino group, for the purpose of improving the resilient elasticity and the low temperature JIS hardness.

PTL 2 describes a modified polymer rubber obtained by reacting an active polymer having an alkali metal end, with a specific aminosilane compound having a dimethylamino or diethylamino group, and a rubber composition containing the modified polymer rubber, for the purpose of improving the resilient elasticity.

CITATION LIST

Patent Literature

[PTL 1] Japanese Unexamined Patent Publication No. S63-186748
[PTL 2] Japanese Unexamined Patent Publication No. 2005-290355

SUMMARY OF INVENTION

Technical Problem

However, the post-vulcanizing wet grip properties and wear resistance of rubber compositions including the modified conjugated diene polymers described in the aforementioned patent documents have not always been fully satisfactory.

It is an object of the invention to provide a modified conjugated diene polymer from which it is possible to obtain a modified conjugated diene polymer composition that can exhibit excellent wet grip properties and wear resistance after vulcanizing.

Solution to Problem

The invention provides the following.
[1] A modified conjugated diene polymer having a structural unit derived from a compound represented by the following formula (1) and a structural unit derived from a conjugated diene.

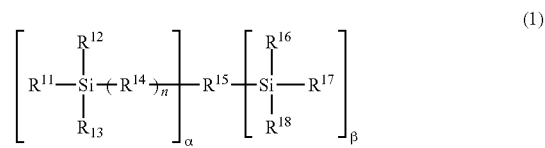

In formula (1),
α and β represent integers such that $1 \leq \alpha \leq 5$, $1 \leq \beta \leq 5$ and $2 \leq \alpha + \beta \leq 6$ are satisfied,
n represents 0 or 1,
(i) when n is 0,
$R^{11}$, $R^{12}$, $R^{13}$, $R^{16}$, $R^{17}$ and $R^{18}$ each independently represent a hydrocarbyl group, substituted amino group, hydroxy group or hydrocarbyloxy group,
from among $R^{11}$, $R^{12}$, $R^{13}$, $R^{16}$, $R^{17}$ and $R^{18}$, at least two are substituted amino groups and at least one is a hydroxy group or hydrocarbyloxy group,
two groups selected from among $R^{11}$, $R^{12}$, $R^{13}$, $R^{16}$, $R^{17}$ and $R^{18}$ are optionally bonded either directly or indirectly at positions where a hydrogen atom has been removed from each group,
$R^{15}$ represents an $(\alpha+\beta)$-valent group resulting from removal of $(\alpha+\beta)$ hydrogen atoms from a hydrocarbon,
(ii) when n is 1,
$R^{11}$, $R^{12}$, $R^{13}$, $R^{16}$, $R^{17}$ and $R^{18}$ each independently represent a hydrocarbyl group, substituted amino group, hydroxy group or hydrocarbyloxy group,
$R^{14}$ represents:
(a) a group resulting from removal of two hydrogen atoms from a hydrocarbon with an amino group or substituted amino group,
(b) a group resulting from removal of two hydrogen atoms from a hydrocarbon with a substituent including a heteroatom other than a nitrogen atom, or
(c) a hydrocarbylene group,
when $R^{14}$ is a group resulting from removal of two hydrogen atoms from a hydrocarbon with an amino group or substituted amino group, from among $R^{11}$, $R^{12}$, $R^{13}$, $R^{16}$, $R^{17}$ and $R^{18}$, at least one is a substituted amino group and at least one is a hydroxy group or hydrocarbyloxy group,
when $R^{14}$ is (b) a group resulting from removal of two hydrogen atoms from a hydrocarbon with a substituent including a heteroatom other than a nitrogen atom, or (c) a hydrocarbylene group, at least two from among $R^{11}$, $R^{12}$, $R^{13}$, $R^{16}$, $R^{17}$ and $R^{18}$ are substituted amino groups, and at least one is a hydroxy group or hydrocarbyloxy group,
at least two groups from among $R^{11}$, $R^{12}$, $R^{13}$, $R^{14}$, $R^{16}$, $R^{17}$ and $R^{18}$ are optionally bonded either directly or indirectly at positions where a hydrogen atom has been removed from each group, and
$R^{15}$ represents an $(\alpha+\beta)$-valent group resulting from removal of $(\alpha+\beta)$ hydrogen atoms from a hydrocarbon.
[2] The modified conjugated diene polymer according to [1], wherein in formula (1), n is 0, α is 1, β is 1 and $R^{15}$ is a hydrocarbylene group of 1 to 20 carbon atoms.
[3] The modified conjugated diene polymer according to [1] or [2], wherein the compound represented by formula (1) is at least one kind of compound selected from the group consisting of 2-(bis(diethylamino)methylsilyl)-1-(dimethoxymethylsilyl)ethane and 2-(bis(diethylamino)methylsilyl)-1-(trimethoxysilyl)ethane.

[4] A modified conjugated diene polymer composition containing the modified conjugated diene polymer according to any one of [1] to [3] and a reinforcing agent, wherein the content of the reinforcing agent is 10 parts by mass or greater and 150 parts by mass or lower, with respect to 100 parts by mass of the modified conjugated diene polymer.

[5] A tire including a modified conjugated diene polymer composition according to [4], or its vulcanizate.

Advantageous Effects of Invention

The present invention can provide a modified conjugated diene polymer from which it is possible to obtain a polymer composition that can exhibit excellent wet grip properties and wear resistance after vulcanizing.

DESCRIPTION OF EMBODIMENTS

Throughout the present specification, "hydrocarbyl group" refers to a monovalent group resulting from removal of one hydrogen atom from a hydrocarbon. The term "hydrocarbylene group" refers to a divalent group resulting from removal of two hydrogen atoms from a hydrocarbon. The term "hydrocarbyloxy group" refers to a monovalent group having a structure in which the hydrogen atom of a hydroxy group is replaced by a hydrocarbyl group. The phrase "amino group with a substituent" (hereunder referred to as "substituted amino group") means a group having a structure in which at least one hydrogen atom of an amino group is replaced by a monovalent atom other than a hydrogen atom, or a monovalent group, and it also includes groups having a structure in which the two hydrogen atoms of an amino group are replaced by a divalent group. The phrase "hydrocarbyl group with a substituent" (hereunder referred to as "substituted hydrocarbyl group") means a monovalent group having a structure in which at least one hydrogen atom of a hydrocarbyl group is replaced by a substituent. The phrase "hydrocarbylene group with a nitrogen atom and/or oxygen atom" means a divalent group having a structure in which a carbon atom of the hydrocarbylene group other than a carbon atom from which a hydrogen atom has been removed, and/or hydrogen atom, is replaced by a group with a nitrogen atom and/or oxygen atom.

The modified conjugated diene polymer of the first embodiment has a structural unit derived from a compound represented by the following formula (1), and a structural unit derived from a conjugated diene (monomer unit). The modified conjugated diene polymer can be obtained, for example, by reacting a conjugated diene polymer having a site with living activity, and a compound represented by the following formula (1). The structural unit derived from a compound represented by formula (1) is a group resulting from removing any one or more groups selected from the group consisting of $R^{11}$, $R^{12}$, $R^{13}$, $R^{16}$, $R^{17}$ and $R^{18}$ from a compound represented by formula (1).

$$\left[ R^{11} - \underset{\underset{R^{13}}{|}}{\overset{\overset{R^{12}}{|}}{Si}} - (R^{14})_n \right]_\alpha - R^{15} - \left[ \underset{\underset{R^{18}}{|}}{\overset{\overset{R^{16}}{|}}{Si}} - R^{17} \right]_\beta \quad (1)$$

In formula (1), $\alpha$ and $\beta$ represent integers such that $1 \leq \alpha \leq 5$, $1 \leq \beta \leq 5$ and $2 \leq \alpha + \beta \leq 6$ are satisfied, and n represents 0 or 1.

(i) when n is 0,
$R^{11}$, $R^{12}$, $R^{13}$, $R^{16}$, $R^{17}$ and $R^{18}$ each independently represent a hydrocarbyl group, substituted amino group, hydroxy group or hydrocarbyloxy group, from among $R^{11}$, $R^{12}$, $R^{13}$, $R^{16}$, $R^{17}$ and $R^{18}$, at least two are substituted amino groups and at least one is a hydroxy group or hydrocarbyloxy group, any two or more groups selected from among $R^{11}$, $R^{12}$, $R^{13}$, $R^{16}$, $R^{17}$ and $R^{18}$ are optionally mutually bonded either directly or indirectly at positions where a hydrogen atom has been removed from each group, and $R^{15}$ represents a group resulting from removal of $(\alpha+\beta)$ hydrogen atoms from a hydrocarbon. The valency of $R^{15}$ is $(\alpha+\beta)$.

(ii) When n is 1,
$R^{11}$, $R^{12}$, $R^{13}$, $R^{16}$, $R^{17}$ and $R^{18}$ each independently represent a hydrocarbyl group, substituted amino group, hydroxy group or hydrocarbyloxy group, $R^{14}$ represents:
(a) a group resulting from removal of two hydrogen atoms from a hydrocarbon with an amino group or substituted amino group,
(b) a group resulting from removal of two hydrogen atoms from a hydrocarbon with a substituent including a heteroatom other than a nitrogen atom, or
(c) a hydrocarbylene group,
when $R^{14}$ is (a) above,
from among $R^{11}$, $R^{12}$, $R^{13}$, $R^{16}$, $R^{17}$ and $R^{18}$, at least one is a substituted amino group and at least one is a hydroxy group or hydrocarbyloxy group, when $R^{14}$ is (b) or (c) above, from among $R^{11}$, $R^{12}$, $R^{13}$, $R^{16}$, $R^{17}$ and $R^{18}$, at least two are substituted amino groups and at least one is a hydroxy group or hydrocarbyloxy group, and at least any two groups from among $R^{11}$, $R^{12}$, $R^{13}$, $R^{14}$, $R^{16}$, $R^{17}$ and $R^{18}$ are optionally mutually bonded either directly or indirectly at positions where a hydrogen atom has been removed from each group, and $R^{15}$ represents a group resulting from removal of $(\alpha+\beta)$ hydrogen atoms from a hydrocarbon. The valency of $R^{15}$ is $(\alpha+\beta)$.

The hydrocarbyl group as $R^{11}$, $R^{12}$, $R^{13}$, $R^{16}$, $R^{17}$ or $R^{18}$ may be a hydrocarbyl group of 1 to 20 carbon atoms. Examples include alkyl groups of 1 to 20 carbon atoms, alkenyl groups of 2 to 20 carbon atoms, alkynyl groups of 2 to 20 carbon atoms, aryl groups of 6 to 20 carbon atoms and aralkyl groups of 7 to 20 carbon atoms. Examples of the alkyl group include methyl, ethyl, n-propyl, isopropyl, n-butyl, sec-butyl, tert-butyl, n-pentyl, n-hexyl, n-octyl, n-dodecyl and cyclopentyl and cyclohexyl groups. Examples of the alkenyl group include vinyl, allyl, 1-propenyl and isopropenyl groups. Examples of the alkynyl group include ethynyl and 2-propynyl groups. Examples of the aryl group include phenyl, ethylphenyl, tolyl and xylyl groups. Examples of the aralkyl group include benzyl groups.

The hydrocarbyl group as $R^{11}$, $R^{12}$, $R^{13}$, $R^{16}$, $R^{17}$ or $R^{18}$ may be an alkyl group, an alkyl group of 1 to 20 carbon atoms or an alkyl group of 1 to 4 carbon atoms.

The substituted amino group as $R^{11}$, $R^{12}$, $R^{13}$, $R^{16}$, $R^{17}$ or $R^{18}$ may be an amino group in which at least one hydrogen atom has been replaced by an alkyl group of 1 to 20 carbon atoms. Examples include dimethylamino, diethylamino, dipropylamino, dibutylamino, dipentylamino, dihexylamino, diheptylamino and dioctylamino groups. The substituted amino group as $R^{11}$, $R^{12}$, $R^{13}$, $R^{16}$, $R^{17}$ or $R^{18}$ may also be an amino group in which one or two hydrogen atoms have been replaced with an alkyl group, an amino group in which one or two hydrogen atoms have been replaced with an alkyl group of 1 to 4 carbon atoms, or an amino group in which two hydrogen atoms have been replaced with an alkyl group of 1 to 4 carbon atoms. Specific examples of the amino group in which two hydrogen atoms have been replaced with an alkyl group of 1 to 4 carbon atoms include dimethylamino, diethylamino, dipropylamino and dibutylamino groups.

The hydrocarbyloxy group as $R^{11}$, $R^{12}$, $R^{13}$, $R^{16}$, $R^{17}$ or $R^{18}$ may be a hydrocarbyloxy group of 1 to 20 carbon atoms. Examples include alkoxy groups of 1 to 20 carbon atoms and aryloxy groups of 6 to 20 carbon atoms. Examples of the alkoxy group include methoxy, ethoxy, n-propoxy, isopropoxy, n-butoxy, sec-butoxy, tert-butoxy, pentyloxy, hexyloxy, heptyloxy and octyloxy groups. Examples of the aryloxy group include phenoxy groups.

The hydrocarbyloxy group as $R^{11}$, $R^{12}$, $R^{13}$, $R^{16}$, $R^{17}$ or $R^{18}$ may be an alkoxy group of 1 to 20 carbon atoms or an alkoxy group of 1 to 4 carbon atoms. Specific examples of the alkoxy group of 1 to 4 carbon atoms include methoxy, ethoxy and propoxy groups.

The "(a) group resulting from removal of two hydrogen atoms from a hydrocarbon with an amino group or substituted amino group" for $R^{14}$ may be a group represented by the following formula (1-1), for example. In formula (1-1), o is an integer of 1 to 4.

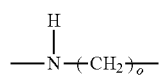

(1-1)

The "(b) group resulting from removal of two hydrogen atoms from a hydrocarbon with a substituent including a heteroatom other than a nitrogen atom" for $R^{14}$ may be a group represented by the following formula (1-2), for example. In formula (1-2), p is an integer of 1 to 4.

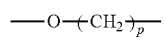

(1-2)

The "(c) hydrocarbylene group" for $R^{14}$ may be a hydrocarbylene group of 1 to 20 carbon atoms. Specific examples include alkylene, alkenediyl and arylene groups, and groups having an arylene and alkylene group which are mutually bonded (hereunder referred to collectively as "arylene-alkylene groups"). Examples of the alkylene group include alkylene groups of 1 to 20 carbon atoms such as methylene, ethylene, propylene, tetramethylene, pentamethylene, hexamethylene, heptamethylene, octamethylene and 2,2,4-trimethylhexane-1,6-diyl groups. Examples of the alkenediyl group include alkenediyl groups of 2 to 20 carbon atoms such as pentane-2-ene-1,5-diyl groups. Examples of the arylene group include arylene groups of 6 to 20 carbon atoms such as phenylene, naphthylene and biphenylene groups. Arylene-alkylene groups include arylene-alkylene groups of 7 to 20 carbon atoms such as phenylene-alkylene, naphthylene-alkylene and biphenylene-alkylene groups.

The "(c) hydrocarbylene group" for $R^{14}$ may be an alkylene group of 1 to 20 carbon atoms or an alkylene group of 1 to 4 carbon atoms. Specific examples of the alkylene group of 1 to 4 carbon atoms include methylene, ethylene and propylene groups.

$R^{14}$ may be a hydrocarbylene group, a hydrocarbylene group of 1 to 20 carbon atoms, an alkylene group of 1 to 20 carbon atoms or an alkylene group of 1 to 6 carbon atoms.

In formula (1), n may be 0 in particular.

The "$(\alpha+\beta)$-valent group resulting from removal of $(\alpha+\beta)$ hydrogen atoms from a hydrocarbon" for $R^{15}$ may be a group represented by the following formula (1-3), for example.

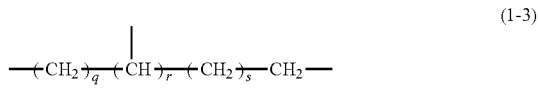

(1-3)

In formula (1-3), q, r and s each independently represent integers such that the formulas $r \leq \alpha+\beta-1$, $0 \leq q \leq 20$, $0 \leq s \leq 20$ and $0 \leq r \leq 5$ are satisfied. The symbols $\alpha$ and $\beta$ have the same respective definitions as $\alpha$ and $\beta$ in formula (1).

The compound represented by formula (1) may be:

a compound wherein n is 0, $\alpha$ is 1, $\beta$ is 1 and $R^{15}$ is a hydrocarbylene group of 1 to 20 carbon atoms, a compound wherein n is 0, $\alpha$ is 1, $\beta$ is 1 and $R^{15}$ is a hydrocarbylene group of 1 to 20 carbon atoms, a compound wherein n is 0, $\alpha$ is 1, $\beta$ is 1, $R^{15}$ is a hydrocarbylene group of 1 to 20 carbon atoms, and among $R^{11}$, $R^{12}$, $R^{13}$, $R^{16}$, $R^{17}$ and R, at least two are substituted amino groups and at least one is a hydroxy group or hydrocarbyloxy group, a compound wherein n is 0, $\alpha$ is 1, $\beta$ is 1, $R^{15}$ is a hydrocarbylene group of 1 to 20 carbon atoms, at least two among $R^{11}$, $R^{12}$ and $R^{13}$ are substituted amino groups and at least one among $R^{16}$, $R^{17}$ and $R^{18}$ is a hydroxy group or hydrocarbyloxy group, or a compound wherein n is 0, $\alpha$ is 1, $\beta$ is 1, $R^{15}$ is a hydrocarbylene group of 1 to 20 carbon atoms, at least two among $R^{11}$, $R^{12}$ and $R^{13}$ are amino groups in which one or two hydrogen atoms have been replaced with alkyl groups of 1 to 4 carbon atoms, and at least one among $R^{16}$, $R^{17}$ and $R^{18}$ is an alkoxy group of 1 to 20 carbon atoms.

The compound represented by formula (1) may be a compound represented by the following formula (1-4), wherein n is 0, $\alpha$ is 1, $\beta$ is 1 and $R^{15}$ is a hydrocarbylene group of 1 to 20 carbon atoms.

(1-4)

$R^{11}$, $R^{12}$, $R^{13}$, $R^{14}$, $R^{16}$, $R^{17}$ and $R^{18}$ have the same respective definitions as $R^{11}$, $R^{12}$, $R^{13}$, $R^{14}$, $R^{16}$, R and $R^{18}$ of formula (1). $R^{19}$ represents a hydrocarbylene group of 1 to 20 carbon atoms.

Examples of the hydrocarbylene group of 1 to 20 carbon atoms for $R^{19}$ include alkylene groups of 1 to 20 carbon atoms, alkenediyl groups of 2 to 20 carbon atoms, arylene groups of 1 to 20 carbon atoms and arylene-alkylene groups of 1 to 20 carbon atoms. Examples of the alkylene group of 1 to 20 carbon atoms include methylene, ethylene, propylene, tetramethylene, pentamethylene, hexamethylene, heptamethylene, octamethylene and 2,2,4-trimethylhexane-1,6-diyl groups. Examples of the alkenediyl group of 2 to 20 carbon atoms include a pentane-2-ene-1,5-diyl group. Examples of the arylene group of 6 to 20 carbon atoms include phenylene, naphthylene and biphenylene groups. Examples of the arylene-alkylene group of 1 to 20 carbon atoms include phenylene-alkylene, naphthylene-alkylene and biphenylene-alkylene groups. In particular, $R^{19}$ may be a hydrocarbylene group of 1 to 8 carbon atoms.

In formula (1-4), $R^{11}$, $R^{12}$ and $R^{13}$ may be each independently a substituted amino group or hydrocarbyl group, at least two among $R^{11}$, $R^{12}$ and $R^{13}$ may be substituted amino groups, $R^{19}$ may be a hydrocarbylene group of 1 to 8 carbon atoms, $R^{16}$, $R^{17}$ and $R^{18}$ may be each independently a hydrocarbyloxy or hydrocarbyl group, and at least two among $R^{16}$, $R^{17}$ and $R^{18}$ may be hydrocarbyloxy groups.

The compound represented by formula (1-4) may be 1-(bis(dimethylamino)methylsilyl)-1-(dimethoxymethylsilyl)methane, 1-(bis(dimethylamino)methylsilyl)-1-(trimethoxysilyl)methane, 1-(bis(diethylamino)methylsilyl)-1-(dimethoxymethylsilyl)methane, 1-(bis(diethylamino)methylsilyl)-1-(trimethoxysilyl)methane, 2-(bis(dimethylamino)methylsilyl)-1-(dimethoxymethylsilyl)ethane, 2-(bis(dimethylamino)methylsilyl)-1-(trimethoxysilyl)ethane, 2-(bis(diethylamino)methylsilyl)-1-(dimethoxymethylsilyl)ethane, 2-(bis(diethylamino)methylsilyl)-1-(trimethoxysilyl)ethane, 2-(bis(dimethylamino)methylsilyl)-1-(trimethoxysilyl)ethane, 2-(bis(dimethylamino)methylsilyl)-1-(trimethoxysilyl)propane, 2-(bis(diethylamino)methylsilyl)-1-(dimethoxymethylsilyl)propane or 2-(bis(diethylamino)methylsilyl)-1-(trimethoxysilyl)propane.

A compound represented by formula (1) may be used alone, or two or more different ones may be used in combination.

A compound represented by formula (1) can be produced by a known method.

The modified conjugated diene polymer of this embodiment may have a molecular chain which is a conjugated diene polymer including a monomer unit derived from a conjugated diene, and a structural unit derived from a compound represented by formula (1) (hereunder collectively referred to as "structural unit (1)"), bonded to the molecular chain. The molecular chain of a modified conjugated diene polymer may further include a monomer unit derived from an aromatic vinyl compound. Structural unit (1) may be bonded to one end of the molecular chain of the conjugated diene polymer, or it may be bonded to both ends of the molecular chain of the conjugated diene polymer, or it may be bonded as a side chain on the molecular chain of the conjugated diene polymer. From the viewpoint of facilitating production of the polymer, structural unit (1) may be bonded to one or both ends of the molecular chain, or it may be bonded to one end of the molecular chain.

Examples of the conjugated diene to form the molecular chain of the conjugated diene polymer include 1,3-butadiene, isoprene, 1,3-pentadiene, 2,3-dimethyl-1,3-butadiene and 1,3-hexadiene. The conjugated diene may be 1,3-butadiene or isoprene.

Examples of the aromatic vinyl compound to form the molecular chain of the conjugated diene polymer include styrene, α-methylstyrene, vinyltoluene, vinylnaphthalene, divinylbenzene, trivinylbenzene, divinylnaphthalene and 4-methylstyrene. The aromatic vinyl compound may be styrene.

The content of the structural unit derived from an aromatic vinyl compound in the modified conjugated diene polymer of this embodiment may be 0 to 50 mass % with respect to 100 mass % as the total of the structural unit derived from the conjugated diene and the structural unit from the aromatic vinyl compound. The content of the structural unit derived from the aromatic vinyl compound may also be 9 mass % or greater, or 14 mass % or greater. From the viewpoint of fuel efficiency of the modified conjugated diene polymer composition after vulcanization, the content of the structural unit derived from the aromatic vinyl compound may be 50 mass % or lower, or 45 mass % or lower.

The content of structural unit (1) in the modified conjugated diene polymer of this embodiment may be 0.001 to 5 mass % with respect to 100 mass % as the total of the structural unit derived from the conjugated diene and the structural unit from the aromatic vinyl compound.

The modified conjugated diene polymer of this embodiment may be produced by a method including, for example, a step of homopolymerizing a conjugated diene compound in a polymerization solution including a hydrocarbon solvent and an alkali metal polymerization initiator, or copolymerizing a conjugated diene compound and another copolymerizing monomer such as an aromatic vinyl compound, to produce a conjugated diene polymer having a site with living activity, and a step of reacting a conjugated diene polymer having a site with living activity with a compound represented by formula (1), in a mixed solution obtained by adding a compound represented by formula (1) to a polymerization solution, in that order.

The conjugated diene polymer having a site with living activity has a molecular chain including a structural unit derived from a conjugated diene, and a living polymerizable reactive site (active site). The conjugated diene polymer having a site with living activity may have a site with living activity (active site) at one end, both ends or a side chain of the polymer molecular chain. The conjugated diene polymer having a site with living activity may be a homopolymer of a conjugated diene, or it may be a copolymer of a conjugated diene and an aromatic vinyl compound.

When a conjugated diene and an aromatic vinyl compound are to be copolymerized, the amount of the aromatic vinyl compound may be 9 mass % or greater, or 14 mass % or greater, where 100 mass % is the total amount of the conjugated diene and aromatic vinyl compound. From the viewpoint of fuel efficiency of the modified conjugated diene polymer composition, the amount of the aromatic vinyl compound may be 50 mass % or lower, or 45 mass % or lower, where 100 mass % is the total amount of the conjugated diene and aromatic vinyl compound.

Examples of the hydrocarbon solvent include aliphatic hydrocarbons such as propane, butane, isobutane, pentane, isopentane, hexane, cyclopentane and cyclohexane; and aromatic hydrocarbons such as benzene, toluene, xylene and ethylbenzene. Two or more different types of these may also be used in combination.

The concentration of the conjugated diene, or the total concentration of the conjugated diene and the aromatic vinyl compound, in the polymerization solution, is typically 1 mass % or greater and 50 mass % or lower, and may be 5 mass % or greater and 30 mass % or lower.

The polymerization temperature is typically 25° C. or greater and 100° C. or lower, and may be 35° C. or greater and 90° C. or lower, or 50° C. or greater and 80° C. or lower. The polymerization time is typically 10 minutes or greater and 10 hours or lower.

The amount of alkali metal polymerization initiator used is preferably 0.01 mmol or greater and 15 mmol or lower, with respect to 100 g as the conjugated diene, or as the total of the conjugated diene and the aromatic vinyl compound.

The alkali metal polymerization initiator may be an initiator that is known as an initiator for living polymerization. Specific examples include alkali metals, complexes of alkali metals with polar compounds, oligomers with alkali metals, and organic alkali metal compounds. The alkali metal polymerization initiator may be, in particular, an organic alkali metal compound.

The alkali metal to be used in an alkali metal polymerization initiator may be lithium, sodium, potassium, rubidium or cesium, for example.

Examples of the complexes of alkali metals and polar compounds include potassium-tetrahydrofuran complex and potassium-diethoxyethane complex.

Examples of the oligomers with alkali metals include sodium salts of α-methylstyrene tetramer.

Examples of the organic alkali metal compounds include organic alkali metal compounds with nitrogen atom-containing groups and organic alkali metal compounds with hydrocarbyl groups.

Examples of the organic alkali metal compounds with hydrocarbyl groups include organic lithium compounds such as ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenylbutyllithium, cyclohexyllithium, cyclopentyllithium and 1,4-dilithio-2-butene, organic sodium compounds such as sodium naphthalenide and sodium biphenylide, and organic potassium compounds such as potassium naphthalenide. The organic alkali metal compound with a hydrocarbyl group may be an organic lithium compound, an alkyllithium (for example, an alkyllithium of 1 to 10 carbon atoms), or n-butyllithium.

The organic alkali metal compound with a nitrogen atom-containing group may be an organic alkali metal compound having a group represented by the following formula (2).

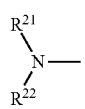

(2)

In formula (2), $R^{21}$ and $R^{22}$ each independently represent an optionally substituted hydrocarbyl group or trihydrocarbylsilyl group, or a hydrocarbylene group formed by bonding of $R^{21}$ to $R^{22}$, and optionally having a nitrogen atom and/or oxygen atom, or a group of 5 to 20 carbon atoms represented by —Si($R^{32}$)$_2$—(CH$_2$)$_x$—Si($R^{32}$)$_2$— (where $R^{32}$ represents a hydrocarbyl group and x is an integer of 1 to 10), or a group of 4 to 20 carbon atoms represented by —Si($R^{33}$)$_2$—(CH$_2$)$_y$— (where $R^{33}$ represents a hydrocarbyl group and y is an integer of 2 to 11).

Optionally substituted hydrocarbyl groups as $R^{21}$ or $R^{22}$ include hydrocarbyl and substituted hydrocarbyl groups.

Examples of the hydrocarbyl group include alkyl, alkenyl, alkynyl, aryl and aralkyl groups. Examples of the alkyl group include methyl, ethyl, n-propyl, isopropyl, n-butyl, sec-butyl, tert-butyl, n-pentyl, n-hexyl, n-octyl, n-dodecyl and cyclopentyl and cyclohexyl groups. Examples of the alkenyl group include vinyl, allyl, 1-propenyl and isopropenyl groups. Examples of the alkynyl group include ethynyl and 2-propynyl groups. Examples of the aryl group include phenyl, ethylphenyl, tolyl and xylyl groups. Examples of the aralkyl group include a benzyl group.

The hydrocarbyl group may be an alkyl group, or an alkyl group of 1 to 4 carbon atoms.

Examples of the substituted hydrocarbyl group include hydrocarbyl groups substituted with a substituted amino group, hydrocarbyl groups substituted with a hydrocarbyloxy group, hydrocarbyl groups substituted with a trialkylsilyl group, and hydrocarbyl groups substituted with a trialkoxysilyl group.

Examples of the hydrocarbyl group substituted with a substituted amino group include:

(dialkylamino)alkyl groups such as N,N-dimethylaminomethyl, 2-(dimethylamino)ethyl, 2-(diethylamino)ethyl, 3-(dimethylamino)propyl and 3-(diethylamino)propyl; (dialkylamino)aryl groups such as 4-(dimethylamino)phenyl, 3-(dimethylamino)phenyl, 4-(diethylamino)phenyl and 3-(diethylamino)phenyl; (dialkylamino)alkylaryl groups such as 4-(dimethylamino)methylphenyl and 4-[2-(dimethylamino)ethyl]phenyl; alkyl groups substituted with a cycloamino group, such as 3-(1-pyrrolidinyl)propyl, 3-(1-piperidinyl)propyl and 3-(1-imidazolyl)propyl; aryl groups substituted with a cycloamino group, such as 4-(1-pyrrolidinyl)phenyl, 4-(1-piperidinyl)phenyl and 4-(1-imidazolyl) phenyl; and alkylaryl groups substituted with a cycloamino group, such as 4-[2-(1-pyrrolidinyl)ethyl]phenyl, 4-[2-(1-piperidinyl)ethyl]phenyl and 4-[2-(1-imidazolyl)ethyl]phenyl.

Examples of the hydrocarbyl group substituted with a hydrocarbyloxy group include alkoxyalkyl groups such as methoxymethyl, ethoxymethyl, methoxyethyl and ethoxyethyl groups.

Examples of the hydrocarbyl group substituted with a trialkylsilyl group include trialkylsilylalkyl groups such as trimethylsilylmethyl, 2-trimethylsilylethyl and 3-trimethylsilylpropyl groups.

The optionally substituted hydrocarbyl group as $R^{21}$ or $R^{22}$ may be an optionally substituted hydrocarbyl group of 1 to 20 carbon atoms, a hydrocarbyl group of 1 to 20 carbon atoms, or an alkyl group of 1 to 10 carbon atoms. The alkyl group of 1 to 10 carbon atoms may be a methyl, ethyl, n-propyl, isopropyl, n-butyl, isobutyl, sec-butyl or tert-butyl group, and may be a methyl or ethyl group.

The trihydrocarbylsilyl group as $R^{21}$ or $R^{22}$ may be a trialkylsilyl group such as trimethylsilyl, triethylsilyl, tripropylsilyl, triisopropylsilyl, tributylsilyl, tripentylsilyl, trihexylsilyl or tert-butyl-dimethylsilyl groups, for example. The trihydrocarbylsilyl group as $R^{21}$ or $R^{22}$ may be a trimethylsilyl or triethylsilyl group.

The hydrocarbylene group formed by bonding of $R^{21}$ to $R^{22}$, and optionally having a nitrogen atom and/or oxygen atom, include hydrocarbylene groups, and hydrocarbylene groups with a nitrogen atom and/or an oxygen atom. Examples of such hydrocarbylene groups include alkylene, alkenediyl, arylene and arylene-alkylene groups. Examples of the alkylene group include methylene, ethylene, propylene, tetramethylene, pentamethylene, hexamethylene, heptamethylene, octamethylene and 2,2,4-trimethylhexane-1,6-diyl groups. Examples of the alkenediyl group include a pentane-2-ene-1,5-diyl group. Examples of the arylene group include phenylene, naphthylene and biphenylene groups. Examples of the arylene-alkylene group include phenylene-alkylene, naphthylene-alkylene and biphenylene-alkylene groups.

The hydrocarbylene group may be an alkylene group, or an alkylene group of 4 to 7 carbon atoms.

Examples of the hydrocarbylene group with a nitrogen atom and/or an oxygen atom include a group represented by —CH=N—CH=CH—, a group represented by —CH═N—CH$_2$—CH$_2$—, and a group represented by —CH$_2$—CH$_2$—O—CH$_2$—CH$_2$—.

The hydrocarbylene group with a nitrogen atom and/or oxygen atom may also be a group represented by —CH═N—CH$_2$—CH$_2$— or —(CH$_2$)$_t$—O—(CH$_2$)$_u$— (where t and u are each an integer of 1 or greater).

The hydrocarbylene group optionally having a nitrogen atom and/or oxygen atom may be a hydrocarbylene group of 3 to 20 carbon atoms optionally having a nitrogen atom and/or oxygen atom, a hydrocarbylene group of 3 to 20 carbon atoms, or an alkylene group of 4 to 7 carbon atoms, or may be a tetramethylene, pentamethylene or hexamethylene group.

Examples of the group of 5 to 20 carbon atoms represented by —Si(R$^{32}$)$_2$—(CH$_2$)$_x$—Si(R$^{32}$)$_2$—, formed by bonding of R$^{21}$ to R$^{22}$ (where R$^{32}$ represents a hydrocarbyl group and x is an integer of 1 to 10) include a group represented by —Si(CH$_3$)$_2$—CH$_2$—CH$_2$—Si(CH$_3$)$_2$—.

Examples of the group of 4 to 20 carbon atoms represented by —Si(R$^{33}$)$_2$—(CH$_2$)$_y$—, formed by bonding of R$^{21}$ to R$^{22}$ (where R$^{33}$ represents a hydrocarbyl group and y is an integer of 2 to 11) include a group represented by —Si(CH$_3$)$_2$—CH$_2$—CH$_2$—CH$_2$—.

R$^{21}$ and R$^{22}$ may each independently be a hydrocarbyl group, or a hydrocarbylene group formed by bonding of R$^{21}$ to R$^{22}$. R$^{21}$ and R$^{22}$ may each independently be an alkyl group of 1 to 4 carbon atoms, or an alkylene group of 4 to 7 carbon atoms formed by bonding of R$^{21}$ to R$^{22}$. R$^{21}$ and R$^{22}$ may each independently be an alkyl group of 1 to 4 carbon atoms, and they may each be a methyl or ethyl group.

Examples of the organic alkali metal compounds with a group represented by formula (2) include 3-(dimethylamino)propyllithium, 3-(diethylamino)propyllithium, 3-morpholinopropyllithium, lithium hexamethyleneimide, lithium pyrrolidide, lithium piperidide, lithium heptamethyleneimide and lithium dodecamethyleneimide.

The organic alkali metal compound with a group represented by formula (2) may be a compound represented by the following formula (3).

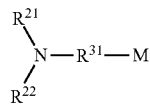
(3)

R$^{21}$ and R$^{22}$ have the same respective definitions as R$^{21}$ and R$^{22}$ in formula (2), R$^{31}$ represents a hydrocarbylene group of 6 to 100 carbon atoms, and M represents an alkali metal atom.

The hydrocarbylene group of 6 to 100 carbon atoms for R$^{31}$ may be a hydrocarbylene group of 7 to 90 carbon atoms, a hydrocarbylene group of 8 to 80 carbon atoms, or a group represented by the following formula (3-1).

(3-1)

In formula (3-1), R$^{34}$ represents a structural unit derived from a conjugated diene compound and/or a structural unit derived from an aromatic vinyl compound, and i and f are integers of 1 to 10. The (CH$_2$)$_i$ group in formula (3-1) bonds with the nitrogen atom of formula (3), and R$^{34}$ bonds with the M of formula (3).

The structural unit derived from a conjugated diene compound and/or the structural unit derived from an aromatic vinyl compound in R$^{34}$ may be a structural unit derived from isoprene, a structural unit derived from styrene or a structural unit derived from butadiene.

The letter f may be an integer of 1 to 5. The letter i may be an integer of 2 to 4, and it may be 3.

In formula (3-1), R$^{34}$ may be a structural unit derived from isoprene and i may be 1, R$^{34}$ may be a structural unit derived from isoprene and i may be 2, or R$^{34}$ may be a structural unit derived from isoprene and i may be 3.

Examples of the alkali metal atom for M include lithium, sodium, potassium and cesium. M may be lithium, in particular.

Compounds of formula (3) wherein R$^{31}$ is a group represented by formula (3-1), R$^{21}$ and R$^{22}$ are each independently a hydrocarbyl group and M is lithium include reaction products of (dialkylamino)alkyllithium compounds and isoprene. Examples include 3-(dimethylamino)propyllithium, 3-(diethylamino)propyllithium, 3-(dibutylamino)propyllithium, 4-(dimethylamino)butyllithium, 4-(diethylamino)butyllithium, 4-(dipropylamino)butyllithium and 3-(dibutylamino)butyllithium.

Compounds of formula (3) wherein R$^{31}$ is a group represented by formula (3-1), R$^{21}$ bonds to R$^{22}$ to form a hydrocarbylene group and M is lithium include reaction products of alkyllithium compounds with a cycloamino group, and isoprene. Examples of the alkyllithium compounds with a cycloamino group include 3-(1-pyrrolidinyl)propyllithium, 3-(1-piperidinyl)propyllithium, 3-(1-hexamethyleneimino)propyllithium and 3-[1-(1,2,3,6-tetrahydropyridinyl)]propyllithium.

Compounds of formula (3) wherein R$^{31}$ is a group represented by formula (3-1), R$^{21}$ bonds to R$^{22}$ to form a hydrocarbylene group with a nitrogen atom and/or oxygen atom, and M is lithium may be reaction products of alkyllithium compounds with a cycloamino group, and isoprene. Examples of the alkyllithium compounds with a cycloamino group include 3-(1-morpholino)propyllithium, 3-(1-imidazolyl)propyllithium and 3-(4,5-dihydro-1-imidazolyl)propyllithium.

Examples of the compound of formula (3) wherein R$^{31}$ is a group represented by formula (3-1), R$^{21}$ bonds to R$^{22}$ to form a group of 5 to 20 carbon atoms represented by —Si(R$^{32}$)$_2$—(CH$_2$)$_x$—Si(R$^{32}$)$_2$— (where R$^{32}$ represents a hydrocarbyl group and x is an integer of 1 to 10), and M is lithium, include reaction products of 3-(2,2,5,5-tetramethyl-1-aza-2,5-disila-1-cyclopentyl)propyllithium and isoprene, butadiene or styrene.

Examples of the compound of formula (3) wherein R$^{31}$ is a group represented by formula (3-1), R$^{21}$ bonds to R$^{22}$ to form a group of 4 to 20 carbon atoms represented by —Si(R$^{33}$)$_2$—(CH$_2$)$_y$— (where R$^{33}$ represents a hydrocarbyl group and y is an integer of 2 to 11), and M is lithium, include reaction products of 3-(2,2,-dimethyl-1-aza-2-sila-1-cyclopentyl)propyllithium and isoprene, butadiene or styrene.

The compound represented by formula (3) may be a compound in which R$^{31}$ is a group represented by formula (3-1), R$^{21}$ and R$^{22}$ are each independently a hydrocarbyl group and M is lithium, or it may be a compound in which R$^{21}$ and R$^{22}$ are each independently an alkyl group of 1 to 4 carbon atoms, M is lithium, R$^{31}$ is a group represented by formula (3-1), R$^{34}$ in formula (3-1) represents a structural unit derived from isoprene, f is 1 to 5 and i is 2 to 4, or it may be a reaction product of 3-(dimethylamino)propyllithium or 3-(diethylamino)propyllithium with isoprene.

Two or more of these may be used in combination as a compound represented by formula (3).

A secondary amine compound with a group represented by formula (2) and an organic alkali metal compound may be reacted to obtain an organic alkali metal compound with a group represented by formula (2).

Examples of the organic alkali metal compound to be reacted with the secondary amine compound having a group represented by formula (2) include organic lithium compounds, organic sodium compounds, organic potassium compounds and organic cesium compounds.

Examples of the organic lithium compound include alkyllithiums such as methyllithium, ethyllithium, n-propyllithium, isopropyllithium, n-butyllithium, isobutyllithium, sec-butyllithium, tert-butyllithium, n-hexyllithium and n-octyllithium; alkenyllithiums such as vinyllithium and propenyllithium; aryllithiums such as phenyllithium, tolyllithium and lithium naphthilide; alkylenedilithiums such as tetramethylenedilithium, pentamethylenedilithium, hexamethylenedilithium and decamethylenedilithium; lithium naphthalenide; and lithium biphenylide. Examples of the organic sodium compound include sodium naphthalenide and sodium biphenylide. Examples of the organic potassium compound include potassium naphthalenide. Examples of the organic cesium compound include n-butylcesium.

The organic alkali metal compound may be an organic lithium compound, or an alkyllithium compound of 1 to 20 carbon atoms, and it may be n-butyllithium, sec-butyllithium or tert-butyllithium.

In formula (2), $R^{21}$ and $R^{22}$ are each independently an optionally substituted hydrocarbyl group of 1 to 20 carbon atoms, or they be a hydrocarbylene group of 3 to 20 carbon atoms formed by $R^{21}$ bonding to $R^{22}$, and optionally having a nitrogen atom and/or oxygen atom, a group of 5 to 20 carbon atoms represented by —Si($R^{32}$)$_2$—(CH$_2$)$_x$—Si($R^{32}$)$_2$-(where $R^{32}$ represents a hydrocarbyl group and x is an integer of 1 to 10), or a group of 4 to 20 carbon atoms represented by —Si($R^{33}$)$_2$—(CH$_2$)$_y$— (where $R^{33}$ represents a hydrocarbyl group and y is an integer of 2 to 11).

$R^{21}$ and $R^{22}$ in formula (2) may each independently be a hydrocarbyl group, or a hydrocarbylene group formed by bonding of $R^{21}$ to $R^{22}$. $R^{21}$ and $R^{22}$ in formula (2) may each independently be an alkyl group of 1 to 4 carbon atoms, or they may be an alkylene group of 4 to 7 carbon atoms formed by bonding of $R^{21}$ to $R^{22}$. $R^{21}$ and $R^{22}$ in formula (2) may each independently be an alkyl group of 1 to 4 carbon atoms.

Examples of the secondary amine compound with a group represented by formula (2), wherein $R^{21}$ and $R^{22}$ are each independently a hydrocarbyl group of 1 to 20 carbon atoms, include dialkylamines such as dimethylamine, diethylamine, methylethylamine, di-n-propylamine, diisopropylamine, di-n-butylamine, diisobutylamine, di-sec-butylamine, di-tert-butylamine, di-n-hexylamine and di-n-octylamine; dicycloalkylamines such as dicyclohexylamine; alkylarylamines such as N-methylaniline, N-ethylaniline and N-methyl-N-benzylamine; and diarylamines such as diphenylamine.

Examples of the secondary amine compound with a group represented by formula (2), wherein at least one of $R^{21}$ and $R^{22}$ is a substituted hydrocarbyl group of 1 to 20 carbon atoms, include di(alkoxyalkyl)amines such as di(methoxymethyl)amine, di(ethoxymethyl)amine, di(2-methoxyethyl) amine and di(2-ethoxyethyl)amine; bis(dialkylaminoalkyl) amines such as bis(dimethylaminomethyl)amine; trialkylsilylalkyl group-containing amine compounds such as trimethylsilylpropylmethylamine; and trialkoxysilylalkyl group-containing amine compounds such as trimethoxysilylpropylmethylamine.

Examples of the secondary amine compound with a group represent by formula (2), wherein $R^{21}$ is bonded to $R^{22}$ to form a hydrocarbylene group of 3 to 20 carbon atoms, include trimethyleneimine, pyrrolidine, piperidine, 2-methylpiperidine, hexamethyleneimine, octamethyleneimine, decamethyleneimine, dodecamethyleneimine, 2-methylpiperidine, 3-methylpiperidine, 4-methylpiperidine, 3,5-dimethylpiperidine, 1,2,3,6-tetrahydropyridine, 3,5,5-trimethylhexahydroazepine and 1,3,3-trimethyl-6-azabicyclo[3,2,2] octane.

Examples of the secondary amine compound with a group represented by formula (2), wherein $R^{21}$ is bonded to $R^{22}$ to form a hydrocarbylene group of 3 to 20 carbon atoms, with a nitrogen atom and/or oxygen atom, include imidazole, 4,5-dihydroimidazole and morpholine.

Examples of the secondary amine compound with a group represented by formula (2), wherein $R^{21}$ is bonded to $R^{22}$ to form a group of 5 to 20 carbon atoms represented by —Si($R^{32}$)$_2$—(CH$_2$)$_x$—Si($R^{32}$)$_2$-(where $R^{32}$ represents a hydrocarbyl group and x is an integer of 1 to 10), include 2,2,5,5-tetramethyl-1-aza-2,5-disilacyclopentane. Examples of the secondary amine compound with a group represented by formula (2), wherein $R^{21}$ is bonded to $R^{22}$ to form a group of 4 to 20 carbon atoms represented by —Si($R^{33}$)$_2$—(CH$_2$)$_y$— (where $R^{33}$ represents a hydrocarbyl group and y is an integer of 2 to 11), include 2,2-dimethyl-1-aza-2-silacyclopentane.

The secondary amine compound with a group represented by formula (2) may be a compound represented by the following formula (4-1).

(4-1)

In formula (4-1), $R^{45}$ represents a hydrocarbylene group of 3 to 20 carbon atoms optionally having a nitrogen atom and/or oxygen atom, a group of 5 to 20 carbon atoms represented by —Si($R^{46}$)$_2$—(CH$_2$)$_{x'}$—Si($R^{46}$)$_2$-(where $R^{46}$ represents a hydrocarbyl group and x' represents an integer of 1 to 10), or a group of 4 to 20 carbon atoms represented by —Si($R^{47}$)$_2$—(CH$_2$)$_{y'}$— (where $R^{47}$ represents a hydrocarbyl group and y' represents an integer of 2 to 11).

The hydrocarbylene group of 3 to 20 carbon atoms optionally having a nitrogen atom and/or oxygen atom, as $R^{45}$, is a hydrocarbylene group of 3 to 20 carbon atoms, or a hydrocarbylene group of 3 to 20 carbon atoms having a nitrogen atom and/or oxygen atom.

The hydrocarbylene group of 3 to 20 carbon atoms as $R^{45}$ may be, for example, an alkylene group of 3 to 20 carbon atoms, an alkenediyl group of 3 to 20 carbon atoms, an arylene group of 3 to 20 carbon atoms, or a group of 3 to 20 carbon atoms having an arylene and alkylene group mutually bonded (hereunder collectively referred to as "arylene-alkylene group"). Examples of the alkylene group of 3 to 20 carbon atoms include propylene, tetramethylene, pentamethylene, hexamethylene, heptamethylene, octamethylene and 2,2,4-trimethylhexane-1,6-diyl groups. Examples of the alkenediyl group of 3 to 20 carbon atoms include a pentane-2-ene-1,5-diyl group. Examples of the arylene group of 3 to 20 carbon atoms include phenylene, naphthylene and biphenylene groups. Examples of the arylene-alkylene group of 3 to 20 carbon atoms include phenylene-alkylene, naphthylene-alkylene and biphenylene-alkylene groups.

Examples of the hydrocarbylene group of 3 to 20 carbon atoms and having a nitrogen atom and/or oxygen atom include a group represented by —CH=N—CH=CH—, a group represented by —CH=N—CH$_2$—CH$_2$—, and a group represented by —CH$_2$—CH$_2$—O—CH$_2$—CH$_2$—.

Specific examples of the group of 5 to 20 carbon atoms represented by —Si(R$^{46}$)$_2$—(CH$_2$)$_{x'}$—Si(R$^{46}$)$_2$— (where R$^{46}$ represents a hydrocarbyl group and x' represents an integer of 1 to 10) and groups of 4 to 20 carbon atoms represented by —Si(R$^{47}$)$_2$—(CH$_2$)$_{y'}$— (where R$^{47}$ represents a hydrocarbyl group and y' represents an integer of 2 to 11), as R$^{45}$, are the same with the examples of the group of 5 to 20 carbon atoms represented by —Si(R$^{32}$)$_2$—(CH$_2$)$_x$—Si(R$^{32}$)$_2$— (where R$^{32}$ represents a hydrocarbyl group and x represents an integer of 1 to 10), and groups of 4 to 20 carbon atoms represented by —Si(R$^{33}$)$_2$—(CH$_2$)$_y$— (where R$^{33}$ represents a hydrocarbyl group and y is an integer of 2 to 11) mentioned for R$^{21}$ and R$^{22}$ in formula (2), respectively.

R$^{45}$ may be a hydrocarbylene group of 3 to 20 carbon atoms or an alkylene group of 4 to 8 carbon atoms, and it may be a tetramethylene, pentamethylene or hexamethylene group.

The compound represented by formula (4-1) may be pyrrolidine, piperidine or hexamethyleneimine.

The polymerization solution may also contain an agent that adjusts the vinyl bond content of the structural unit derived from the conjugated diene, and an agent that adjusts the distribution of structural units derived from conjugated diene compounds, structural units derived from aromatic vinyl compounds and structural units derived from other compounds (hereunder, these will collectively be referred to as "adjusting agent").

Examples of the adjusting agent include ether compounds, tertiary amines, phosphine compounds, alkali metal alkoxides and alkali metal phenoxides. Examples of the ether compounds include alicyclic ethers such as tetrahydrofuran, tetrahydropyran and 1,4-dioxane; aliphatic monoethers such as diethyl ether and dibutyl ether; aliphatic diethers such as ethyleneglycol dimethyl ether, ethyleneglycol diethyl ether and ethyleneglycol dibutyl ether; aliphatic triethers such as diethyleneglycol diethyl ether and diethyleneglycol dibutyl ether; and aromatic ethers such as diphenyl ether, anisole, 1,2-dimethoxybenzene and 3,4-dimethoxytoluene. Examples of the tertiary amines include triethylamine, tripropylamine, tributylamine, 1,1,2,2-tetramethylethylenediamine, N,N-diethylaniline, pyridine and quinoline. Examples of the phosphine compounds include trimethylphosphine, triethylphosphine and triphenylphosphine. Examples of the alkali metal alkoxides include sodium-tert-butoxide, potassium-tert-butoxide, sodium-tert-pentoxide and potassium-tert-pentoxide. Examples of the alkali metal phenoxides include sodium phenoxide and potassium phenoxide. Two or more different types of these may also be used in combination.

The polymerization solution may also include a compound containing a hydrocarbyl group with a double bond, and a nitrogen atom and/or silicon atom.

The compound containing a hydrocarbyl group with a double bond and a nitrogen atom and/or silicon atom may be a compound represented by the following formula (5) or a compound represented by the following formula (5').

$$R^5\text{-}A^5 \tag{5}$$

In formula (5), R$^5$ represents a hydrocarbyl group with a double bond, and A$^5$ represents a substituted amino group, or a heterocyclic group with a nitrogen atom.

In formula (5'), R$^9$ represents a hydrocarbyl group with a double bond, and A$^9$ represents a substituted silyl group.

The hydrocarbyl group with a double bond for R$^5$ may be a group represented by the following formula (5-1).

In formula (5-1), m is 0 or 1, R$^{51}$, R$^{53}$ and R$^{54}$ each independently represent a hydrogen atom or a hydrocarbyl group, and R$^{52}$ represents a hydrocarbylene group.

Examples of the hydrocarbyl group for R$^{51}$, R$^{53}$ or R$^{54}$ include alkyl, alkenyl, alkynyl, aryl and aralkyl groups. Examples of the alkyl groups include methyl, ethyl, n-propyl, isopropyl, n-butyl, sec-butyl, tert-butyl, n-pentyl, n-hexyl, n-octyl, n-dodecyl and cyclopentyl and cyclohexyl groups. The alkyl group may be a methyl group. Examples of the alkenyl group include vinyl, allyl, 1-propenyl and isopropenyl groups. The alkenyl group may be a vinyl group. Examples of the alkynyl group include ethynyl and 2-propynyl groups. Examples of the aryl group include phenyl, ethylphenyl, tolyl and xylyl groups. The aryl group may be a phenyl group. Examples of the aralkyl group include benzyl groups.

R$^{51}$ may be a hydrogen atom, a methyl group, a vinyl group or a phenyl group, and it may be a hydrogen atom. R$^{53}$ and R$^{54}$ may be hydrogen atoms.

Examples of the hydrocarbylene group for R$^{52}$ include alkylene, alkenediyl and arylene groups, and groups having an arylene and alkylene group which are mutually bonded (hereunder collectively referred to as "arylene-alkylene groups"). Examples of the alkylene group include methylene, ethylene, tetramethylene, pentamethylene, hexamethylene, heptamethylene, octamethylene and 2,2,4-trimethylhexane-1,6-diyl groups. The alkylene group may be a methylene or ethylene group. Examples of the alkenediyl group include a pentane-2-ene-1,5-diyl group. Examples of the arylene group include phenylene, naphthylene and biphenylene groups. The arylene group may be a phenylene group, and it may be a para-phenylene or meta-phenylene group.

Examples of the arylene-alkylene group include phenylene-alkylene, naphthylene-alkylene and biphenylene-alkylene groups. The arylene-alkylene group may be a phenylene-alkylene group. When R$^{52}$ is an arylene-alkylene group, a carbon atom of the arylene group in the arylene-alkylene group may be bonded to the carbon atom to which R$^{51}$ in formula (5-1) is bonded.

The phenylene-alkylene group may be a group represented by the following formula (5-2).

In formula (5-2), g represents an integer of 1 to 10 and $(CH_2)_g$ is a substituent on the benzene ring.

Examples of the phenylene-alkylene group include para-phenylene-alkylene, meta-phenylene-alkylene and ortho-phenylene-alkylene groups. The arylene-alkylene group may be a phenylene-alkylene, para-phenylene-alkylene or meta-phenylene-alkylene group, or it may be a para-phenylene-methylene, meta-phenylene-methylene, para-phenylene-ethylene or meta-phenylene-ethylene group, or it may be a para-phenylene-ethylene or meta-phenylene-ethylene group.

Examples of the group represented by formula (5-1) wherein $R^{51}$, $R^{53}$ and $R^{54}$ are hydrogen atoms include vinyl, allyl, 3-butenyl, 4-vinylphenyl, 3-vinylphenyl, (4-vinylphenyl)methyl, 2-(4-vinylphenyl)ethyl, (3-vinylphenyl)methyl and 2-(3-vinylphenyl)ethyl groups.

Examples of the group represented by formula (5-1) wherein $R^{51}$ is a methyl group and $R^{53}$ and $R^{54}$ are hydrogen atoms include isopropenyl, 2-methyl-2-propenyl, 4-isopropenylphenyl, 3-isopropenylphenyl, (4-isopropenylphenyl)methyl, 2-(4-isopropenylphenyl)ethyl, (3-isopropenylphenyl)methyl and 2-(3-isopropenylphenyl)ethyl groups.

Examples of the group represented by formula (5-1) wherein $R^{51}$ is a vinyl group and $R^{53}$ and $R^{54}$ are hydrogen atoms include 1-methylene-2-propenyl and 2-methylene-3-butenyl groups.

Examples of the group represented by formula (5-1) wherein $R^{51}$ is a phenyl group and $R^{53}$ and $R^{54}$ are hydrogen atoms include 1-phenylethenyl, 2-phenyl-2-propenyl, 4-(1-phenylethenyl)phenyl, 3-(1-phenylethenyl)phenyl and 2-(1-phenylethenyl)phenyl groups.

Examples of the group represented by formula (5-1) wherein $R^{51}$ is a hydrogen atom, $R^{53}$ is a methyl group and $R^{54}$ is a hydrogen atom include 1-propenyl, 2-butenyl, 4-(1-propenyl)phenyl, [4-(1-propenyl)phenyl]methyl, 2-[4-(1-propenyl)phenyl]ethyl, 3-(1-propenyl)phenyl, [3-(1-propenyl)phenyl]methyl and 2-[3-(1-propenyl)phenyl]ethyl groups.

The group represented by formula (5-1) may be a group represented by the following formula (5-1a). $R^{51}$ and $R^{52}$ have the same respective definitions as $R^{51}$ and $R^{52}$ in formula (5-1).

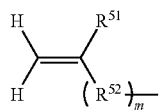

(5-1a)

Examples of the group represented by formula (5-1a) wherein $R^{51}$ is a hydrogen atom include vinyl, 4-vinylphenyl, 3-vinylphenyl, (4-vinylphenyl)methyl, 2-(4-vinylphenyl)ethyl, (3-vinylphenyl)methyl and 2-(3-vinylphenyl)ethyl groups.

Examples of the group represented by formula (5-1a) wherein $R^{51}$ is a methyl group include 4-isopropenylphenyl, 3-isopropenylphenyl, (4-isopropenylphenyl)methyl, 2-(4-isopropenylphenyl)ethyl, (3-isopropenylphenyl)methyl and 2-(3-isopropenylphenyl)ethyl groups.

Examples of the group represented by formula (5-1a) wherein $R^{51}$ is a vinyl group include 1-methylene-2-propenyl and 2-methylene-3-butenyl groups.

Examples of the group represented by formula (5-1a) wherein $R^{51}$ is a phenyl group include a 4-(1-phenylethenyl) phenyl group.

$R^{51}$ in formula (5-1a) may be a hydrogen atom. Also, m may be 1 and $R^{52}$ may be a group represented by formula (5-2).

In formula (5), $A^5$ represents a substituted amino group, or a nitrogen atom-containing heterocyclic group. The substituted amino group for $A^5$ may be a group represented by the following formula (5-3) or a group represented by the following formula (5-3a).

(5-3)

In formula (5-3), $R^{55}$ and $R^{56}$ each independently represent a hydrocarbyl group or trihydrocarbylsilyl group, or a hydrocarbylene group formed by bonding of $R^{55}$ to $R^{56}$, and optionally having a nitrogen atom and/or oxygen atom.

(5-3a)

In formula (5-3a), $R^{57}$ represents a hydrocarbylidene group and $R^{58}$ represents a hydrocarbylene group, or $R^{57}$ and $R^{58}$ represent a hydrocarbylene group formed by bonding of $R^{57}$ to $R^{58}$, and optionally having a nitrogen atom and/or oxygen atom.

The hydrocarbyl group as $R^{55}$ or $R^{56}$ may be, for example, an alkyl, alkenyl, aryl or aralkyl group. Examples of the alkyl group include methyl, ethyl, n-propyl, isopropyl, n-butyl, sec-butyl, tert-butyl, n-pentyl, n-hexyl, n-octyl, n-dodecyl and cyclopentyl and cyclohexyl groups. Examples of the alkenyl group include vinyl, allyl, 1-propenyl and isopropenyl groups. Examples of the aryl group include phenyl, ethylphenyl, tolyl and xylyl groups. Examples of the aralkyl group include a benzyl group.

The number of carbon atoms of a hydrocarbyl group as $R^{55}$ or $R^{56}$ may be 1 to 10, 1 to 4 or 1 to 2. The hydrocarbyl group as $R^{55}$ or $R^{56}$ may be an alkyl or alkenyl group, or it may be an alkyl group, or a linear alkyl group of 1 to 4 carbon atoms.

The trihydrocarbylsilyl group as $R^{55}$ or $R^{56}$ may be, for example, a trialkylsilyl group such as trimethylsilyl, triethylsilyl, tripropylsilyl, triisopropylsilyl, tributylsilyl, tripentylsilyl, trihexylsilyl or tert-butyl-dimethylsilyl groups.

The trihydrocarbylsilyl group as $R^{55}$ or $R^{56}$ may be a trialkylsilyl group of 3 to 9 carbon atoms, a trialkylsilyl group of 1 to 4 carbon atoms or a trimethylsilyl group.

The hydrocarbylene group formed by bonding of $R^{55}$ to $R^{56}$, and optionally having a nitrogen atom and/or oxygen atom, include hydrocarbylene groups, and hydrocarbylene groups with a nitrogen atom and/or oxygen atom.

Examples of the hydrocarbylene group include alkylene, alkenediyl, arylene and arylene-alkylene groups. Examples of the alkylene group include methylene, ethylene, propylene, tetramethylene, pentamethylene, hexamethylene, heptamethylene, octamethylene and 2,2,4-trimethylhexane-1,6-diyl groups. Examples of the alkenediyl group include a pentane-2-ene-1,5-diyl group. Examples of the arylene group include phenylene, naphthylene and biphenylene groups. Examples of the arylene-alkylene group include phenylene-alkylene, naphthylene-alkylene and biphenylene-alkylene groups.

Examples of the hydrocarbylene group with a nitrogen atom and/or oxygen atom include a group represented by —$CH_2CH_2$—NH—$CH_2$—, a group represented by —$CH_2CH_2$—N=CH—, a group represented by —CH=CH—N=CH—, a group represented by —$CH_2CH_2$—NH—$CH_2CH_2$— and a group represented by —$CH_2CH_2$—O—$CH_2CH_2$—.

The number of carbon atoms of a group formed by bonding of $R^{55}$ to $R^{56}$ and of a group formed by bonding of $R^{57}$ to $R^{58}$ may be 2 to 20, 3 to 8 or 4 to 6.

The hydrocarbylene group optionally having a nitrogen atom and/or oxygen atom, as a group formed by bonding of $R^{55}$ to $R^{56}$ and as a group formed by bonding of $R^{57}$ to $R^{58}$, may be a hydrocarbylene group, an alkylene group or an alkylene group of 4 to 7 carbon atoms.

The hydrocarbylidene group as $R^{57}$ may be, for example, an ethylidene, propylidene, butylidene, 1-methylethylidene, 1-methylpropylidene or 1,3-dimethylbutylidene group.

The number of carbon atoms of the hydrocarbylidene group as $R^{57}$ may be 2 to 20, or 2 to 6.

The hydrocarbylene group as $R^{58}$ may be an alkylene group, alkenediyl group, arylene group, arylene-alkylene group, or the like. Examples of the alkylene group include methylene, ethylene, propylene, tetramethylene, pentamethylene, hexamethylene, heptamethylene, octamethylene and 2,2,4-trimethylhexane-1,6-diyl groups. Examples of the alkenediyl group include a pentane-2-ene-1,5-diyl group, and Examples of the arylene group include phenylene, naphthylene and biphenylene groups. Examples of the arylene-alkylene group include phenylene-alkylene, naphthylene-alkylene and biphenylene-alkylene groups.

Examples of the group represented by formula (5-3a) include ethylideneamino, 1-methylpropylideneamino, 1,3-dimethylbutylideneamino, 1-methylethylideneamino and 4-N,N-dimethylaminobenzylideneamino groups.

Examples of the group represented by formula (5-3) wherein $R^{55}$ and $R^{56}$ are each independently a hydrocarbyl group include dialkylamino groups such as dimethylamino, diethylamino, di(n-propyl)amino, di(isopropyl)amino, di(n-butyl)amino, di(sec-butyl)amino, di(tert-butyl)amino and ethylmethylamino groups. Examples of the group represented by formula (5-3) wherein $R^{55}$ and $R^{56}$ are each independently a trihydrocarbylsilyl group include bis(trialkylsilyl)amino groups such as bis(trimethylsilyl)amino and bis(tert-butyl-dimethylsilyl)amino groups.

Examples of the group represented by formula (5-3) wherein $R^{55}$ is bonded to $R^{56}$ to form a hydrocarbylene group include 1-aziridinyl, 1-azetidinyl, 1-pyrrolidinyl, 1-piperidinyl, 1-hexamethyleneimino and 1-pyrrolyl groups.

Examples of the group represented by formula (5-3) wherein $R^{55}$ is bonded to $R^{56}$ to form a hydrocarbylene group with a nitrogen atom and/or oxygen atom include 1-imidazolyl, 4,5-dihydro-1-imidazolyl, 1-imidazolidinyl, 1-piperazinyl and morpholino groups.

In formula (5-3), $R^{55}$ and $R^{56}$ may each independently be a hydrocarbyl or trihydrocarbylsilyl group, or they may be a hydrocarbylene group formed by bonding of $R^{55}$ to $R^{56}$. $R^{55}$ and $R^{56}$ may each independently be a linear alkyl group or trialkylsilyl group, or they may be an alkylene group of 4 to 7 carbon atoms formed by bonding of $R^{55}$ to $R^{56}$.

Examples of the group represented by formula (5-3) wherein $R^{55}$ and $R^{56}$ are each independently a linear alkyl group include dimethylamino, diethylamino, di(n-propyl)amino and di(n-butyl)amino groups. Examples of the group represented by formula (5-3) wherein $R^{55}$ and $R^{56}$ are each independently a trialkylsilyl group include bis(trimethylsilyl)amino and bis(tert-butyl-dimethylsilyl)amino groups. Examples of the group represented by formula (5-3) wherein $R^{55}$ is bonded to $R^{56}$ to form an alkylene group of 4 to 7 carbon atoms include 1-pyrrolidinyl, 1-piperidinyl and 1-hexamethyleneimino groups.

The substituted amino group for $A^5$ may be a group represented by formula (5-3). In formula (5-3), $R^{55}$ and $R^{56}$ may each independently be a hydrocarbyl or trihydrocarbylsilyl group, or they may be a hydrocarbylene group formed by bonding of $R^{55}$ to $R^{56}$.

The nitrogen atom-containing heterocyclic group as $A^5$ in formula (5) may be, for example, a nitrogen atom-containing aliphatic heterocyclic group or a nitrogen atom-containing aromatic heterocyclic group.

The nitrogen atom-containing heterocyclic group is a group resulting from removal of one hydrogen atom from among the hydrogen atoms bonded to carbon atoms on the nitrogen atom-containing heterocyclic ring. The nitrogen atom-containing heterocyclic ring means a heterocyclic ring containing a nitrogen atom as a heteroatom composing the ring. The nitrogen atom-containing aliphatic heterocyclic group means a group resulting from removal of one hydrogen atom from among the hydrogen atoms bonded to carbon atoms on the nitrogen atom-containing aliphatic heterocyclic ring. The nitrogen atom-containing alicyclic heterocyclic ring means an alicyclic heterocyclic ring containing a nitrogen atom as a heteroatom composing the ring. The nitrogen atom-containing aromatic heterocyclic group means a group resulting from removal of one hydrogen atom from among the hydrogen atoms bonded to carbon atoms on the nitrogen atom-containing aromatic heterocyclic ring. The nitrogen atom-containing aromatic heterocyclic ring means an aromatic heterocyclic ring containing a nitrogen atom as a heteroatom composing the ring.

Examples of the nitrogen atom-containing aliphatic heterocyclic group include alicyclic heterocyclic groups containing only a nitrogen atom, aliphatic heterocyclic groups containing a nitrogen atom and an oxygen atom, and aliphatic heterocyclic groups containing a nitrogen atom and a sulfur atom.

The aliphatic heterocyclic group containing only a nitrogen atom means a group resulting from removal of one hydrogen atom from among the hydrogen atoms bonded to carbon atoms on the aliphatic heterocyclic ring containing only a nitrogen atom. The aliphatic heterocyclic ring containing only a nitrogen atom means an aliphatic heterocyclic ring containing only a nitrogen atom as a heteroatom composing the ring. The aliphatic heterocyclic group containing a nitrogen atom and an oxygen atom means a group resulting from removal of one hydrogen atom from among the hydrogen atoms bonded to carbon atoms on an aliphatic heterocyclic ring containing a nitrogen atom and an oxygen atom. The aliphatic heterocyclic ring containing a nitrogen atom and an oxygen atom means an aliphatic heterocyclic ring containing a nitrogen atom and an oxygen atom as heteroatoms composing the ring. The aliphatic heterocyclic group containing a nitrogen atom and a sulfur atom means a group resulting from removal of one hydrogen atom from among the hydrogen atoms bonded to carbon atoms on an aliphatic heterocyclic ring containing a nitrogen atom and a sulfur atom. The aliphatic heterocyclic ring containing a nitrogen atom and a sulfur atom means an aliphatic heterocyclic ring containing a nitrogen atom and a sulfur atom as heteroatoms composing the ring.

Examples of the aliphatic heterocyclic group containing only a nitrogen atom include groups with an aziridine ring, groups with an azetidine ring, groups with a pyrrolidine ring, groups with a piperidine ring, groups with a hexamethyleneimine ring, groups with an imidazolidine ring, groups with a piperazine ring and groups with a pyrazolidine ring.

Examples of the group with an aziridine ring include 1-alkyl-2-aziridinyl groups. Examples of the group with an azetidine ring include 1-alkyl-2-azetidinyl and 1-alkyl-3-azetidinyl groups. Examples of the group with a pyrrolidine ring include 1-alkyl-2-pyrrolidinyl and 1-alkyl-3-pyrrolidinyl groups. Examples of the group with a piperidine ring include 1-alkyl-2-piperidinyl, 1-alkyl-3-piperidinyl and 1-alkyl-4-piperidinyl groups. Examples of the group with a hexamethyleneimine ring include 1-alkyl-2-hexamethyleneimino, 1-alkyl-3-hexamethyleneimino and 1-alkyl-4-hexamethyleneimino groups. Examples of the group with an imidazolidine ring include 1,3-dialkyl-2-imidazolidyl and 1,3-dialkyl-4-imidazolidyl groups. Examples of the group with a piperazine ring include 1,4-dialkyl-2-piperazinyl groups. Examples of the group with a pyrazolidine ring include 1,2-dialkyl-3-pyrazolidyl and 1,2-dialkyl-4-pyrazolidyl groups.

Examples of the aliphatic heterocyclic group containing a nitrogen atom and an oxygen atom include groups with a morpholine ring and groups with an isooxazolidine ring.

Examples of the group with a morpholine ring include 4-alkyl-2-morpholino and 4-alkyl-3-morpholino groups. Examples of the group with an isooxazolidine ring include 2-alkyl-3-isooxazolidinyl, 2-alkyl-4-isooxazolidinyl and 2-alkyl-5-isooxazolidinyl groups.

Examples of the aliphatic heterocyclic group containing a nitrogen atom and a sulfur atom include groups with a thiomorpholine ring and groups with an isothiazolidine ring.

Examples of the group with a thiomorpholine ring include 4-alkyl-2-thiomorpholino and 4-alkyl-3-thiomorpholino groups.

Examples of the group with an isothiazolidine ring include 2-alkyl-3-isothiazolidinyl, 2-alkyl-4-isothiazolidinyl and 2-alkyl-5-isothiazolidinyl groups.

The aliphatic heterocyclic group containing a nitrogen atom may be a group containing only a nitrogen atom. The number of carbon atoms of an aliphatic heterocyclic group containing a nitrogen atom may be 4 to 10.

Examples of the nitrogen atom-containing aromatic heterocyclic group include aromatic heterocyclic groups containing only a nitrogen atom, aromatic heterocyclic groups containing a nitrogen atom and an oxygen atom, and aromatic heterocyclic groups containing a nitrogen atom and a sulfur atom.

The aromatic heterocyclic group containing only a nitrogen atom means a group resulting from removal of one hydrogen atom from among the hydrogen atoms bonded to carbon atoms on the aromatic heterocyclic ring containing only a nitrogen atom. The aromatic heterocyclic ring containing only a nitrogen atom means an aromatic heterocyclic ring containing only a nitrogen atom as a heteroatom composing the ring.

The aromatic heterocyclic group containing a nitrogen atom and an oxygen atom means a group resulting from removal of one hydrogen atom from among the hydrogen atoms bonded to carbon atoms on an aromatic heterocyclic ring containing a nitrogen atom and an oxygen atom. The aromatic heterocyclic ring containing a nitrogen atom and an oxygen atom means an aromatic heterocyclic ring containing a nitrogen atom and an oxygen atom as heteroatoms composing the ring. The aromatic heterocyclic group containing a nitrogen atom and a sulfur atom means a group resulting from removal of one hydrogen atom from among the hydrogen atoms bonded to carbon atoms on an aromatic heterocyclic ring containing only a nitrogen atom and a sulfur atom. The aromatic heterocyclic ring containing a nitrogen atom and a sulfur atom is an aromatic heterocyclic ring containing a nitrogen atom and a sulfur atom as heteroatoms composing the ring.

Examples of the aromatic heterocyclic group containing only a nitrogen atom include groups with a pyrrole ring, groups with an imidazole ring, groups with a pyrazole ring, groups with a pyridine ring, groups with a pyridazine ring, groups with a pyrimidine ring, groups with a pyrazine ring, groups with a quinoline ring, groups with an isoquinoline ring, groups with a cinnoline ring, groups with a quinazoline ring and groups with a phthalazine ring.

Examples of the group with a pyrrole ring include 2-pyrrolyl, 3-pyrrolyl, 1-alkyl-2-pyrrolyl and 1-alkyl-3-pyrrolyl groups.

Examples of the group with an imidazole ring include 2-imidazolyl, 4-imidazolyl, 5-imidazolyl, 1-alkyl-2-imidazolyl, 1-alkyl-4-imidazolyl and 1-alkyl-5-imidazolyl groups.

Examples of the group with a pyrazole ring include 3-pyrazolyl, 4-pyrazolyl, 5-pyrazolyl, 1-alkyl-3-pyrazolyl, 1-alkyl-4-pyrazolyl and 1-alkyl-5-pyrazolyl groups.

Examples of the group with a pyridine ring include 2-pyridyl, 3-pyridyl and 4-pyridyl groups.

Examples of the group with a pyridazine ring include 3-pyridazyl and 4-pyridazyl groups.

Examples of the group with a pyrimidine ring include 2-pyrimidyl, 4-pyrimidyl and 5-pyrimidyl groups.

Examples of the group with a pyrazine ring include a 2-pyrazyl group.

Examples of the group with a quinoline ring include 2-quinolyl, 3-quinolyl, 4-quinolyl, 5-quinolyl, 6-quinolyl, 7-quinolyl and 8-quinolyl groups.

Examples of the group with an isoquinoline ring include 1-isoquinolyl, 3-isoquinolyl, 4-isoquinolyl, 5-isoquinolyl, 6-isoquinolyl, 7-isoquinolyl and 8-isoquinolyl groups.

Examples of the group with a cinnoline ring include 3-cinnolinyl, 4-cinnolinyl, 5-cinnolinyl, 6-cinnolinyl, 7-cinnolinyl and 8-cinnolinyl groups.

Examples of the group with a quinazoline ring include 2-quinazolinyl, 4-quinazolinyl, 5-quinazolinyl, 6-quinazolinyl, 7-quinazolinyl and 8-quinazolinyl groups.

Examples of the group with a phthalazine ring include 1-phthaladinyl, 5-phthaladinyl and 6-phthaladinyl groups.

The aromatic heterocyclic group containing only a nitrogen atom may be a group with an imidazole ring, a group with a pyridine ring or a group with a quinoline ring.

Examples of the aromatic heterocyclic group containing a nitrogen atom and an oxygen atom include groups with an oxazole ring and groups with an isooxazole ring.

Examples of the group with an oxazole ring include 2-oxazolyl, 4-oxazolyl and 5-oxazolyl groups.

Examples of the group with an isooxazole ring include 3-isooxazolyl, 4-isooxazolyl and 5-isooxazolyl groups.

The aromatic heterocyclic group containing a nitrogen atom and an oxygen atom may be a group with an oxazole ring.

Examples of the aromatic heterocyclic group containing a nitrogen atom and a sulfur atom include groups with a thiazole ring and groups with an isothiazole ring.

Examples of the group with a thiazole ring include 2-thiazolyl, 4-thiazolyl and 5-thiazolyl groups.

Examples of the group with an isothiazole ring include 3-isothiazolyl, 4-isothiazolyl and 5-isothiazolyl.

The aromatic heterocyclic group containing a nitrogen atom and a sulfur atom may be a group with a thiazole ring.

The aromatic heterocyclic group containing a nitrogen atom may be an aromatic heterocyclic group containing only a nitrogen atom, or it may be a group with an imidazole ring, a group with a pyridine ring, a group with a quinoline ring, or may be a group with a pyridine ring.

The compound represented by formula (5) may be a compound represented by the following formula (5-4), which is a group wherein $R^5$ is represented by formula (5-1a).

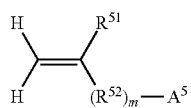

(5-4)

In formula (5-4), $A^5$ has the same definition as $A^5$ in formula (5), and m, $R^{51}$ and $R^{52}$ have the same respective definitions as m, $R^{51}$ and $R^{52}$ in formula (5-1).

Compounds represented by formula (5-4), wherein $R^{51}$ is a hydrogen atom, m is 0 and $A^5$ is a substituted amino group, include the following compounds.
1-Vinylpyrrolidine,
1-vinylpiperidine,
1-vinylhexamethyleneimine,
1-vinylpiperazine,
1-vinylpyrrole, and
1-vinylimidazole.

Compounds represented by formula (5-4), wherein $R^{51}$ is a hydrogen atom, m is 1, $R^{52}$ is a phenylene group and $A^5$ is a substituted amino group, include the following compounds.
4-Dimethylaminostyrene,
4-diethylaminostyrene,
4-dipropylaminostyrene,
4-dibutylaminostyrene,
4-diallylaminostyrene,
4-bis(trimethylsilyl)aminostyrene,
4-bis(tert-butyl-dimethylsilyl)aminostyrene,
4-(1-aziridinyl)styrene,
4-(1-pyrrolidinyl)styrene,
4-(1-piperidinyl)styrene,
4-(1-hexamethyleneimino)styrene,
3-dimethylaminostyrene,
3-diethylaminostyrene,
3-dipropylaminostyrene,
3-dibutylaminostyrene,
3-diallylaminostyrene,
3-bis(trimethylsilyl)aminostyrene,
3-bis(tert-butyl-dimethylsilyl)aminostyrene,
3-(1-aziridinyl)styrene,
3-(1-pyrrolidinyl)styrene,
3-(1-piperidinyl)styrene, and
3-(1-hexamethyleneimino)styrene.

Compounds represented by formula (5-4), wherein $R^{51}$ is a hydrogen atom, m is 1, $R^{52}$ is a para-phenylene-alkylene group and $A^5$ is a substituted amino group, include the following compounds.
4-(Dimethylaminomethyl)styrene,
4-(diethylaminomethyl)styrene,
4-(dipropylaminomethyl)styrene,
4-(dibutylaminomethylstyrene,
4-(diallylaminomethyl)styrene,
4-[bis(trimethylsilyl)aminomethyl]styrene,
4-[bis(tert-butyl-dimethylsilyl)aminomethyl]styrene,
4-(1-aziridinyl)methylstyrene,
4-(1-pyrrolidinyl)methylstyrene,
4-(1-piperidinyl)methylstyrene, and
4-(1-hexamethyleneimino)methylstyrene.

Compounds represented by formula (5-4), wherein $R^{51}$ is a hydrogen atom, m is 2, $R^{52}$ is a para-phenylene-alkylene group and $A^5$ is a substituted amino group, include the following compounds.
4-[2-(Dimethylamino)ethyl]styrene,
4-[2-(diethylamino)ethyl]styrene,
4-[2-(dipropylamino)ethyl]styrene,
4-[2-(dibutylamino)ethyl]styrene,
4-[2-(diallylamino)ethyl]styrene,
4-{2-[bis(trimethylsilyl)amino]ethyl}styrene,
4-{2-[bis(tert-butyl-dimethylsilyl)amino]ethyl}styrene,
4-[2-(1-aziridinyl)ethyl]styrene,
4-[2-(1-pyrrolidinyl)ethyl]styrene,
4-[2-(1-piperidinyl)ethyl]styrene, and
4-[2-(1-hexamethyleneimino)ethyl]styrene.

Compounds represented by formula (5-4), wherein $R^{51}$ is a hydrogen atom, m is 1, $R^{52}$ is a meta-phenylene-alkylene group and $A^5$ is a substituted amino group, include the following compounds.
3-(Dimethylaminomethyl)styrene,
3-(diethylaminomethyl)styrene,
3-(dipropylaminomethyl)styrene,
3-(dibutylaminomethylstyrene,
3-(diallylaminomethyl)styrene,
3-[bis(trimethylsilyl)aminomethyl]styrene,
3-[bis(tert-butyl-dimethylsilyl)aminomethyl]styrene,
3-(1-aziridinyl)methylstyrene,
3-(1-pyrrolidinyl)methylstyrene,
3-(1-piperidinyl)methylstyrene, and
3-(1-hexamethyleneimino)methylstyrene.

Compounds represented by formula (5-4), wherein $R^{51}$ is a hydrogen atom, m is 2, $R^{52}$ is a meta-phenylene-alkylene group and $A^5$ is a substituted amino group, include the following compounds.
3-[2-(Dimethylamino)ethyl]styrene,
3-[2-(diethylamino)ethyl]styrene,
3-[2-(dipropylamino)ethyl]styrene,
3-[2-(dibutylamino)ethyl]styrene,
3-[2-(diallylamino)ethyl]styrene,
3-{2-[bis(trimethylsilyl)amino]ethyl}styrene,
3-{2-[bis(tert-butyl-dimethylsilyl)amino]ethyl}styrene,
3-[2-(1-aziridinyl)ethyl]styrene,
3-[2-(1-pyrrolidinyl)ethyl]styrene,
3-[2-(1-piperidinyl)ethyl]styrene, and
3-[2-(1-hexamethyleneimino)ethyl]styrene.

Compounds represented by formula (5-4), wherein $R^{51}$ is a methyl group, m is 0 and $A^5$ is a substituted amino group, include the following compounds.
1-Isopropenylpyrrolidine,
1-isopropenylpiperidine,
1-isopropenylhexamethyleneimine,
1-isopropenylpiperazine,
1-isopropenylpyrrole, and
1-isopropenylimidazole.

Compounds represented by formula (5-4), wherein $R^{51}$ is a methyl group, m is 1, $R^{52}$ is a phenylene group and $A^5$ is a substituted amino group, include the following compounds.
4-Dimethylamino-1-isopropenylbenzene,
4-diethylamino-1-isopropenylbenzene,
4-(dipropylamino)-1-isopropenylbenzene, 4-(dibutylamino)-1-isopropenylbenzene,
4-diallylamino-1-isopropenylbenzene,
4-bis(trimethylsilyl)amino-1-isopropenylbenzene,
4-bis(tert-butyl-dimethylsilyl)amino-1-isopropenylbenzene,
4-(1-aziridinyl)-1-isopropenylbenzene,
4-(1-pyrrolidinyl)-1-isopropenylbenzene,
4-(1-piperidinyl)-1-isopropenylbenzene,
4-(1-hexamethyleneimino)-1-isopropenylbenzene,
3-dimethylamino-1-isopropenylbenzene,
3-diethylamino-1-isopropenylbenzene,
3-dipropylamino-1-isopropenylbenzene,
3-dibutylamino-1-isopropenylbenzene,
3-diallylamino-1-isopropenylbenzene,
3-bis(trimethylsilyl)amino-1-isopropenylbenzene,
3-bis(tert-butyl-dimethylsilyl)amino-1-isopropenylbenzene,
3-(1-aziridinyl)-1-isopropenylbenzene,
3-(1-pyrrolidinyl)-1-isopropenylbenzene,
3-(1-piperidinyl)-1-isopropenylbenzene, and
3-(1-hexamethyleneimino)-1-isopropenylbenzene.

Compounds represented by formula (5-4), wherein $R^{51}$ is a methyl group, m is 1, $R^{52}$ is a para-phenylene-alkylene group and $A^5$ is a substituted amino group, include the following compounds.
4-Dimethylaminomethyl-1-isopropenylbenzene,
4-diethylaminomethyl-1-isopropenylbenzene,
4-di-n-propylaminomethyl-1-isopropenylbenzene,
4-di-n-butylaminomethyl-1-isopropenylbenzene,
4-diallylaminomethyl-1-isopropenylbenzene,
4-bis(trimethylsilyl)aminomethyl-1-isopropenylbenzene,
4-bis(tert-butyl-dimethylsilyl)aminomethyl-1-isopropenylbenzene,
4-(1-aziridinyl)methyl-1-isopropenylbenzene,
4-(1-pyrrolidinyl)methyl-1-isopropenylbenzene,
4-(1-piperidinyl)methyl-1-isopropenylbenzene, and
4-(1-hexamethyleneimino)methyl-1-isopropenylbenzene.

Compounds represented by formula (5-4), wherein $R^{51}$ is a methyl group, m is 2, $R^{52}$ is a para-phenylene-alkylene group and $A^5$ is a substituted amino group, include the following compounds.
4-[2-(Dimethylamino)ethyl]-1-isopropenylbenzene,
4-[2-(diethylamino)ethyl]-1-isopropenylbenzene,
4-[2-(dipropylamino)ethyl]-1-isopropenylbenzene,
4-[2-(dibutylamino)ethyl]-1-isopropenylbenzene,
4-[2-(diallylamino)ethyl]-1-isopropenylbenzene,
4-{2-[bis(trimethylsilyl)amino]ethyl}-1-isopropenylbenzene,
4-{2-[bis(tert-butyl-dimethylsilyl)amino]ethyl}-1-isopropenylbenzene,
4-[2-(1-aziridinyl)ethyl]-1-isopropenylbenzene,
4-[2-(1-pyrrolidinyl)ethyl]-1-isopropenylbenzene,
4-[2-(1-piperidinyl)ethyl]-1-isopropenylbenzene, and
4-[2-(1-hexamethyleneimino)ethyl]-1-isopropenylbenzene.

Compounds represented by formula (5-4), wherein $R^{51}$ is a methyl group, m is 1, $R^{52}$ is a meta-phenylene-alkylene group and $A^5$ is a substituted amino group, include the following compounds.
3-Dimethylaminomethyl-1-isopropenylbenzene,
3-diethylaminomethyl-1-isopropenylbenzene,
3-dipropylaminomethyl-1-isopropenylbenzene,
3-dibutylaminomethyl-1-isopropenylbenzene,
3-diallylaminomethyl-1-isopropenylbenzene,
3-bis(trimethylsilyl)aminomethyl-1-isopropenylbenzene,
3-bis(tert-butyl-dimethylsilyl)aminomethyl-1-isopropenylbenzene,
3-(1-aziridinyl)methyl-1-isopropenylbenzene,
3-(1-pyrrolidinyl)methyl-1-isopropenylbenzene,
3-(1-piperidinyl)methyl-1-isopropenylbenzene, and
3-(1-hexamethyleneimino)methyl-1-isopropenylbenzene.

Compounds represented by formula (5-4), wherein $R^{51}$ is a methyl group, m is 2, $R^{52}$ is a meta-phenylene-alkylene group and $A^5$ is a substituted amino group, include the following compounds.
3-[2-(Dimethylamino)ethyl]-1-isopropenylbenzene,
3-[2-(diethylamino)ethyl]-1-isopropenylbenzene,
3-[2-(dipropylamino)ethyl]-1-isopropenylbenzene,
3-[2-(di-n-butylamino)ethyl]-1-isopropenylbenzene,
3-[2-(diallylamino)ethyl]-1-isopropenylbenzene,
3-{2-[bis(trimethylsilyl)amino]ethyl}-1-isopropenylbenzene,
3-{2-[bis(tert-butyl-dimethylsilyl)amino]ethyl}-1-isopropenylbenzene,
3-[2-(1-aziridinyl)ethyl]-1-isopropenylbenzene,
3-[2-(1-pyrrolidinyl)ethyl]-1-isopropenylbenzene,
3-[2-(1-piperidinyl)ethyl]-1-isopropenylbenzene, and
3-[2-(1-hexamethyleneimino)ethyl]-1-isopropenylbenzene.

Compounds represented by formula (5-4), wherein $R^{51}$ is a vinyl group, m is 0 and $A^5$ is a substituted amino group, include the following compounds.
2-Dimethylamino-1,3-butadiene,
2-diethylamino-1,3-butadiene,
2-(dipropylamino)-1,3-butadiene,
2-(dibutylamino)-1,3-butadiene,
2-diallylamino-1,3-butadiene,
2-[bis(trimethylsilyl)amino]-1,3-butadiene,
2-[bis(tert-butyl-dimethylsilyl)amino]-1,3-butadiene,
2-(1-aziridinyl)-1,3-butadiene,
2-(1-pyrrolidinyl)-1,3-butadiene,
2-(1-piperidinyl)-1,3-butadiene,
2-(1-hexamethyleneimino)-1,3-butadiene,
2-(1-pyrrolyl)-1,3-butadiene, and
2-(1-imidazolyl)-1,3-butadiene.

Compounds represented by formula (5-4), wherein $R^{51}$ is a vinyl group, m is 1, $R^{52}$ is an alkylene group (for example, a methylene or ethylene group), and $A^5$ is a substituted amino group, include the following compounds.
2-Dimethylaminomethyl-1,3-butadiene,
2-diethylaminomethyl-1,3-butadiene,
2-(di-n-propylaminomethyl)-1,3-butadiene,
2-(di-n-butylaminomethyl)-1,3-butadiene,
2-diallylaminomethyl-1,3-butadiene,
2-[bis(trimethylsilyl)aminomethyl]-1,3-butadiene,
2-[bis(tert-butyl-dimethylsilyl)aminomethyl]-1,3-butadiene,
2-[(1-aziridinyl)methyl]-1,3-butadiene,
2-[(1-pyrrolidinyl)methyl]-1,3-butadiene,
2-[(1-piperidinyl)methyl]-1,3-butadiene,
2-[(1-hexamethyleneimino)methyl]-1,3-butadiene,
1-(2-methylene-3-butenyl)pyrrole,
1-(2-methylene-3-butenyl)imidazole,
5-dimethylamino-3-methylene-1-pentene,
5-diethylamino-3-methylene-1-pentene,
5-(di-n-propylamino)-3-methylene-1-pentene,
5-(di-n-butylamino)-3-methylene-1-pentene,
5-diallylamino-3-methylene-1-pentene,
5-bis(trimethylsilyl)amino-3-methylene-1-pentene,
5-bis(tert-butyl-dimethylsilyl)amino-3-methylene-1-pentene,
5-(1-aziridinyl)-3-methylene-1-pentene,
5-(1-pyrrolidinyl)-3-methylene-1-pentene,
5-(1-piperidinyl)-3-methylene-1-pentene,
5-(1-hexamethyleneimino)-3-methylene-1-pentene,
1-(3-methylene-4-pentenyl)pyrrole, and
1-(3-methylene-4-pentenyl)imidazole.

Compounds represented by formula (5-4), wherein $R^{51}$ is a phenyl group, m is 1, $R^{52}$ is a phenylene group and $A^5$ is a substituted amino group, include the following compounds.
1-(4-Dimethylaminophenyl)-1-phenylethylene,
1-(4-diethylaminophenyl)-1-phenylethylene,
1-(4-dipropylaminophenyl)-1-phenylethylene,
1-(4-diisopropylaminophenyl)-1-phenylethylene,
1-(4-dibutylaminophenyl)-1-phenylethylene,
1-(4-diisobutylaminophenyl)-1-phenylethylene,
1-(4-di-tert-butylaminophenyl)-1-phenylethylene,
1-(4-diphenylaminophenyl)-1-phenylethylene,
1-[4-(1-aziridinyl)phenyl]-1-phenylethylene,
1-[4-(1-pyrrolidinyl)phenyl]-1-phenylethylene,
1-[4-(1-piperidinyl)phenyl]-1-phenylethylene,
1-[4-(1-hexamethyleneimino)phenyl]-1-phenylethylene,
1-(4-morpholinophenyl)-1-phenylethylene,
1-{4-[bis(trimethylsilyl)amino]phenyl}-1-phenylethylene,
1-{4-[bis(tert-butyl-dimethylsilyl)amino]phenyl}-1-phenylethylene,
1-{4-[bis(triisopropylsilyl)amino]phenyl}-1-phenylethylene,
1-(3-dimethylaminophenyl)-1-phenylethylene,
1-(3-diethylaminophenyl)-1-phenylethylene,
1-(3-dipropylaminophenyl)-1-phenylethylene,
1-(3-diisopropylaminophenyl)-1-phenylethylene,
1-(3-dibutylaminophenyl)-1-phenylethylene,
1-(3-diisobutylaminophenyl)-1-phenylethylene,
1-(3-di-tert-butylaminophenyl)-1-phenylethylene,
1-(3-diphenylaminophenyl)-1-phenylethylene,
1-[3-(1-aziridinyl)phenyl]-1-phenylethylene,
1-[3-(1-pyrrolidinyl)phenyl]-1-phenylethylene,
1-[3-(1-piperidinyl)phenyl]-1-phenylethylene,
1-[3-(1-hexamethyleneimino)phenyl]-1-phenylethylene,
1-(3-morpholinophenyl)-1-phenylethylene,
1-{3-[bis(trimethylsilyl)amino]phenyl}-1-phenylethylene,
1-{3-[bis(tert-butyl-dimethylsilyl)amino]phenyl}-1-phenylethylene, and
1-{3-[bis(triisopropylsilyl)amino]phenyl}-1-phenylethylene.

Compounds represented by formula (5-4), wherein $R^{51}$ is a phenyl group, m is 1, $R^{52}$ is a para-phenylene-alkylene group and $A^5$ is a substituted amino group, include the following compounds.
1-[4-(Dimethylaminomethyl)phenyl]-1-phenylethylene,
1-[4-(diethylaminomethyl)phenyl]-1-phenylethylene,
1-[4-(dipropylaminomethyl)phenyl]-1-phenylethylene,
1-[4-(diisopropylaminomethyl)phenyl]-1-phenylethylene,
1-[4-(dibutylaminomethyl)phenyl]-1-phenylethylene,
1-[4-(diisobutylaminomethyl)phenyl]-1-phenylethylene,
1-[4-(di-tert-butylaminomethyl)phenyl]-1-phenylethylene,
1-[4-(diphenylaminomethyl)phenyl]-1-phenylethylene,
1-[4-(1-aziridinylmethyl)phenyl]-1-phenylethylene,
1-[4-(1-pyrrolidinylmethyl)phenyl]-1-phenylethylene,
1-[4-(1-piperidinylmethyl)phenyl]-1-phenylethylene,
1-[4-(1-hexamethyleneiminomethyl)phenyl]-1-phenylethylene,
1-(4-morpholinomethylphenyl)-1-phenylethylene,
1-{4-[bis(trimethylsilyl)aminomethyl]phenyl}-1-phenylethylene,
1-{4-[bis(tert-butyl-dimethylsilyl)aminomethyl]phenyl}-1-phenylethylene, and
1-{4-[bis(triisopropylsilyl)aminomethyl]phenyl}-1-phenylethylene.

Compounds represented by formula (5-4), wherein $R^{51}$ is a phenyl group, m is 1, $R^{52}$ is a meta-phenylene-alkylene group and $A^5$ is a substituted amino group, include the following compounds.
1-[3-(Dimethylaminomethyl)phenyl]-1-phenylethylene,
1-[3-(diethylaminomethyl)phenyl]-1-phenylethylene,
1-[3-(dipropylaminomethyl)phenyl]-1-phenylethylene,
1-[3-(diisopropylaminomethyl)phenyl]-1-phenylethylene,
1-[3-(dibutylaminomethyl)phenyl]-1-phenylethylene,
1-[3-(diisobutylaminomethyl)phenyl]-1-phenylethylene,
1-[3-(di-tert-butylaminomethyl)phenyl]-1-phenylethylene,
1-[3-(diphenylaminomethyl)phenyl]-1-phenylethylene,
1-[3-(1-aziridinylmethyl)phenyl]-1-phenylethylene,
1-[3-(1-pyrrolidinylmethyl)phenyl]-1-phenylethylene,
1-[3-(1-piperidinylmethyl)phenyl]-1-phenylethylene,
1-[3-(1-hexamethyleneiminomethyl)phenyl]-1-phenylethylene,
1-(3-morpholinomethylphenyl)-1-phenylethylene,
1-{3-[bis(trimethylsilyl)aminomethyl]phenyl}-1-phenylethylene,
1-{3-[bis(tert-butyl-dimethylsilyl)aminomethyl]phenyl}-1-phenylethylene, and
1-{3-[bis(triisopropylsilyl)aminomethyl]phenyl}-1-phenylethylene.

Compounds represented by formula (5-4), wherein $R^{51}$ is a hydrogen atom, m is 0 and $A^5$ is a nitrogen atom-containing aliphatic heterocyclic group, include the following compounds.
1-Methyl-3-vinylpyrrolidine,
1-methyl-4-vinylpiperidine,
1-methyl-3-vinylhexamethyleneimine, and
1-methyl-4-vinylhexamethyleneimine.

Compounds represented by formula (5-4), wherein $R^{51}$ is a hydrogen atom, m is 1, $R^{52}$ is a phenylene group and $A^5$ is a nitrogen atom-containing aliphatic heterocyclic group, include the following compounds.
1-Methyl-3-(4-vinylphenyl)pyrrolidine,
1-methyl-4-(4-vinylphenyl)piperidine,
1-methyl-3-(4-vinylphenyl)hexamethyleneimine,
1-methyl-4-(4-vinylphenyl)hexamethyleneimine,
1-methyl-3-(3-vinylphenyl)pyrrolidine,
1-methyl-4-(3-vinylphenyl)piperidine,
1-methyl-3-(3-vinylphenyl)hexamethyleneimine, and
1-methyl-4-(3-vinylphenyl)hexamethyleneimine.

Compounds represented by formula (5-4), wherein $R^{51}$ is a hydrogen atom, m is 1, $R^{52}$ is a para-phenylene-alkylene group and $A^5$ is a nitrogen atom-containing aliphatic heterocyclic group, include the following compounds.
1-Methyl-3-(4-vinylphenylmethyl)pyrrolidine,
1-methyl-4-(4-vinylphenylmethyl)piperidine,
1-methyl-3-(4-vinylphenylmethyl)hexamethyleneimine, and
1-methyl-4-(4-vinylphenylmethyl)hexamethyleneimine.

Compounds represented by formula (5-4), wherein $R^{51}$ is a hydrogen atom, m is 2, $R^{52}$ is a para-phenylene-alkylene group and $A^5$ is a nitrogen atom-containing aliphatic heterocyclic group, include the following compounds.
1-Methyl-3-[2-(4-vinylphenyl)ethyl]pyrrolidine,
1-methyl-4-[2-(4-vinylphenyl)ethyl]piperidine,
1-methyl-3-[2-(4-vinylphenyl)ethyl]hexamethyleneimine, and
1-methyl-4-[2-(4-vinylphenyl)ethyl]hexamethyleneimine.

Compounds represented by formula (5-4), wherein $R^{51}$ is a hydrogen atom, m is 1, $R^{52}$ is a meta-phenylene-alkylene group and $A^5$ is a nitrogen atom-containing aliphatic heterocyclic group, include the following compounds.

1-Methyl-3-(3-vinylphenylmethyl)pyrrolidine,
1-methyl-4-(3-vinylphenylmethyl)piperidine,
1-methyl-3-(3-vinylphenylmethyl)hexamethyleneimine, and
1-methyl-4-(3-vinylphenylmethyl)hexamethyleneimine.

Compounds represented by formula (5-4), wherein $R^{51}$ is a hydrogen atom, m is 2, $R^{52}$ is a meta-phenylene-alkylene group and $A^5$ is a nitrogen atom-containing aliphatic heterocyclic group, include the following compounds.
1-Methyl-3-[2-(3-vinylphenyl)ethyl]pyrrolidine,
1-methyl-4-[2-(3-vinylphenyl)ethyl]piperidine,
1-methyl-3-[2-(3-vinylphenyl)ethyl]hexamethyleneimine, and
1-methyl-4-[2-(3-vinylphenyl)ethyl]hexamethyleneimine.

Compounds represented by formula (5-4), wherein $R^{51}$ is a methyl group, m is 0 and $A^5$ is a nitrogen atom-containing aliphatic heterocyclic group, include the following compounds.
1-Methyl-3-isopropenylpyrrolidine,
1-methyl-4-isopropenylpiperidine,
1-methyl-3-isopropenylhexamethyleneimine, and
1-methyl-4-isopropenylhexamethyleneimine.

Compounds represented by formula (5-4), wherein $R^{51}$ is a methyl group, m is 1, $R^{52}$ is a phenylene group and $A^5$ is a nitrogen atom-containing aliphatic heterocyclic group, include the following compounds.
1-Methyl-3-(4-isopropenylphenyl)pyrrolidine,
1-methyl-4-(4-isopropenylphenyl)piperidine,
1-methyl-3-(4-isopropenylphenyl)hexamethyleneimine, and
1-methyl-4-(4-isopropenylphenyl)hexamethyleneimine.

Compounds represented by formula (5-4), wherein $R^{51}$ is a methyl group, m is 1, $R^{52}$ is a para-phenylene-alkylene group and $A^5$ is a nitrogen atom-containing aliphatic heterocyclic group, include the following compounds.
1-Methyl-3-(4-isopropenylphenylmethyl)pyrrolidine,
1-methyl-4-(4-isopropenylphenylmethyl)piperidine,
1-methyl-3-(4-isopropenylphenylmethyl)hexamethyleneimine, and
1-methyl-4-(4-isopropenylphenylmethyl)hexamethyleneimine.

Compounds represented by formula (5-4), wherein $R^{51}$ is a methyl group, m is 2, $R^{52}$ is a para-phenylene-alkylene group and $A^5$ is a nitrogen atom-containing aliphatic heterocyclic group, include the following compounds.
1-Methyl-3-[2-(4-isopropenylphenyl)ethyl]pyrrolidine,
1-methyl-4-[2-(4-isopropenylphenyl)ethyl]piperidine,
1-methyl-3-[2-(4-isopropenylphenyl)ethyl]hexamethyleneimine, and
1-methyl-4-[2-(4-isopropenylphenyl)ethyl]hexamethyleneimine.

Compounds represented by formula (5-4), wherein $R^{51}$ is a vinyl group, m is 0 and $A^5$ is a nitrogen atom-containing aliphatic heterocyclic group, include the following compounds.
1-Methyl-3-(1-methylene-2-propenyl)pyrrolidine,
1-methyl-4-(1-methylene-2-propenyl)piperidine,
1-methyl-3-(1-methylene-2-propenyl)hexamethyleneimine, and
1-methyl-4-(1-methylene-2-propenyl)hexamethyleneimine.

Compounds represented by formula (5-4), wherein $R^{51}$ is a vinyl group, m is 1, $R^{52}$ is an alkylene group (for example, a methylene or ethylene group), and $A^5$ is a nitrogen atom-containing aliphatic heterocyclic group, include the following compounds.
1-Methyl-3-(2-methylene-3-butenyl)pyrrolidine,
1-methyl-4-(2-methylene-3-butenyl)piperidine,
1-methyl-3-(2-methylene-3-butenyl)hexamethyleneimine,
1-methyl-4-(2-methylene-3-butenyl)hexamethyleneimine,
1-methyl-3-(3-methylene-4-pentenyl)pyrrolidine,
1-methyl-4-(3-methylene-4-pentenyl)piperidine,
1-methyl-3-(3-methylene-4-pentenyl)hexamethyleneimine, and
1-methyl-4-(3-methylene-4-pentenyl)hexamethyleneimine.

Compounds represented by formula (5-4), wherein $R^{51}$ is a phenyl group, m is 1, $R^{52}$ is a phenylene group and $A^5$ is a nitrogen atom-containing aliphatic heterocyclic group, include the following compounds.
1-[4-(1-Methyl-3-pyrrolidinyl)phenyl]-1-phenylethylene,
1-[4-(1-methyl-3-piperidinyl)phenyl]-1-phenylethylene,
1-[4-(1-methyl-4-piperidinyl)phenyl]-1-phenylethylene,
1-[4-(1-methyl-3-hexamethyleneimino)phenyl]-1-phenylethylene,
1-[4-(1-methyl-4-hexamethyleneimino)phenyl]-1-phenylethylene,
1-[3-(1-methyl-3-pyrrolidinyl)phenyl]-1-phenylethylene,
1-[3-(1-methyl-3-piperidinyl)phenyl]-1-phenylethylene,
1-[3-(1-methyl-4-piperidinyl)phenyl]-1-phenylethylene,
1-[3-(1-methyl-3-hexamethyleneimino)phenyl]-1-phenylethylene, and
1-[3-(1-methyl-4-hexamethyleneimino)phenyl]-1-phenylethylene.

Compounds represented by formula (5-4), wherein $R^{51}$ is a phenyl group, m is 1, $R^{52}$ is a para-phenylene-alkylene group and $A^5$ is a nitrogen atom-containing aliphatic heterocyclic group, include the following compounds.
1-{4-[(1-Methyl-3-pyrrolidinyl)methyl]phenyl}-1-phenylethylene,
1-{4-[(1-methyl-3-piperidinyl)methyl]phenyl}-1-phenylethylene,
1-{4-[(1-methyl-4-piperidinyl)methyl]phenyl}-1-phenylethylene, and
1-{4-[(1-methyl-3-hexamethyleneimino)methyl]phenyl}-1-phenylethylene.

Compounds represented by formula (5-4), wherein $R^{51}$ is a phenyl group, m is 1, $R^{52}$ is a meta-phenylene-alkylene group and $A^5$ is a nitrogen atom-containing aliphatic heterocyclic group, include the following compounds.
1-{3-[(1-Methyl-3-pyrrolidinyl)methyl]phenyl}-1-phenylethylene,
1-{3-[(1-methyl-3-piperidinyl)methyl]phenyl}-1-phenylethylene,
1-{3-[(1-methyl-4-piperidinyl)methyl]phenyl}-1-phenylethylene, and
1-{3-[(1-methyl-3-hexamethyleneimino)methyl]phenyl}-1-phenylethylene.

Compounds represented by formula (5-4), wherein $R^{51}$ is a hydrogen atom, m is 0 and $A^5$ is a nitrogen atom-containing aromatic heterocyclic group, include the following compounds.
1-Methyl-2-vinylimidazole,
1-methyl-4-vinylimidazole,
1-methyl-5-vinylimidazole,
2-vinylpyridine,
3-vinylpyridine,
4-vinylpyridine,
2-vinylquinoline,
3-vinylquinoline, and
4-vinylquinoline.

Compounds represented by formula (5-4), wherein $R^{51}$ is a methyl group, m is 0 and $A^5$ is a nitrogen atom-containing aromatic heterocyclic group, include the following compounds.
1-Methyl-2-isopropenylimidazole,
1-methyl-4-isopropenylimidazole, 1-methyl-5-isopropenylimidazole,
2-isopropenylpyridine,
3-isopropenylpyridine,
4-isopropenylpyridine,
2-isopropenylquinoline,
3-isopropenylquinoline, and
4-isopropenylquinoline.

Compounds represented by formula (5-4), wherein $R^{51}$ is a vinyl group, m is 0 and $A^5$ is a nitrogen atom-containing aromatic heterocyclic group, include the following compounds.
1-Methyl-2-(1-methylene-2-propenyl)imidazole,
1-methyl-4-(1-methylene-2-propenyl)imidazole,
1-methyl-5-(1-methylene-2-propenyl)imidazole,
2-(1-methylene-2-propenyl)pyridine,
3-(1-methylene-2-propenyl)pyridine,
4-(1-methylene-2-propenyl)pyridine,
2-(1-methylene-2-propenyl)quinoline,
3-(1-methylene-2-propenyl)quinoline, and
4-(1-methylene-2-propenyl)quinoline.

Compounds represented by formula (5-4), wherein $R^{51}$ is a vinyl group, m is 1, $R^{52}$ is an alkylene group (for example, a methylene or ethylene group), and $A^5$ is a nitrogen atom-containing aromatic heterocyclic group, include the following compounds.
1-Methyl-2-(2-methylene-3-butenyl)imidazole,
1-methyl-4-(2-methylene-3-butenyl)imidazole,
1-methyl-5-(2-methylene-3-butenyl)imidazole,
2-(2-methylene-3-butenyl)pyridine,
3-(2-methylene-3-butenyl)pyridine,
4-(2-methylene-3-butenyl)pyridine,
2-(2-methylene-3-butenyl)quinoline,
3-(2-methylene-3-butenyl)quinoline,
4-(2-methylene-3-butenyl)quinoline,
1-methyl-2-(3-methylene-4-pentenyl)imidazole,
1-methyl-4-(3-methylene-4-pentenyl)imidazole,
1-methyl-5-(3-methylene-4-pentenyl)imidazole,
2-(3-methylene-4-pentenyl)pyridine,
3-(3-methylene-4-pentenyl)pyridine,
4-(3-methylene-4-pentenyl)pyridine,
2-(3-methylene-4-pentenyl)quinoline,
3-(3-methylene-4-pentenyl)quinoline, and
4-(3-methylene-4-pentenyl)quinoline.

The compound represented by formula (5) may be a compound represented by formula (5-4) wherein $R^{51}$ is a hydrogen atom. The compound represented by formula (5-4) wherein $R^{51}$ is a hydrogen atom may be:

a compound wherein $R^{51}$ is a hydrogen atom, m is 1, $R^{52}$ is a phenylene group and $A^5$ is a group represented by formula (5-3), a compound wherein $R^{51}$ is a hydrogen atom, m is 1, $R^{52}$ is a group represented by formula (5-2) and $A^5$ is a group represented by formula (5-3), or a compound wherein $R^{51}$ is a hydrogen atom, m is 0 and $A^5$ is a nitrogen atom-containing heterocyclic group.

The compound represented by formula (5-4) wherein $R^{51}$ is a hydrogen atom may be:

a compound wherein $R^{51}$ is a hydrogen atom, m is 1, $R^{52}$ is a para-phenylene or meta-phenylene group, and $A^5$ is a group represented by formula (5-3) in which $R^{55}$ and $R^{56}$ in formula (5-3) are bonded together to form an alkylene group of 4 to 7 carbon atoms, a compound wherein $R^{51}$ is a hydrogen atom, m is 1, $R^{52}$ is a para-phenylene or meta-phenylene group, and $A^5$ is a group represented by formula (5-3) in which $R^{55}$ and $R^{56}$ in formula (5-3) are bonded together to form an alkylene group of 4 to 7 carbon atoms, or a compound wherein $R^{51}$ is a hydrogen atom, m is 0, and $A^5$ is a nitrogen atom-containing aromatic heterocyclic group.

The compound represented by formula (5) may be selected from among 4-[2-(1-pyrrolidinyl)ethyl]styrene, 3-[2-(1-pyrrolidinyl)ethyl]styrene, 4-vinylpyridine and 3-vinylpyridine, in particular.

$R^9$ in formula (5') represents a hydrocarbyl group with a double bond. The hydrocarbyl group with a double bond for $R^9$ may be a group represented by the following formula (5'-V).

(5'-V)

In formula (5'-V), e represents 0 or 1, $R^{91}$, $R^{93}$ and $R^{94}$ each independently represent a hydrogen atom or a hydrocarbyl group, and $R^{92}$ represents a hydrocarbylene group.

The hydrocarbyl group as $R^{91}$, $R^{93}$ or $R^{94}$ may be, for example, an alkyl, alkenyl, alkynyl, aryl or aralkyl group. Examples of the alkyl group include methyl, ethyl, n-propyl, isopropyl, n-butyl, sec-butyl, tert-butyl, n-pentyl, n-hexyl, n-octyl, n-dodecyl, cyclopentyl and cyclohexyl groups. The alkyl group may be a methyl group. Examples of the alkenyl group include vinyl, allyl, 1-propenyl and isopropenyl groups. The alkenyl group may be a vinyl group. Examples of the alkynyl group include ethynyl and 2-propynyl groups. Examples of the aryl group include phenyl, ethylphenyl, tolyl and xylyl groups. The aryl group may be a phenyl group. Examples of the aralkyl group include benzyl groups.

$R^{91}$ may be a hydrogen atom, a methyl group, a vinyl group or a phenyl group, and it may be a hydrogen atom.

$R^{93}$ and $R^{94}$ may be hydrogen atoms.

The hydrocarbylene group as $R^{92}$ may be an alkylene, arylene or arylene-alkylene group, for example. Examples of the alkylene group include methylene, ethylene and propylene groups. The alkylene group may be a methylene or ethylene group. Examples of the arylene group include phenylene, naphthylene and biphenylene groups. The arylene group may be a phenylene group. Examples of the arylene-alkylene group include phenylene-alkylene, naphthylene-alkylene and biphenylene-alkylene groups. The arylene-alkylene group may be a phenylene-alkylene group. When $R^{92}$ is an arylene-alkylene group, a carbon atom of the arylene group in the arylene-alkylene group may be bonded to the carbon atom to which $R^{91}$ in formula (5'-V) is bonded.

The phenylene-alkylene group for $R^{92}$ may be a group represented by the following formula (5'-R). In formula (5'-R), d represents an integer of 1 to 10, and $(CH_2)_d$ is a substituent on the aromatic ring.

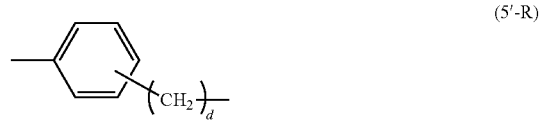

(5'-R)

Examples of such phenylene-alkylene groups include para-phenylene-alkylene, meta-phenylene-alkylene and ortho-phenylene-alkylene groups. The arylene-alkylene group may be a phenylene-alkylene group, or it may be a para-phenylene-alkylene group or a meta-phenylene-alkylene group, or may be a para-phenylene-methylene, meta-phenylene-methylene, para-phenylene-ethylene or meta-phenylene-ethylene group.

Examples of the group represented by formula (5'-V) wherein $R^{91}$, $R^{93}$ and $R^{94}$ are hydrogen atoms, include vinyl, allyl, 3-butenyl, 4-vinylphenyl, 3-vinylphenyl, (4-vinylphenyl)methyl, 2-(4-vinylphenyl)ethyl, (3-vinylphenyl)methyl and 2-(3-vinylphenyl)ethyl groups.

Examples of the group represented by formula (5'-V) wherein $R^{91}$ is a methyl group and $R^{93}$ and $R^{94}$ are hydrogen atoms, include isopropenyl, 2-methyl-2-propenyl, 4-isopropenylphenyl, 3-isopropenylphenyl, (4-isopropenylphenyl)methyl, 2-(4-isopropenylphenyl)ethyl, (3-isopropenylphenyl)methyl and 2-(3-isopropenylphenyl)ethyl groups.

Examples of the group represented by formula (5'-V) wherein $R^{91}$ is a vinyl group and $R^{93}$ and $R^{94}$ are hydrogen atoms, include 1-methylene-2-propenyl and 2-methylene-3-butenyl groups.

Examples of the group represented by formula (5'-V) wherein $R^{91}$ is a phenyl group and $R^{93}$ and $R^{94}$ are hydrogen atoms, include 1-phenylethenyl, 2-phenyl-2-propenyl, 4-(1-phenylethenyl)phenyl, 3-(1-phenylethenyl)phenyl and 2-(1-phenylethenyl)phenyl groups.

Examples of the group represented by formula (5'-V) wherein $R^{91}$ is a hydrogen atom, $R^{93}$ is a methyl group and $R^{94}$ is a hydrogen atom, include 1-propenyl, 2-butenyl, 4-(1-propenyl)phenyl, 4-(1-propenyl)phenylmethyl, 2-[4-(1-propenyl)phenyl]ethyl, 3-(1-propenyl)phenyl, 3-(1-propenyl)phenylmethyl and 2-[3-(1-propenyl)phenyl]ethyl groups.

The group represented by formula (5'-V) may be a group represented by the following formula (5'-V1). In formula (5'-V1), e, $R^{91}$ and $R^{92}$ have the same respective definitions as e, $R^{91}$ and $R^{92}$ in formula (5'-V).

(5'-VI)

Examples of the group represented by formula (5'-V1) wherein $R^{91}$ is a hydrogen atom include vinyl, 4-vinylphenyl, 3-vinylphenyl, (4-vinylphenyl)methyl, 2-(4-vinylphenyl)ethyl, (3-vinylphenyl)methyl and 2-(3-vinylphenyl)ethyl groups. Examples of the group represented by formula (5'-V1) wherein $R^{91}$ is a methyl group include 4-isopropenylphenyl, 3-isopropenylphenyl, (4-isopropenylphenyl)methyl, 2-(4-isopropenylphenyl)ethyl, (3-isopropenylphenyl)methyl and 2-(3-isopropenylphenyl)ethyl groups. Examples of the group represented by formula (5'-V1) wherein $R^{91}$ is a vinyl group include 1-methylene-2-propenyl and 2-methylene-3-butenyl groups. Examples of the group represented by formula (5'-V1) wherein $R^{91}$ is a phenyl group include 4-(1-phenylvinyl)phenyl groups. The group represented by formula (5'-V1) may be a vinyl group.

The substituted silyl group as $A^9$ in formula (5') may be a group represented by the following formula (5'-S), for example.

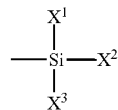

(5'-S)

In formula (5'-S), $X^1$, $X^2$ and $X^3$ each independently represent a hydrogen atom, a hydrocarbyloxy group, an optionally substituted hydrocarbyl group, or a substituted amino group, and at least one of $X^1$, $X^2$ and $X^3$ is a substituted amino group, hydrocarbyloxy group or an optionally substituted hydrocarbyl group.

The hydrocarbyloxy group as $X^1$, $X^2$ or $X^3$ may be an alkoxy or aryloxy group, for example. Examples of the alkoxy group include methoxy, ethoxy, n-propoxy, isopropoxy, n-butoxy, sec-butoxy, tert-butoxy, pentyloxy, hexyloxy, heptyloxy and octyloxy groups. Examples of the aryloxy group include phenoxy and benzyloxy groups.

The optionally substituted hydrocarbyl group as $X^1$, $X^2$ or $X^3$ include hydrocarbyl and substituted hydrocarbyl groups. Examples of the substituted hydrocarbyl group include hydrocarbyl groups substituted with a substituent having an oxygen atom, hydrocarbyl groups substituted with a substituent having a nitrogen atom, and hydrocarbyl groups substituted with a substituent having a silicon atom.

The hydrocarbyl group as $X^1$, $X^2$ or $X^3$ may be an alkyl, alkenyl, alkynyl, aryl or aralkyl group, for example. Examples of the alkyl group include methyl, ethyl, n-propyl, isopropyl, n-butyl, sec-butyl, tert-butyl, n-pentyl, n-hexyl, n-octyl, n-dodecyl, cyclopentyl and cyclohexyl groups. Examples of the alkenyl group include vinyl, allyl, 1-propenyl and isopropenyl groups. Examples of the alkynyl group include ethynyl and 2-propynyl groups. Examples of the aryl group include phenyl, ethylphenyl, tolyl and xylyl groups. Examples of the aralkyl group include benzyl groups.

The hydrocarbyl group may be an alkyl group.

The hydrocarbyl group substituted with a substituent having an oxygen atom, as $X^1$, $X^2$ or $X^3$, may be an alkoxyalkyl group such as methoxymethyl, methoxyethyl, ethoxymethyl or ethoxyethyl group, for example.

The hydrocarbyl group substituted with a substituent having a nitrogen atom, as $X^1$, $X^2$ or $X^3$, may be a dialkylaminoalkyl group such as dimethylaminomethyl, dimethylaminoethyl, diethylaminomethyl or diethylaminoethyl group, for example.

The hydrocarbyl group substituted with a substituent having a silicon atom, as $X^1$, $X^2$ or $X^3$, for example, may be a trialkylsilylalkyl group such as trimethylsilylmethyl, trimethylsilylethyl, triethylsilylmethyl or triethylsilylethyl group, for example.

The number of carbon atoms of the optionally substituted hydrocarbyl group as $X^1$, $X^2$ or $X^3$ may be 1 to 10, or 1 to 4.

The optionally substituted hydrocarbyl group as $X^1$, $X^2$ or $X^3$ may be a hydrocarbyl group or a hydrocarbyl group substituted with a substituent having an oxygen atom, and it may be an alkyl group or an alkoxyalkyl group. The alkyl group may be an alkyl group of 1 to 4 carbon atoms, and it may be a methyl or ethyl group. The alkoxyalkyl group may be an alkoxyalkyl group of 2 to 4 carbon atoms.

The substituted amino group as $X^1$, $X^2$ or $X^3$ may be a group represented by the following formula (5'-X) or a group represented by the following formula (5'-Y).

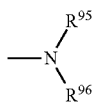

(5'-X)

In formula (5'-X), $R^{95}$ and $R^{96}$ each independently represent a hydrocarbyl group or trihydrocarbylsilyl group, or a hydrocarbylene group formed by bonding of $R^{95}$ to $R^{96}$, and having a nitrogen atom and/or oxygen atom.

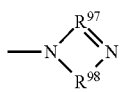

(5'-Y)

In formula (5'-Y), $R^{97}$ represents a hydrocarbylidene group and $R^{98}$ represents a hydrocarbylene group, or $R^{97}$ and $R^{98}$ represent a hydrocarbylene group formed by bonding of $R^{97}$ to $R^{98}$, and having a nitrogen atom and/or oxygen atom.

The hydrocarbyl group as $R^{95}$ or $R^{96}$ may be an alkyl, alkenyl, alkynyl, aryl or aralkyl group, for example. Examples of the alkyl group include methyl, ethyl, n-propyl, isopropyl, n-butyl, sec-butyl, tert-butyl, n-pentyl, n-hexyl, n-octyl, n-dodecyl and cyclopentyl and cyclohexyl groups. Examples of the alkenyl group include vinyl, allyl, 1-propenyl and isopropenyl groups. Examples of the alkynyl group include ethynyl and 2-propynyl groups. Examples of the aryl group include phenyl, ethylphenyl, tolyl and xylyl groups. Examples of the aralkyl group include a benzyl group.

The number of carbon atoms of the hydrocarbyl group as $R^{95}$ or $R^{96}$ may be 1 to 10, 1 to 4, or 1 to 2.

The hydrocarbyl group as $R^{95}$ or $R^{96}$ may be an alkyl group, or a linear alkyl group of 1 to 4 carbon atoms.

The trihydrocarbylsilyl group as $R^{95}$ or $R^{96}$ may be, for example, a trialkylsilyl group such as a trimethylsilyl, triethylsilyl, tripropylsilyl, triisopropylsilyl, tributylsilyl, tripentylsilyl, trihexylsilyl or tert-butyl-dimethylsilyl group.

The trihydrocarbylsilyl group as $R^{95}$ or $R^{96}$ may be a trialkylsilyl group of 3 to 9 carbon atoms, or it may be a trialkylsilyl group wherein the alkyl group bonded to the silicon atom is an alkyl group of 1 to 3 carbon atoms, or a trimethylsilyl group.

The hydrocarbylene group formed by bonding of $R^{95}$ to $R^{96}$, and optionally having a nitrogen atom and/or an oxygen atom, includes hydrocarbylene groups, and hydrocarbylene groups with a nitrogen atom and/or oxygen atom.
Examples of the hydrocarbylene group include alkylene, alkenediyl, arylene and arylene-alkylene groups. Examples of the alkylene group include methylene, ethylene, propylene, tetramethylene, pentamethylene, hexamethylene, heptamethylene, octamethylene and 2,2,4-trimethylhexane-1,6-diyl groups. Examples of the alkenediyl group include a pentane-2-ene-1,5-diyl group, and Examples of the arylene group include phenylene, naphthylene and biphenylene groups. Examples of the arylene-alkylene group include phenylene-alkylene, naphthylene-alkylene and biphenylene-alkylene groups.
Examples of the hydrocarbylene group with a nitrogen atom and/or oxygen atom include a group represented by —CH$_2$CH$_2$—NH—CH$_2$—, a group represented by —CH$_2$CH$_2$—N═CH—, a group represented by —CH═CH—N═CH—, a group represented by —CH$_2$CH$_2$—NH—CH$_2$CH$_2$— and groups represented by —(CH$_2$)$_t$—O—(CH$_2$)$_u$— (where t and u are each an integer of 1 or greater).

The number of carbon atoms of the group formed by bonding of $R^{95}$ to $R^{96}$ and of a group formed by bonding of $R^{97}$ to $R^{98}$ may be 2 to 20, 2 to 7 or 4 to 6.

The hydrocarbylene group optionally having a nitrogen atom and/or oxygen atom, as a group formed by bonding of $R^{95}$ to $R^{96}$, may be a hydrocarbylene group, an alkylene group or an alkylene group of 4 to 7 carbon atoms.

The hydrocarbylidene group as $R^{97}$ may be, for example, an ethylidene, propylidene, butylidene, 1-methylethylidene, 1-methylpropylidene or 1,3-dimethylbutylidene group.

The number of carbon atoms of the hydrocarbylidene group as $R^{97}$ may be 2 to 20, or 2 to 6.

The hydrocarbylene group as $R^{98}$ may be an alkylene, alkenediyl, arylene or arylene-alkylene group, for example. Examples of the alkylene group include methylene, ethylene, propylene, tetramethylene, pentamethylene, hexamethylene, heptamethylene, octamethylene and 2,2,4-trimethylhexane-1,6-diyl groups. Examples of the alkenediyl group include a pentane-2-ene-1,5-diyl group. Examples of the arylene group include phenylene, naphthylene and biphenylene groups. Examples of the arylene-alkylene group include phenylene-alkylene, naphthylene-alkylene and biphenylene-alkylene groups.

$R^{95}$, $R^{96}$ and $R^{98}$ may each independently be an alkyl or trialkylsilyl group, or an alkylene group formed by bonding of $R^{95}$ to $R^{96}$, and each may independently be an alkyl group.

Examples of the group represented by formula (5'-X) wherein $R^{95}$ and $R^{96}$ are each independently a hydrocarbyl group include dialkylamino groups such as dimethylamino, diethylamino, di(n-propyl)amino, di(isopropyl)amino, di(n-butyl)amino, di(sec-butyl)amino, di(tert-butyl)amino and ethylmethylamino groups. Examples of the group represented by formula (5'-X) wherein $R^{95}$ and $R^{96}$ are each independently a trihydrocarbylsilyl group include bis(trialkylsilyl)amino groups such as bis(trimethylsilyl)amino and bis(tert-butyl-dimethylsilyl)amino groups.

Examples of the group represented by formula (5'-X) wherein $R^{95}$ is bonded to $R^{96}$ to form a hydrocarbylene group, include 1-aziridinyl, 1-azetidinyl, 1-pyrrolidinyl, 1-piperidinyl, 1-hexamethyleneimino and 1-pyrrolyl groups. Examples of the group represented by formula (5'-X) wherein $R^{95}$ is bonded to $R^{96}$ to form a hydrocarbylene group with a nitrogen atom and/or oxygen atom include 1-imidazolyl, 4,5-dihydro-1-imidazolyl, 1-imidazolidinyl, 1-piperazinyl and morpholino groups.

Examples of the group represented by formula (5'-Y) include alkylideneamino groups such as ethylideneamino, 1-methylpropylideneamino, 1,3-dimethylbutylideneamino, 1-methylethylideneamino and 4-N,N-dimethylaminobenzylideneamino groups.

The substituted amino group as $X^1$, $X^2$ or $X^3$ may be a dialkylamino, bis(trialkylsilyl)amino or alkylideneamino group, or it may be a dialkylamino group. The dialkylamino group may be a dimethylamino, diethylamino, di(n-propyl)amino or di(n-butyl)amino group, or it may be a dimethylamino or diethylamino group.

In formula (5'-S), $X^1$, $X^2$ and $X^3$ may each independently be an optionally substituted hydrocarbyl group or a substituted amino group.

In formula (5'-S), at least one of $X^1$, $X^2$ and $X^3$ may be a substituted amino group, or two or more of $X^1$, $X^2$ and $X^3$ may be a substituted amino group, or two of $X^1$, $X^2$ and $X^3$ may be a substituted amino group.

The compound represented by formula (5') may be a compound represented by the following formula (5'-1) wherein $R^9$ is a group represented by formula (5'-V1) and $A^9$ is a group represented by formula (5'-S). $R^{91}$ and $R^{92}$ have the same respective definitions as e, $R^{91}$ and $R^{92}$ in formula (5'-V), and $X^1$, $X^2$ and $X^3$ have the same respective definitions as $X^1$, $X^2$ and $X^3$ in formula (5'-S).

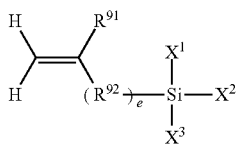

(5'-1)

Compounds represented by formula (5'-1) wherein $R^{91}$ is a hydrogen atom and one of $X^1$, $X^2$ and $X^3$ is a dialkylamino group, include the following compounds.
Examples of the compounds wherein e in formula (5'-1) is 0 include:
(dimethylamino)dimethylvinylsilane,
(diethylamino)dimethylvinylsilane,
(dipropylamino)dimethylvinylsilane,
(dibutylamino)dimethylvinylsilane,
(dimethylamino)diethylvinylsilane,
(diethylamino)diethylvinylsilane,
(dipropylamino)diethylvinylsilane, and
(dibutylamino)diethylvinylsilane.
Examples of the compounds wherein e in formula (5'-1) is 1 include:
(dimethylamino)dimethyl(4-vinylphenyl)silane,
(dimethylamino)dimethyl(3-vinylphenyl)silane,
(diethylamino)dimethyl(4-vinylphenyl)silane,
(diethylamino)dimethyl(3-vinylphenyl)silane,
(dipropylamino)dimethyl(4-vinylphenyl)silane,
(dipropylamino)dimethyl(3-vinylphenyl)silane,
(dibutylamino)dimethyl(4-vinylphenyl)silane,
(dibutylamino)dimethyl(3-vinylphenyl)silane,
(dimethylamino)diethyl(4-vinylphenyl)silane,
(dimethylamino)diethyl(3-vinylphenyl)silane,
(diethylamino)diethyl(4-vinylphenyl)silane,
(diethylamino)diethyl(3-vinylphenyl)silane,
(dipropylamino)diethyl(4-vinylphenyl)silane,
(dipropylamino)diethyl(3-vinylphenyl)silane,
(dibutylamino)diethyl(4-vinylphenyl)silane, and
(dibutylamino)diethyl(3-vinylphenyl)silane.
Compounds represented by formula (5'-1) wherein $R^{91}$ is a hydrogen atom and two of $X^1$, $X^2$ and $X^3$ are dialkylamino groups, include the following compounds.
Examples of the compounds wherein e in formula (5'-1) is 0 include:
bis(dimethylamino)methylvinylsilane,
bis(diethylamino)methylvinylsilane,
bis(dipropylamino)methylvinylsilane,
bis(dibutylamino)methylvinylsilane,
bis(dimethylamino)ethylvinylsilane,
bis(diethylamino)ethylvinylsilane,
bis(dipropylamino)ethylvinylsilane, and
bis(dibutylamino)ethylvinylsilane.
Examples of the compounds wherein e in formula (5'-1) is 1 include:
bis(dimethylamino)methyl(4-vinylphenyl)silane,
bis(dimethylamino)methyl(3-vinylphenyl)silane,
bis(diethylamino)methyl(4-vinylphenyl)silane,
bis(diethylamino)methyl(3-vinylphenyl)silane,
bis(dipropylamino)methyl(4-vinylphenyl)silane,
bis(dipropylamino)methyl(3-vinylphenyl)silane,
bis(dibutylamino)methyl(4-vinylphenyl)silane,
bis(dibutylamino)methyl(3-vinylphenyl)silane,
bis(dimethylamino)ethyl(4-vinylphenyl)silane,
bis(dimethylamino)ethyl(3-vinylphenyl)silane,
bis(diethylamino)ethyl(4-vinylphenyl)silane,
bis(diethylamino)ethyl(3-vinylphenyl)silane,
bis(dipropylamino)ethyl(4-vinylphenyl)silane,
bis(dipropylamino)ethyl(3-vinylphenyl)silane,
bis(dibutylamino)ethyl(4-vinylphenyl)silane, and
bis(dibutylamino)ethyl(3-vinylphenyl)silane.
Compounds represented by formula (5'-1) wherein $R^{91}$ is a methyl group and two of $X^1$, $X^2$ and $X^3$ are dialkylamino groups, include the following compounds.
Examples of the compounds wherein e in formula (5'-1) is 1 include:
bis(dimethylamino)methyl(4-isopropenylphenyl)silane,
bis(dimethylamino)methyl(3-isopropenylphenyl)silane,
bis(diethylamino)methyl(4-isopropenylphenyl)silane,
bis(diethylamino)methyl(3-isopropenylphenyl)silane,
bis(dipropylamino)methyl(4-isopropenylphenyl)silane,
bis(dipropylamino)methyl(3-isopropenylphenyl)silane,
bis(dibutylamino)methyl(4-isopropenylphenyl)silane,
bis(dibutylamino)methyl(3-isopropenylphenyl)silane,
bis(dimethylamino)ethyl(4-isopropenylphenyl)silane,
bis(dimethylamino)ethyl(3-isopropenylphenyl)silane,
bis(diethylamino)ethyl(4-isopropenylphenyl)silane,
bis(diethylamino)ethyl(3-isopropenylphenyl)silane,
bis(dipropylamino)ethyl(4-isopropenylphenyl)silane,
bis(dipropylamino)ethyl(3-isopropenylphenyl)silane,
bis(dibutylamino)ethyl(4-isopropenylphenyl)silane, and
bis(dibutylamino)ethyl(3-isopropenylphenyl)silane.
Compounds represented by formula (5'-1) wherein $R^{91}$ is a vinyl group and two of $X^1$, $X^2$ and $X^3$ are dialkylamino groups, include the following compounds.
Examples of the compounds wherein e in formula (5'-1) is 0 include:
bis(dimethylamino)methyl(1-methylene-2-propenyl)silane,
bis(diethylamino)methyl(1-methylene-2-propenyl)silane,
bis(dipropylamino)methyl(1-methylene-2-propenyl)silane,
bis(dibutylamino)methyl(1-methylene-2-propenyl)silane,
bis(dimethylamino)ethyl(1-methylene-2-propenyl)silane,
bis(diethylamino)ethyl(1-methylene-2-propenyl)silane,
bis(dipropylamino)ethyl(1-methylene-2-propenyl)silane, and
bis(dibutylamino)ethyl(1-methylene-2-propenyl)silane.
Compounds represented by formula (5'-1) wherein $R^{91}$ is a phenyl group and two of $X^1$, $X^2$ and $X^3$ are dialkylamino groups, include the following compounds.
Examples of the compounds wherein e in formula (5'-1) is 1 include:
1-{4-[bis(dimethylamino)methylsilyl]phenyl}-1-phenylethylene,
1-{4-[bis(diethylamino)methylsilyl]phenyl}-1-phenylethylene,
1-{4-[bis(dipropylamino)methylsilyl]phenyl}-1-phenylethylene,
1-{4-[bis(dibutylamino)methylsilyl]phenyl}-1-phenylethylene,
1-{4-[bis(dimethylamino)ethylsilyl]phenyl}-1-phenylethylene,
1-{4-[bis(diethylamino)ethylsilyl]phenyl}-1-phenylethylene,
1-{4-[bis(dipropylamino)ethylsilyl]phenyl}-1-phenylethylene, and 1-{4-[bis(dibutylamino)ethylsilyl]phenyl}-1-phenylethylene.

Compounds represented by formula (5'-1) wherein $R^{91}$ is a hydrogen atom and $X^1$, $X^2$ and $X^3$ are dialkylamino groups, include the following compounds.
Examples of the compounds wherein e in formula (5'-1) is 0 include:
tris(dimethylamino)vinylsilane,
tris(diethylamino)vinylsilane,
tris(dipropylamino)vinylsilane, and
tris(dibutylamino)vinylsilane.
Examples of the compounds wherein e in formula (5'-1) is 1 include:
tris(dimethylamino)(4-vinylphenyl)silane,
tris(dimethylamino)(3-vinylphenyl)silane,
tris(diethylamino)(4-vinylphenyl)silane,
tris(diethylamino)(3-vinylphenyl)silane,
tris(dipropylamino)(4-vinylphenyl)silane,
tris(dipropylamino)(3-vinylphenyl)silane,
tris(dibutylamino)(4-vinylphenyl)silane, and
tris(dibutylamino)(3-vinylphenyl)silane.

Compounds represented by formula (5'-1) wherein $R^{91}$ is a methyl group and $X^1$, $X^2$ and $X^3$ are dialkylamino groups, include the following compounds.
Examples of the compounds wherein e in formula (5'-1) is 1 include:
tris(dimethylamino)(4-isopropenylphenyl)silane,
tris(dimethylamino)(3-isopropenylphenyl)silane,
tris(diethylamino)(4-isopropenylphenyl)silane,
tris(diethylamino)(3-isopropenylphenyl)silane,
tris(dipropylamino)(4-isopropenylphenyl)silane,
tris(dipropylamino)(3-isopropenylphenyl)silane,
tris(dibutylamino)(4-isopropenylphenyl)silane, and
tris(dibutylamino)(3-isopropenylphenyl)silane.

Compounds represented by formula (5'-1) wherein $R^{91}$ is a vinyl group and $X^1$, $X^2$ and $X^3$ are dialkylamino groups, include the following compounds.
Examples of the compounds wherein e in formula (5'-1) is 0 include:
tris(dimethylamino)(1-methylene-2-propenyl)silane,
tris(diethylamino)(1-methylene-2-propenyl)silane,
tris(dipropylamino)(1-methylene-2-propenyl)silane, and
tris(dibutylamino)(1-methylene-2-propenyl)silane.

Compounds represented by formula (5'-1) wherein $R^{91}$ is a phenyl group and $X^1$, $X^2$ and $X^3$ are dialkylamino groups, include the following compounds.
Examples of the compounds wherein e in formula (5'-1) is 1 include:
1-[4-tris(dimethylamino)silylphenyl]-1-phenylethylene,
1-[4-tris(diethylamino)silylphenyl]-1-phenylethylene,
1-[4-tris(di-n-propylamino)methylsilylphenyl]-1-phenylethylene, and
1-[4-tris(di-n-butylamino)methylsilylphenyl]-1-phenylethylene.

In formula (5'-1), two of $X^1$, $X^2$ and $X^3$ may be dialkylamino groups, or two of $X^1$, $X^2$ and $X^3$ may be dialkylamino groups, $R^{91}$ may be a hydrogen atom and e may be 0. In formula (5'-1), two of $X^1$, $X^2$ and $X^3$ may be dialkylamino groups, with the remaining one an alkyl or alkoxyalkyl group, $R^{91}$ may be a hydrogen atom, and e may be 0.

The compound represented by formula (5'-1) may be selected from among, particularly:
bis(dimethylamino)methylvinylsilane,
bis(diethylamino)methylvinylsilane,
bis(dipropylamino)methylvinylsilane,
bis(dibutylamino)methylvinylsilane,
bis(dimethylamino)ethylvinylsilane,
bis(diethylamino)ethylvinylsilane, and
bis(dibutylamino)ethylvinylsilane.

The amount of compound containing a hydrocarbyl group with a double bond and a nitrogen atom and/or silicon atom, in the polymerization solution, may be 0.01 mol or greater and 1.00 mol or lower, or 0.02 mol or greater and 0.99 mol or lower, per 1 mol of the alkali metal in the alkali metal polymerization initiator, from the viewpoint of fuel efficiency of the modified conjugated diene polymer composition after vulcanization.

After a conjugated diene polymer having a site with living activity has been produced in the polymerization solution, a compound represented by formula (1) is added to the polymerization solution to form a mixed solution. A modified conjugated diene polymer can be produced by reacting the conjugated diene polymer having a site with living activity with the compound represented by formula (1), in the mixed solution.

The mixed solution obtained by adding the compound represented by formula (1) may be stirred. Reaction in the mixed solution is typically carried out at the same temperature as the polymerization temperature when the conjugated diene polymer having a site with living activity is produced. The reaction time (stirring time) is typically 1 minute or greater and 5 hours or lower.

The amount of the compound represented by formula (1) to be added to the polymerization solution may be 0.01 mmol or greater and 1.00 mmol or lower, or 0.02 mmol or greater and 0.99 mmol or lower, with respect to 1 mmol of the alkali metal polymerization initiator used for polymerization of the conjugated diene.

A compound containing a nitrogen atom and/or silicon atom may also be added to the polymerization solution, in addition to the compound represented by formula (1). The compound containing a nitrogen atom and/or silicon atom may be a compound containing a silicon atom, a compound containing a nitrogen atom, or a compound containing a nitrogen atom and a silicon atom.

Examples of the compounds containing a silicon atom include compounds containing a silicon atom and an epoxy group, and compounds containing a silicon atom and a carbonyl group.
Examples of the compounds containing a silicon atom and an epoxy group include 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane and 3-glycidoxypropyltriethoxysilane.
Examples of the compounds containing a silicon atom and a carbonyl group include 3-methacryloxypropylmethyldimethoxysilane, 3-methacryloxypropyltrimethoxysilane, 3-methacryloxypropylmethyldiethoxysilane, 3-methacryloxypropyltriethoxysilane and 3-acryloxypropyltrimethoxysilane.

Examples of the compounds containing a nitrogen atom include compounds containing a nitrogen atom and a carbonyl group. Compounds containing a nitrogen atom and a carbonyl group may be compounds represented by the following formula (6).

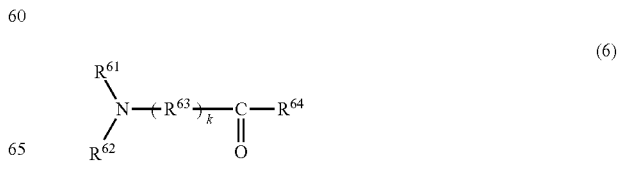

(6)

In formula (6), $R^{61}$ represents an optionally substituted hydrocarbyl group. $R^{62}$ represents an optionally substituted hydrocarbyl group. $R^{64}$ represents an optionally substituted hydrocarbyl group or a hydrogen atom. $R^{61}$ and $R^{62}$ may be divalent groups formed by bonding of $R^{61}$ to $R^{62}$, or they may be a hydrocarbylene group formed by bonding of $R^{61}$ to $R^{64}$ and optionally having a nitrogen atom and/or oxygen atom. $R^{63}$ represents a divalent group, and k is 0 or 1.

The optionally substituted hydrocarbyl group as $R^{61}$, $R^{62}$ or $R^{64}$ is a hydrocarbyl group, or a substituted hydrocarbyl group. Examples of the substituted hydrocarbyl group include hydrocarbyl groups substituted with a hydrocarbyloxy group, and hydrocarbyl groups substituted with a substituted amino group.

Examples of the hydrocarbyl group include alkyl, alkenyl, alkynyl, aryl and aralkyl groups. Examples of the alkyl group include methyl, ethyl, n-propyl, isopropyl, n-butyl, sec-butyl, tert-butyl, n-pentyl, n-hexyl, n-octyl, n-dodecyl, cyclopentyl and cyclohexyl groups. Examples of the alkenyl group include vinyl, allyl, 1-propenyl and isopropenyl groups. Examples of the alkynyl group include ethynyl and 2-propynyl groups. Examples of the aryl group include phenyl, ethylphenyl, tolyl and xylyl groups. Examples of the aralkyl group include a benzyl group.

Examples of the hydrocarbyl group substituted with a hydrocarbyloxy group include alkoxyalkyl groups such as methoxymethyl, ethoxymethyl and ethoxyethyl groups.

Examples of the hydrocarbyl group substituted with a substituted amino group include (dialkylamino)alkyl groups such as dimethylaminomethyl, 2-(dimethylamino)ethyl, 2-(diethylamino)ethyl, 3-(dimethylamino)propyl and 3-(diethylamino)propyl groups; (dialkylamino)aryl groups such as 4-(dimethylamino)phenyl, 3-(dimethylamino)phenyl, 4-(diethylamino)phenyl and 3-(diethylamino)phenyl groups; (dialkylamino)alkylaryl groups such as 4-(dimethylamino)methylphenyl and 4-[2-(dimethylamino)ethyl]phenyl groups; alkyl groups substituted with a cycloamino group, such as 3-(1-pyrrolidinyl)propyl, 3-(1-piperidinyl)propyl and 3-(1-imidazolyl)propyl groups; aryl groups substituted with a cycloamino group, such as 4-(1-pyrrolidinyl)phenyl, 4-(1-piperidinyl)phenyl and 4-(1-imidazolyl)phenyl groups; and alkylaryl groups substituted with a cycloamino group, such as 4-[2-(1-pyrrolidinyl)ethyl]phenyl, 4-[2-(1-piperidinyl)ethyl]phenyl and 4-[2-(1-imidazolyl)ethyl]phenyl groups.

The hydrocarbylene group formed by bonding of $R^{61}$ to $R^{62}$, and optionally having a nitrogen atom and/or oxygen atom, is a hydrocarbylene group, or a hydrocarbylene group with a nitrogen atom and/or oxygen atom.

The hydrocarbylene group as $R^{61}$ and $R^{62}$ may be an alkylene, alkenediyl, arylene or arylene-alkylene groups, for example. Examples of the alkylene group include methylene, ethylene, propylene, tetramethylene, pentamethylene, hexamethylene, heptamethylene, octamethylene and 2,2,4-trimethylhexane-1,6-diyl groups. Examples of the alkenediyl group include a pentane-2-ene-1,5-diyl group. Examples of the arylene group include phenylene, naphthylene and biphenylene groups. Examples of the arylene-alkylene group include phenylene-alkylene, naphthylene-alkylene and biphenylene-alkylene groups.

Examples of the hydrocarbylene group with a nitrogen atom and/or an oxygen atom include a group represented by —CH=N—CH=CH—, a group represented by —CH=N—CH$_2$—CH$_2$— and groups represented by —(CH$_2$)$_t$—O—(CH$_2$)$_u$— (where t and u are each an integer of 1 or greater).

The divalent group formed by bonding of $R^{61}$ to $R^{64}$ and a divalent group as $R^{63}$ may be, for example, a hydrocarbylene group, a hydrocarbylene group with a nitrogen atom and/or oxygen atom, a group with a hydrocarbylene group and an oxygen atom that are mutually bonded, or a group with a hydrocarbylene group and a group represented by —NR$^{65}$— (where $R^{65}$ represents a hydrocarbyl group or a hydrogen atom) that are mutually bonded.

Examples of the hydrocarbylene group include alkylene, alkenediyl, arylene and arylene-alkylene groups. Examples of the alkylene group include methylene, ethylene, propylene, tetramethylene, pentamethylene, hexamethylene, heptamethylene, octamethylene and 2,2,4-trimethylhexane-1,6-diyl groups. Examples of the alkenediyl group include a pentane-2-ene-1,5-diyl group. Examples of the arylene group include phenylene, naphthylene and biphenylene groups. Examples of the arylene-alkylene group include phenylene-alkylene, naphthylene-alkylene and biphenylene-alkylene groups.

Examples of the hydrocarbylene group with a nitrogen atom and/or an oxygen atom include a group represented by —CH=N—CH=CH—, a group represented by —CH=N—CH$_2$—CH$_2$— and groups represented by —(CH$_2$)$_t$—O—(CH$_2$)$_u$— (where t and u are each an integer of 1 or greater). Examples of the group with a hydrocarbylene group and an oxygen atom that are mutually bonded include groups represented by —(CH$_2$)$_z$—O— (where z is an integer of 1 or greater).

Examples of the group with a hydrocarbylene group and a group represented by —NR$^{65}$— which are mutually bonded include groups represented by —(CH$_2$)$_v$—NR— (where R represents a hydrocarbyl group of 1 to 10 carbon atoms or a hydrogen atom, and v is an integer of 1 or greater).

The compound represented by formula (6) may be:
a compound represented by the following formula (6-1) wherein k is 0 and $R^{64}$ is an optionally substituted hydrocarbyl group or a hydrogen atom,
a compound represented by the following formula (6-2) wherein k is 0 and $R^{61}$ is bonded to $R^{64}$ as a group with a hydrocarbylene group and a group represented by —NR$^{65}$— (where $R^{65}$ is a hydrocarbyl group or a hydrogen atom) which are mutually bonded,
a compound represented by the following formula (6-3) wherein k is 1 and $R^{63}$ is a hydrocarbylene group, or
a compound represented by the following formula (6-4) wherein k is 1 and $R^{63}$ is a group with a hydrocarbylene group and an oxygen atom which are mutually bonded, or a group with a hydrocarbylene group and a group represented by —NR$^{65}$— (where $R^{65}$ represents a hydrocarbyl group or a hydrogen atom) which are mutually bonded.

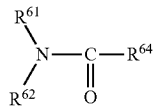

(6-1)

In formula (6-1), $R^{61}$, $R^{62}$ and $R^{64}$ have the same respective definitions as $R^{61}$, $R^{62}$ and $R^{64}$ in formula (6).

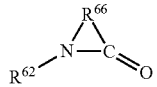

(6-2)

In formula (6-2), $R^{62}$ has the same definition as $R^{62}$ in formula (6). $R^{66}$ represents a hydrocarbylene group, or a group with a hydrocarbylene group and a group represented by —$NR^{65}$— that are mutually bonded ($R^{65}$ representing a hydrocarbyl group or a hydrogen atom).

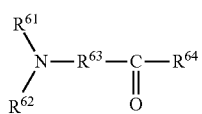
(6-3)

In formula (6-3), $R^{61}$, $R^{62}$ and $R^{64}$ have the same respective definitions as $R^{61}$, $R^{62}$ and $R^{64}$ in formula (6).

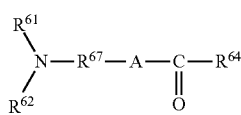
(6-4)

In formula (6-4), $R^{61}$, $R^{62}$ and $R^{64}$ have the same respective definitions as $R^{61}$, $R^{62}$ and $R^{64}$ in formula (6). $R^{67}$ represents a hydrocarbylene group, and A represents an oxygen atom or —$NR^{65}$— (where $R^{65}$ represents a hydrocarbyl group or a hydrogen atom).

In formula (6-1), $R^{61}$ and $R^{62}$ may each independently be a hydrocarbyl group of 1 to 10 carbon atoms, or a hydrocarbylene group of 3 to 10 carbon atoms or a hydrocarbylene group of 3 to 10 carbon atoms having a nitrogen atom formed by bonding of $R^{61}$ to $R^{62}$. $R^{61}$ and $R^{62}$ may each independently be an alkyl group of 1 to 10 carbon atoms or an aryl group of 6 to 10 carbon atoms, or an alkylene group of 3 to 10 carbon atoms, a group represented by —CH=N—CH=CH— or a group represented by —CH=N—$CH_2$—$CH_2$— formed by bonding of $R^{61}$ to $R^{62}$. $R^{61}$ and $R^{62}$ may each independently be an alkyl group of 1 to 6 carbon atoms, and they may each independently be a methyl or ethyl group.

$R^{64}$ in formula (6-1) may be a hydrocarbyl group or a hydrogen atom, it may be a hydrocarbyl group of 1 to 10 carbon atoms or a hydrogen atom, it may be an alkyl group of 1 to 6 carbon atoms or a hydrogen atom, or it may be a hydrogen atom, methyl group or ethyl group.

Examples of the compound represented by formula (6-1) wherein $R^{64}$ is a hydrocarbyl group include N,N-dihydrocarbylacetamides such as N,N-dimethylacetamide, N,N-diethylacetamide and N-methyl-N-ethylacetamide; N,N-dihydrocarbylacrylamides such as N-dimethylacrylamide, N,N-diethylacrylamide and N-methyl-N-ethylacrylamide; and N,N-dihydrocarbylmethacrylamides such as N,N-dimethylmethacrylamide, N,N-diethylmethacrylamide and N-methyl-N-ethylmethacrylamide.

Examples of the compound represented by formula (6-1) wherein $R^{64}$ is a hydrogen atom include N,N-dihydrocarbylformamides such as N,N-dimethylformamide, N,N-dimethylformamide and N-methyl-N-ethylformamide.

In formula (6-2), the hydrocarbylene group as $R^{66}$ may be, for example, an alkylene, alkenediyl, arylene or arylene-alkylene group. Examples of the alkylene group include methylene, ethylene, propylene, tetramethylene, pentamethylene, hexamethylene, heptamethylene, octamethylene and 2,2,4-trimethylhexane-1,6-diyl groups. Examples of the alkenediyl group include a pentane-2-ene-1,5-diyl group. Examples of the arylene group include phenylene, naphthylene and biphenylene groups. Examples of the arylene-alkylene group include phenylene-alkylene, naphthylene-alkylene and biphenylene-alkylene groups.

The group with a hydrocarbylene group and a group represented by —$NR^{65}$— (where $R^{65}$ represents a hydrocarbyl group or a hydrogen atom) which are mutually bonded, as $R^{66}$, may be a group represented by —$(CH_2)_v$—NR— (where R represents a hydrocarbyl group of 1 to 10 carbon atoms or a hydrogen atom, and v is an integer of 1 or greater).

$R^{62}$ in formula (6-2) may be a hydrocarbyl group of 1 to 10 carbon atoms, or it may be an alkyl group of 1 to 10 carbon atoms or an aryl group of 6 to 10 carbon atoms, or it may be an alkyl group of 1 to 6 carbon atoms or a phenyl group, or it may be a methyl, ethyl or phenyl group.

$R^{66}$ in formula (6-2) may be a hydrocarbylene group of 1 to 10 carbon atoms, or it may be a group with a hydrocarbylene group of 1 to 10 carbon atoms and a group represented by —$NR^{68}$— (where $R^{68}$ represents a hydrocarbyl group of 1 to 10 carbon atoms or a hydrogen atom) which are mutually bonded, or it may be an alkylene group of 3 to 6 carbon atoms or a group represented by —$(CH_2)_w$—NR— (where R represents a hydrocarbyl group of 1 to 10 carbon atoms, and w is an integer of 2 to 5), or it may be propylene, tetramethylene, pentamethylene, or a group represented by —$(CH_2)_2$—$N(CH_3)$—.

Examples of the compound represented by formula (6-2) wherein $R^{66}$ is a hydrocarbylene group include:

N-hydrocarbyl-β-propiolactams such as N-methyl-β-propiolactam and N-phenyl-β-propiolactam;

N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone and N-methyl-5-methyl-2-pyrrolidone;

N-hydrocarbyl-2-piperidones such as N-methyl-2-piperidone, N-vinyl-2-piperidone and N-phenyl-2-piperidone;

N-hydrocarbyl-ε-caprolactams such as N-methyl-ε-caprolactam and N-phenyl-ε-caprolactam; and N-hydrocarbyl-ω-laurylolactams such as N-methyl-ω-laurylolactam and N-vinyl-ω-laurylolactam.

The compound represented by formula (6-2) may be N-methyl-2-pyrrolidone, N-phenyl-2-pyrrolidone, N-methyl-ε-caprolactam or N-phenyl-ε-caprolactam, or it may be N-phenyl-2-pyrrolidone or N-methyl-ε-caprolactam.

Examples of the compound represented by formula (6-2) wherein $R^{66}$ is a group with a hydrocarbylene group and a group represented by —$NR^{65}$— (where $R^{65}$ is a hydrocarbyl group or a hydrogen atom) which are mutually bonded, include 1,3-dihydrocarbyl-2-imidazolidinones such as 1,3-dimethyl-2-imidazolidinone, 1,3-diethyl-2-imidazolidinone, 1,3-divinyl-2-imidazolidinone and 1-methyl-3-ethyl-2-imidazolidinone. The compound represented by formula (6-2) may be 1,3-dimethyl-2-imidazolidinone or 1,3-diethyl-2-imidazolidinone, or it may be 1,3-dimethyl-2-imidazolidinone.

$R^{63}$ in formula (6-3) may be a hydrocarbylene group of 1 to 10 carbon atoms, or it may be an alkylene group of 1 to 10 carbon atoms or an arylene group of 6 to 10 carbon atoms, or it may be an alkylene group of 1 to 6 carbon atoms or a phenylene group, or it may be an ethylene, propylene or 1,4-phenylene group.

$R^{64}$ in formula (6-3) may be a hydrocarbyl group of 1 to 10 carbon atoms or a hydrocarbyl group of 3 to 10 carbon atoms substituted with a dialkylamino group, or it may be an alkyl group of 1 to 6 carbon atoms, an aryl group of 6 to 10 carbon atoms, a dialkylaminoalkyl group of 3 to 6 carbon atoms or a dialkylaminoaryl group of 8 to 10 carbon atoms, or it may be a methyl group, an ethyl group, a dialkylaminomethyl group of 3 to 6 carbon atoms, a dialkylaminoethyl group of 4 to 6 carbon atoms, a phenyl group or a dialkylaminophenyl group of 8 to 10 carbon atoms.

$R^{61}$ and $R^{62}$ in formula (6-3) are each independently a hydrocarbyl group of 1 to 10 carbon atoms, or a hydrocarbylene group of 3 to 10 carbon atoms or a hydrocarbylene group of 3 to 10 carbon atoms having a nitrogen atom formed by bonding of $R^{61}$ to $R^{62}$. $R^{61}$ and $R^{62}$ may each independently be an alkyl group of 1 to 10 carbon atoms or an aryl group of 6 to 10 carbon atoms, or an alkylene group of 3 to 10 carbon atoms, a group represented by —CH=N—CH=CH—, a group represented by —CH=N—CH$_2$—CH$_2$— or a group represented by —(CH$_2$)$_2$—O—(CH$_2$)$_2$— formed by bonding of $R^{61}$ to $R^{62}$. $R^{61}$ and $R^{62}$ may each independently be an alkyl group of 1 to 6 carbon atoms, an alkylene group of 3 to 6 carbon atoms, a group represented by —CH=N—CH=CH— or a group represented by —CH=N—CH$_2$—CH$_2$— formed by bonding of $R^{61}$ to $R^{62}$. $R^{61}$ and $R^{62}$ may each independently be a methyl group or an ethyl group, or a tetramethylene group, a hexamethylene group, or a group represented by —CH=N—CH=CH— formed by bonding of $R^{61}$ to $R^{62}$.

Examples of the compound represented by formula (6-3) wherein $R^{63}$ is an arylene group and $R^{64}$ is an alkyl group include:

4-(dihydrocarbylamino)acetophenones such as 4-(dimethylamino)acetophenone, 4-(methylethylamino)acetophenone and 4-(diethylamino)acetophenone; and 4-cyclic aminoacetophenones such as 4'-(imidazol-1-yl)acetophenone. Among these, the compound represented by formula (6-3) may be 4-cyclic aminoacetophenone, or it may be 4'-(imidazol-1-yl)acetophenone.

Examples of the compound represented by formula (6-3) wherein $R^{63}$ is an arylene group and $R^{64}$ is an aryl or substituted aryl group, include bis(dihydrocarbylaminoalkyl)ketones such as 1,7-bis(methylethylamino)-4-heptanone and 1,3-bis(diphenylamino)-2-propanone; 4-(dihydrocarbylamino)benzophenones such as 4-(dimethylamino)benzophenone, 4-(diethylamino)benzophenone, 4-(di-t-butylamino)benzophenone and 4-(diphenylamino)benzophenone; and 4,4'-bis(dihydrocarbylamino)benzophenones such as 4,4'-bis(dimethylamino)benzophenone, 4,4'-bis(diethylamino)benzophenone and 4,4'-bis(diphenylamino)benzophenone. Of these, the compound represented by formula (6-3) may be 1,7-bis(methylethylamino)-4-heptanone, 4-(dimethylamino)benzophenone, 4-(diethylamino)benzophenone, 4,4'-bis(dimethylamino)benzophenone or 4,4'-bis(diethylamino)benzophenone, or it may be 4-(dimethylamino)benzophenone, 4-(diethylamino)benzophenone, 4,4'-bis(dimethylamino)benzophenone or 4,4'-bis(diethylamino)benzophenone.

In formula (6-4), A may be an oxygen atom or a group represented by —NR— (where R is a hydrocarbylene group of 1 to 5 carbon atoms or a hydrogen atom), or it may be an oxygen atom or a group represented by NH—, or it may be a group represented by —NH—.

In formula (6-4), the hydrocarbylene group as $R^{67}$ may be, for example, an alkylene, alkenediyl, arylene or arylene-alkylene group. Examples of the alkylene group include methylene, ethylene, propylene, tetramethylene, pentamethylene, hexamethylene, heptamethylene, octamethylene and 2,2,4-trimethylhexane-1,6-diyl groups. Examples of the alkenediyl group include a pentane-2-ene-1,5-diyl group. Examples of the arylene group include phenylene, naphthylene and biphenylene groups. Examples of the arylene-alkylene group include phenylene-alkylene, naphthylene-alkylene and biphenylene-alkylene groups.

$R^{64}$ in formula (6-4) may be a hydrocarbyl group of 1 to 10 carbon atoms, it may be an alkenyl group of 2 to 5 carbon atoms, it may be a vinyl or isopropenyl group, or it may be a vinyl group.

$R^{67}$ in formula (6-4) may be a hydrocarbylene group of 1 to 10 carbon atoms, it may be an alkylene group of 1 to 6 carbon atoms, it may be an ethylene or propylene group, or it may be a propylene group.

$R^{61}$ and $R^{62}$ in formula (6-4) may each independently be a hydrocarbyl group of 1 to 10 carbon atoms, or a hydrocarbylene group of 3 to 10 carbon atoms or a hydrocarbylene group of 3 to 10 carbon atoms having a nitrogen atom formed by bonding of $R^{61}$ to $R^{62}$. $R^{61}$ and $R^{62}$ may each independently be an alkyl group of 1 to 10 carbon atoms or an aryl group of 6 to 10 carbon atoms, or an alkylene group of 3 to 10 carbon atoms, a group represented by —CH=N—CH=CH—, a group represented by —CH=N—CH$_2$—CH$_2$— or a group represented by —(CH$_2$)$_2$—O—(CH$_2$)$_2$— formed by bonding of $R^{61}$ to $R^{62}$. $R^{61}$ and $R^{62}$ may each independently be an alkyl group of 1 to 6 carbon atoms, or an alkylene group of 3 to 6 carbon atoms, a group represented by —CH=N—CH=CH— or a group represented by —CH=N—CH$_2$—CH$_2$— formed by bonding of $R^{61}$ to $R^{62}$. $R^{61}$ and $R^{62}$ may each independently be a methyl group or an ethyl group, or a tetramethylene group, a hexamethylene group or the group represented by —CH=N—CH=CH— formed by bonding of $R^{61}$ to $R^{62}$.

Examples of the compound represented by formula (6-4) wherein A is an oxygen atom include:

2-(dihydrocarbylamino)ethyl acrylates such as 2-(dimethylamino)ethyl acrylate and 2-(diethylamino)ethyl acrylate; 3-(dihydrocarbylamino)propyl acrylates such as 3-(dimethylamino)propyl acrylate; 2-(dihydrocarbylamino)ethyl methacrylates such as 2-(dimethylamino)ethyl methacrylate and 2-(diethylamino)ethyl methacrylate; and 3-(dihydrocarbylamino)propyl methacrylates such as 3-(dimethylamino)propyl methacrylate. Of these, the compound represented by formula (6-4) may be selected from among 2-(dimethylamino)ethyl acrylate, 3-(dimethylamino)propyl acrylate, 2-(dimethylamino)ethyl methacrylate and 3-(dimethylamino)propyl methacrylate, or it may be selected from among 2-(dimethylamino)ethyl acrylate and 3-(dimethylamino)propyl acrylate.

Examples of the compound represented by formula (6-4) wherein A is —NR$^{65}$— (where R$^{65}$ is a hydrocarbylene group or a hydrogen atom) include N-(2-dihydrocarbylaminoethyl)acrylamides such as N-(2-dimethylaminoethyl)acrylamide and N-(2-diethylaminoethyl)acrylamide; N-(3-dihydrocarbylaminopropyl)acrylamides such as N-(3-dimethylaminopropyl)acrylamide and N-(3-diethylaminopropyl)acrylamide; N-(4-dihydrocarbylaminobutyl)acrylamides such as N-(4-dimethylaminobutyl)acrylamide and N-(4-diethylaminobutyl)acrylamide; N-(2-dihydrocarbylaminoethyl)methacrylamides such as N-(2-dimethylaminoethyl)methacrylamide and N-(2-diethylaminoethyl)methacrylamide; N-(3-dihydrocarbylaminopropyl)methacrylamides such as N-(3-dimethylaminopropyl)methacrylamide and N-(3-diethylaminopropyl)methacrylamide; and N-(4-dihydrocarbylaminobutyl)methacrylamides such as N-(4-dimethylaminobutyl)methacrylamide and N-(4-diethylaminobutyl)methacrylamide. Of these, a compound represented by formula (6-4) may be selected from among N-(2-dimethylaminoethyl)acrylamide, N-(3-dimethylaminopropyl)acrylamide and N-(4-dimethylaminobutyl)acrylamide, or it may be selected from among N-(2-dimethylaminoethyl)acrylamide and N-(3-dimethylaminopropyl)acrylamide.

Examples of the compounds containing a nitrogen atom, that may be added to the polymerization solution, also include compounds represented by the following formula (7).

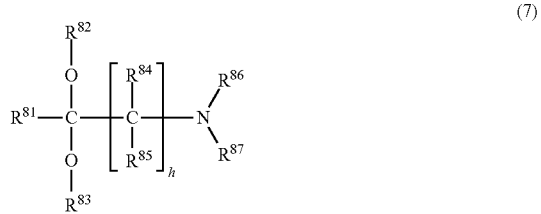

(7)

In formula (7), $R^{81}$ represents a hydrogen atom, a hydrocarbyl group or a hydrocarbyloxy group, and $R^{82}$ and $R^{83}$ each independently represent a hydrocarbyl group. h is an integer of 0 to 10, and $R^{84}$ and $R^{85}$ each independently represent a hydrogen atom or a hydrocarbyl group. When h is 2 or greater, the multiple $R^{84}$ groups may be the same or different, and the multiple $R^{85}$ groups may be the same or different. $R^{86}$ and $R^{87}$ each independently represent an optionally substituted hydrocarbyl group or trihydrocarbylsilyl group, or a hydrocarbylene group formed by bonding of $R^{86}$ to $R^{87}$, and optionally having at least one atom selected from the group consisting of a silicon atom, a nitrogen atom and an oxygen atom.

The hydrocarbyl group as $R^{81}$, $R^{82}$, $R^{83}$, $R^{84}$ or $R^{85}$ may be, for example, an alkyl, alkenyl, alkynyl, aryl or aralkyl group. Examples of the alkyl group include methyl, ethyl, n-propyl, isopropyl, n-butyl, sec-butyl, tert-butyl, n-pentyl, n-hexyl, n-octyl, n-dodecyl, cyclopentyl and cyclohexyl groups. Examples of the alkenyl group include vinyl, allyl, 1-propenyl and isopropenyl groups. Examples of the alkynyl group include ethynyl and 2-propynyl groups. Examples of the aryl group include phenyl, ethylphenyl, tolyl and xylyl groups. Examples of the aralkyl group include a benzyl group.

The hydrocarbyloxy group as $R^{81}$ may be an alkoxy or aryloxy group, for example. Examples of the alkoxy group include methoxy, ethoxy, n-propoxy, isopropoxy, n-butoxy, sec-butoxy, tert-butoxy, pentyloxy, hexyloxy, heptyloxy and octyloxy groups. Examples of the aryloxy group include phenoxy and benzyloxy groups.

The hydrocarbyl group as $R^{81}$ may be a hydrocarbyl group of 1 to 4 carbon atoms, or it may be an alkyl group of 1 to 4 carbon atoms, or it may be a methyl or ethyl group. The hydrocarbyloxy group may be a hydrocarbyloxy group of 1 to 4 carbon atoms, or it may be an alkoxy group of 1 to 4 carbon atoms, or it may be a methoxy or ethoxy group. $R^{81}$ may be a hydrogen atom.

The hydrocarbyl group as $R^{82}$ or $R^{83}$ may be a hydrocarbyl group of 1 to 4 carbon atoms, or it may be an alkyl group of 1 to 4 carbon atoms, or it may be a methyl or ethyl group. $R^{82}$ and $R^{83}$ may be the same group, or they may be different groups.

In formula (7), h may be an integer of no greater than 3, or it may be 0.

The hydrocarbyl group as $R^{84}$ or $R^{85}$ may be a hydrocarbyl group of 1 to 4 carbon atoms, or it may be an alkyl group of 1 to 4 carbon atoms, or it may be a methyl or ethyl group.

The optionally substituted hydrocarbyl group as $R^{86}$ or $R^{87}$ is a hydrocarbyl group, or a substituted hydrocarbyl group.

Examples of the hydrocarbyl group include alkyl, alkenyl, alkynyl, aryl and aralkyl groups. Examples of the alkyl group include methyl, ethyl, n-propyl, isopropyl, n-butyl, sec-butyl, tert-butyl, n-pentyl, n-hexyl, n-octyl, n-dodecyl, cyclopentyl and cyclohexyl groups. Examples of the alkenyl group include vinyl, allyl, 1-propenyl and isopropenyl groups. Examples of the alkynyl group include ethynyl and 2-propynyl groups. Examples of the aryl group include phenyl, ethylphenyl, tolyl and xylyl groups. Examples of the aralkyl group include a benzyl group. The hydrocarbyl group as $R^{86}$ or $R^{87}$ may be a hydrocarbyl group of 1 to 4 carbon atoms.

Examples of the substituted hydrocarbyl group include hydrocarbyl groups substituted with a substituted amino group, and hydrocarbyl groups substituted with a hydrocarbyloxy group.

Examples of the hydrocarbyl group substituted with a substituted amino group include (dialkylamino)alkyl groups such as dimethylaminomethyl, 2-(dimethylamino)ethyl, 2-(diethylamino)ethyl, 3-(dimethylamino)propyl and 3-(diethylamino)propyl groups; (dialkylamino)aryl groups such as 4-(dimethylamino)phenyl, 3-(dimethylamino)phenyl, 4-(diethylamino)phenyl and 3-(diethylamino)phenyl groups; (dialkylamino)alkylaryl groups such as 4-(dimethylamino)methylphenyl and 4-[2-(dimethylamino)ethyl]phenyl groups; alkyl groups substituted with a cycloamino group, such as 3-(1-pyrrolidinyl)propyl, 3-(1-piperidinyl)propyl and 3-(1-imidazolyl)propyl groups; aryl groups substituted with a cycloamino group, such as 4-(1-pyrrolidinyl)phenyl, 4-(1-piperidinyl)phenyl and 4-(1-imidazolyl)phenyl groups; and alkylaryl groups substituted with a cycloamino group, such as 4-[2-(1-pyrrolidinyl)ethyl]phenyl, 4-[2-(1-piperidinyl)ethyl]phenyl and 4-[2-(1-imidazolyl)ethyl]phenyl groups.

Examples of the hydrocarbyl group substituted with a hydrocarbyloxy group include alkoxyalkyl groups such as methoxymethyl, methoxyethyl and ethoxymethyl groups.

The optionally substituted hydrocarbyl group as $R^{86}$ or $R^{87}$ may be a hydrocarbyl group, or it may be a hydrocarbyl group of 1 to 4 carbon atoms, or it may be an alkyl group of 1 to 4 carbon atoms, or it may be a methyl or ethyl group.

The trihydrocarbylsilyl group as $R^{86}$ or $R^{87}$ may be a trialkylsilyl group such as trimethylsilyl, triethylsilyl, tripropylsilyl, triisopropylsilyl, tributylsilyl, tripentylsilyl, trihexylsilyl and tert-butyl-dimethylsilyl groups. $R^{86}$ and $R^{87}$ may be trimethylsilyl groups.

The hydrocarbylene group formed by bonding of $R^{86}$ to $R^{87}$ and optionally having at least one atom selected from the group consisting of a silicon atom, a nitrogen atom and an oxygen atom is a hydrocarbylene group, or a hydrocarbylene group having at least one atom selected from the group consisting of a silicon atom, a nitrogen atom and an oxygen atom.

Examples of the hydrocarbylene group include alkylene, alkenediyl, arylene and arylene-alkylene groups. Examples of the alkylene group include methylene, ethylene, propylene, tetramethylene, pentamethylene, hexamethylene, heptamethylene, octamethylene and 2,2,4-trimethylhexane-1,6-diyl groups. Examples of the alkenediyl group include a pentane-2-ene-1,5-diyl group. Examples of the arylene group include phenylene, naphthylene and biphenylene groups. Examples of the arylene-alkylene group include phenylene-alkylene, naphthylene-alkylene and biphenylene-alkylene groups. The hydrocarbylene group formed by bonding of $R^{86}$ to $R^{87}$ may be an alkylene group, or an alkylene group of 4 to 7 carbon atoms.

Examples of the hydrocarbylene group having at least one atom selected from the group consisting of a silicon atom, a nitrogen atom and an oxygen atom include a group represented by —Si(CH$_3$)$_2$—CH$_2$—CH$_2$—Si(CH$_3$)$_2$—, a group represented by —CH═N—CH═CH—, a group represented by —CH═N—CH$_2$—CH$_2$— and a group represented by —CH$_2$—CH$_2$—O—CH$_2$—CH$_2$—.

The hydrocarbylene group formed by bonding of $R^{86}$ to $R^{87}$ and optionally having at least one atom selected from the group consisting of a silicon atom, a nitrogen atom and an oxygen atom may be a hydrocarbylene group, or it may be an alkylene group of 4 to 7 carbon atoms, or it may be a tetramethylene, pentamethylene or hexamethylene group.

Examples of the compound represented by formula (7) include N,N-dialkylformamide dialkyl acetals such as N,N-dimethylformamidedimethylacetal, N,N-diethylformamidedimethylacetal, N,N-dimethylformamidediethylacetal and N,N-diethylformamidediethylacetal; and N,N-dialkylacetamidedialkylacetals such as N,N-dimethylacetamidedimethylacetal, N,N-diethylacetamidedimethylacetal, N,N-dimethylacetamidediethylacetal and N,N-diethylacetamidediethylacetal.

The compound represented by formula (7) may be selected from among N,N-dimethylformamidedimethylacetal, N,N-diethylformamidedimethylacetal, N,N-dimethylformamidediethylacetal, N,N-diethylformamidediethylacetal, N,N-dimethylacetamidedimethylacetal and N,N-diethylacetamidedimethylacetal, or it may be selected from among N,N-dimethylformamidedimethylacetal, N,N-diethylformamidedimethylacetal, N,N-dimethylformamidediethylacetal and N,N-dimethylformamidediethylacetal and N,N-diethylformamidediethylacetal.

The compound containing a nitrogen atom and a silicon atom, which may be added to the polymerization solution, may be a compound represented by the following formula (8).

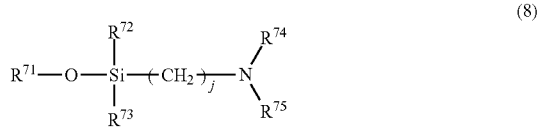

In formula (8), $R^{71}$ represents a hydrocarbyl group, $R^{72}$ and $R^{73}$ each independently represent a hydrocarbyl group or hydrocarbyloxy group, $R^{74}$ represents an optionally substituted hydrocarbyl or a trihydrocarbylsilyl group, $R^{75}$ represents an optionally substituted hydrocarbyl or a trihydrocarbylsilyl group, $R^{74}$ and $R^{75}$ may be a hydrocarbylene group formed by bonding of $R^{74}$ to $R^{75}$, and optionally having at least one atom selected from the group consisting of a silicon atom, a nitrogen atom and an oxygen atom, and j is an integer of 1 to 5.

In formula (8), the optionally substituted hydrocarbyl group for $R^{74}$ and $R^{75}$ include hydrocarbyl groups and substituted hydrocarbyl groups.

Examples of the hydrocarbyl group in the optionally substituted hydrocarbyl group as $R^{74}$ or $R^{75}$, and the hydrocarbyl group as $R^{71}$, $R^{72}$ and $R^{73}$, include alkyl, alkenyl, alkynyl, aryl and aralkyl groups. Examples of the alkyl group include methyl, ethyl, n-propyl, isopropyl, n-butyl, sec-butyl, tert-butyl, n-pentyl, n-hexyl, n-octyl, n-dodecyl, cyclopentyl and cyclohexyl groups. Examples of the alkenyl group include vinyl, allyl, 1-propenyl and isopropenyl groups. Examples of the alkynyl group include ethynyl and 2-propynyl groups. Examples of the aryl group include phenyl, ethylphenyl, tolyl and xylyl groups. Examples of the aralkyl group include a benzyl group. The hydrocarbyl group as $R^{74}$ or $R^{75}$ may be an alkyl group, or it may be a methyl or ethyl group. Examples of the substituted hydrocarbyl group as $R^{74}$ or $R^{75}$ include oxacycloalkyl groups such as oxiranyl and tetrahydrofuranyl groups. The substituted hydrocarbyl group as $R^{74}$ or $R^{75}$ may be a tetrahydrofuranyl group.

Throughout the present specification, an oxacycloalkyl group is a group wherein one CH$_2$ of a cycloalkyl group has been replaced by an oxygen atom.

The hydrocarbyloxy group as $R^{72}$ or $R^{73}$ may be an alkoxy or aryloxy group, for example. Examples of the alkoxy group include methoxy, ethoxy, n-propoxy, isopropoxy, n-butoxy, sec-butoxy, tert-butoxy, pentyloxy, hexyloxy, heptyloxy and octyloxy groups. Examples of the aryloxy group include phenoxy and benzyloxy groups. The hydrocarbyloxy group as $R^{72}$ or $R^{73}$ may be an alkoxy group, or it may be a methoxy or ethoxy group.

The trihydrocarbylsilyl group as $R^{74}$ or $R^{75}$ may be, for example, a trialkylsilyl group such as trimethylsilyl, triethylsilyl, tripropylsilyl, triisopropylsilyl, tributylsilyl, tripentylsilyl, trihexylsilyl and tert-butyl-dimethylsilyl groups. The trihydrocarbylsilyl group as $R^{74}$ or $R^{75}$ may be a trimethylsilyl group.

The hydrocarbylene group optionally having at least one atom selected from the group consisting of a silicon atom, a nitrogen atom and an oxygen atom, as $R^{74}$ or $R^{75}$, includes hydrocarbylene groups, and hydrocarbylene groups having at least one atom selected from the group consisting of a silicon atom, a nitrogen atom and an oxygen atom. Examples of the hydrocarbylene group include alkylene, alkenediyl, arylene and arylene-alkylene groups. Examples of the alkylene group include methylene, ethylene, propylene, tetramethylene, pentamethylene, hexamethylene, heptamethylene, octamethylene and 2,2,4-trimethylhexane-1,6-diyl groups. Examples of the alkenediyl group include a pentane-2-ene-1,5-diyl group. Examples of the arylene group include phenylene, naphthylene and biphenylene groups. Examples of the arylene-alkylene group include phenylene-alkylene, naphthylene-alkylene and biphenylene-alkylene groups. The hydrocarbylene group as $R^{74}$ or $R^{75}$ may be an alkylene group of 4 to 7 carbon atoms, or it may be a pentamethylene or a hexamethylene group. Examples of the hydrocarbylene group having at least one kind of atom selected from the atom group consisting of a silicon atom, a nitrogen atom and an oxygen atom include a group represented by —Si(CH$_3$)$_2$—CH$_2$—CH$_2$—Si(CH$_3$)$_2$—, a group represented by —CH═N—CH═CH—, a group represented by —CH═N—CH$_2$—CH$_2$— and a group represented by —CH$_2$—CH$_2$—O—CH$_2$—CH$_2$—.

$R^{71}$ in formula (8) may be an alkyl group of 1 to 4 carbon atoms, or it may be a methyl or ethyl group.

$R^{72}$ and $R^{73}$ in formula (8) may each independently be a hydrocarbyloxy group, or they may each independently be an alkoxy group of 1 to 4 carbon atoms, or they may each independently be a methoxy or ethoxy group.

$R^{74}$ and $R^{75}$ in formula (8) may each independently be a hydrocarbyl group, or they may each independently be an alkyl group of 1 to 4 carbon atoms, or they may each independently be a methyl or ethyl group.

In formula (8), j may be an integer of 2 to 4.

Examples of the compounds represented by formula (8) include [(dialkylamino)alkyl]alkoxysilane compounds such as [3-(dimethylamino)propyl]triethoxysilane, [3-(dimethylamino)propyl]trimethoxysilane, [3-(diethylamino)propyl]triethoxysilane, [3-(diethylamino)propyl]trimethoxysilane, [3-(dimethylamino)propyl]methyldiethoxysilane, [2-(dimethylamino)ethyl]triethoxysilane and [2-(dimethylamino)ethyl]trimethoxysilane; cyclic aminoalkylalkoxysilane compounds such as (1-hexamethyleneiminomethyl)trimethoxysilane, [3-(1-hexamethyleneimino)propyl]triethoxysilane, N-(3-triethoxysilylpropyl)-4,5-dihydroimidazole and N-(3-trimethoxysilylpropyl)-4,5-imidazole; {[di(tetrahydrofuranyl)amino]alkyl}alkoxysilane compounds such as {3-[di(tetrahydrofuranyl)amino]propyl}trimethoxysilane and {3-[di(tetrahydrofuranyl)amino]propyl}triethoxysilane; and [bis(trialkylsilyl)aminoalkyl]alkylalkoxysilane compounds such as {3-[bis(trimethylsilyl)amino]propyl}methyldimethoxysilane and {3-[bis(trimethylsilyl)amino]propyl}methyldiethoxysilane.

Of these, the compound represented by formula (8) may be selected from among [3-(dimethylamino)propyl]triethoxysilane, [3-(dimethylamino)propyl]trimethoxysilane, [3-(diethylamino)propyl]triethoxysilane, [3-(diethylamino)propyl]trimethoxysilane, {3-[bis(trimethylsilyl)amino]propyl}methyldimethoxysilane and {3-[bis(trimethylsilyl)amino]propyl}methyldiethoxysilane, or it may be selected from among [3-(dimethylamino)propyl]triethoxysilane, [3-(dimethylamino)propyl]trimethoxysilane, [3-(diethylamino)propyl]triethoxysilane and [3-(diethylamino)propyl]trimethoxysilane.

Examples of the compounds represented by formula (8) include:

tetraalkoxysilanes such as tetramethoxysilane, tetraethoxysilane and tetra-n-propoxysilane;

trialkoxyhydrocarbylsilanes such as methyltrimethoxysilane, methyltriethoxysilane, ethyltrimethoxysilane and phenyltrimethoxysilane;

trialkoxyhalosilanes such as trimethoxychlorosilane, triethoxychlorosilane and tri-n-propoxychlorosilane;

dialkoxydihydrocarbylsilanes such as dimethoxydimethylsilane, diethoxydimethylsilane and dimethoxydiethylsilane;

dialkoxydihalosilanes such as dimethoxydichlorosilane, diethoxydichlorosilane and di-n-propoxydichlorosilane;

monoalkoxytrihydrocarbylsilanes such as methoxytrimethylsilane;

monoalkoxytrihalosilanes such as methoxytrichlorosilane and ethoxytrichlorosilane;

(glycidoxyalkyl)alkylalkoxysilanes such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane and (3-glycidoxypropyl)methyldimethoxysilane;

(3,4-epoxycyclohexyl)alkylalkoxysilanes such as 2-(3,4-epoxycyclohexyl)ethyltrimethoxysilane and 2-(3,4-epoxycyclohexyl)ethyltriethoxysilane;

[(3,4-epoxycyclohexyl)alkyl]alkylalkoxysilanes such as [2-(3,4-epoxycyclohexyl)ethyl]methyldimethoxysilane; and alkoxysilylalkylsuccinic anhydrides such as 3-trimethoxysilylpropylsuccinic anhydride and 3-triethoxysilylpropylsuccinic anhydride.

The compound containing a nitrogen atom and/or a silicon atom may contain an alkoxysilyl group, a nitrogen atom and a carbonyl group. Examples of the compound containing an alkoxysilyl group, a nitrogen atom and a carbonyl group include tris[(alkoxysilyl)alkyl]isocyanurates such as tris[3-(trimethoxysilyl)propyl]isocyanurate, tris[3-(triethoxysilyl)propyl]isocyanurate, tris[3-(tripropoxysilyl)propyl] isocyanurate and tris[3-(tributoxysilyl)propyl]isocyanurate. The compound containing an alkoxysilyl group, a nitrogen atom and a carbonyl group may be a tris[3-(trialkoxysilyl)propyl]isocyanurate, or it may be a tris[3-(trialkoxysilyl)propyl]isocyanurate wherein the alkoxy group has 1 to 4 carbon atoms, or it may be tris[3-(trimethoxysilyl)propyl]isocyanurate.

The amount of the compound containing a nitrogen atom and/or a silicon atom added to the polymerization solution may be 0.01 mol or greater and 1.00 mol or lower, or 0.02 mol or greater and 0.99 mol or lower, per 1 mol of the alkali metal in the alkali metal polymerization initiator, from the viewpoint of fuel efficiency of the modified conjugated diene polymer composition after vulcanization.

A coupling agent may also be added to the polymerization solution that includes the conjugated diene compound, or the conjugated diene polymer having a site with living activity, obtained by polymerization of the conjugated diene compound and the aromatic vinyl compound. Coupling agents include a compound represented by the following formula (10).

$$R^{100}{}_a M^1 L_{4-a} \qquad (10)$$

In formula (10), $R^{100}$ represents an alkyl, alkenyl, cycloalkenyl or aryl group, $M^1$ represents a silicon atom or a tin atom, L represents a halogen atom or a hydrocarbyloxy group, and a is an integer of 0 to 2.

The coupling agent represented by formula (10) include silicon tetrachloride, methyltrichlorosilane, dimethyldichlorosilane, tin tetrachloride, methyltrichlorotin, dimethyldichlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane and diethoxydiethylsilane.

The amount of the coupling agent added may be 0.03 mol or greater, or 0.05 mol or greater, to 1 mol of the alkali metal in the alkali metal polymerization initiator, from the viewpoint of easier kneading of the modified conjugated diene polymer that is produced. The amount of the coupling agent added may also be 0.4 mol or lower, or 0.3 mol or lower, to 1 mol of the alkali metal in the alkali metal polymerization initiator, from the viewpoint of fuel efficiency of the modified conjugated diene polymer composition after vulcanization.

The conjugated diene polymer having a site with living activity may be reacted with the compound represented by formula (1), and the modified conjugated diene polymer may be extracted from the resulting solution in which the modified conjugated diene polymer is dissolved by, for example, (a) a method of adding a coagulant to the solution containing the modified conjugated diene polymer or (b) a method of adding steam to a solution containing the modified conjugated diene polymer. The extracted modified conjugated diene polymer may be dried by a common dryer, such as a hand dryer or extrusion dryer.

Before extracting the polymer from a mixed solution in which the generated modified conjugated diene polymer is dissolved, the mixed solution may be treated with an alcohol such as methanol, isopropyl alcohol or 1-butanol. Treatment with an alcohol may be carried out by adding a suitable amount of the alcohol to the mixed solution.

The Mooney viscosity ($ML_{1+4}$) of the modified conjugated diene polymer may be 10 or greater, or 20 or greater, from the viewpoint of the tensile break strength of the modified conjugated diene polymer composition. The Mooney viscosity ($ML_{1+4}$) of the modified conjugated diene polymer may also be 200 or lower, or 150 or lower, from the viewpoint of workability of the modified conjugated diene polymer composition. The Mooney viscosity ($ML_{1+4}$) of the modified conjugated diene polymer is measured at 100° C., according to JIS K6300(1994).

The vinyl group content of the modified conjugated diene polymer may be 80 mol % or lower, or 70 mol % or lower, where 100 mol % is the content of the structural unit derived from a conjugated diene, from the viewpoint of fuel efficiency of the modified conjugated diene polymer composition after vulcanization. From the viewpoint of the wet grip properties of the modified conjugated diene polymer composition after vulcanization, the vinyl group content may be 10 mol % or greater, 15 mol % or greater, 20 mol % or greater, or 40 mol % or greater. The vinyl group content of the modified conjugated diene polymer may be determined by infrared spectroscopic analysis, based on the absorption intensity near 910 $cm^{-1}$ which is the absorption peak for vinyl groups.

The modified conjugated diene polymer composition according to an embodiment contains the aforementioned modified conjugated diene polymer, and a reinforcing agent.

Examples of the reinforcing agent include silica, calcium silicate, aluminum silicate and carbon black. Two or more different types of these may also be used in combination.

Silicas include dry silica (silicic anhydride), wet silica (hydrous silicic acid), colloidal silica and precipitated silica. Two or more different types of these may also be used in combination.

The BET specific surface area of silica may be 50 $m^2/g$ or greater and 250 $m^2/g$ or lower. The BET specific surface area is measured according to ASTM D1993-03.

The silica used may be a commercial product such as ULTRASIL® VN3-G, trade name of Degussa, VN3, AQ, ER and RS-150, trade names of Tosoh Silica Corp., and Zeosil® 1115 MP and 1165 MP, trade names of Rhodia Co.

Examples of the carbon black include furnace black, acetylene black, thermal black, channel black and graphite. Carbon blacks include channel carbon black such as EPC, MPC and CC; furnace carbon black such as SAF, ISAF, HAF, MAF, FEF, SRF, GPF, APF, FF, CF, SCF and ECF; thermal carbon black such as FT and MT, and acetylene carbon black. Two or more different types of these may also be used in combination.

The nitrogen adsorption specific surface area of the carbon black may be 5 $m^2/g$ or greater and 200 $m^2/g$ or lower. The dibutyl phthalate (DBP) absorption of the carbon black may be 5 ml/100 g or greater and 300 ml/100 g or lower. The nitrogen adsorption specific surface area is measured according to ASTM D4820-93. The DBP absorption is measured according to ASTM D2414-93.

The carbon black used may be a commercial product such as DIABLACK® N339, trade name of Mitsubishi Chemical Corp., SEAST 6, SEAST 7HM and SEAST KH, trade names of Tokai Carbon Co., Ltd., and CK 3 and Special Black 4A, trade names of Degussa.

The content of the reinforcing agent in the modified conjugated diene polymer composition may be 10 parts by mass or greater, 20 parts by mass or greater, or 30 parts by mass or greater with respect to 100 parts by mass of the modified conjugated diene polymer, from the viewpoint of the wear resistance and mechanical strength of the modified conjugated diene polymer composition after vulcanization. From the viewpoint of the reinforcing property, the reinforcing agent content may be 150 parts by mass or lower, 120 parts by mass or lower, or 100 parts by mass or lower.

The modified conjugated diene polymer composition may also contain another polymer, and additives in addition to the reinforcing agent.

Examples of the other polymers include styrene-butadiene copolymer rubber, polybutadiene rubber, butadiene-isoprene copolymer rubber, butyl rubber, natural rubber, ethylene-propylene copolymer and ethylene-octene copolymer. Two or more kinds of such other polymers may also be used in combination.

The content of the modified conjugated diene polymer in the modified conjugated diene polymer composition may be 10 mass % or greater, or 20 mass % or greater, with respect to 100 mass % as the total amount of the polymer component in the modified conjugated diene polymer composition, from the viewpoint of fuel efficiency of the modified conjugated diene polymer composition after vulcanization. The phrase "total amount of the polymer component" refers to the total amount of the modified conjugated diene polymer of this embodiment and other polymers.

Examples of the additives other than the reinforcing agent include a vulcanizing agent such as sulfur; a vulcanization accelerator such as thiazole-based vulcanization accelerators, thiuram-based vulcanization accelerators, sulfenamide-based vulcanization accelerators and guanidine-based vulcanization accelerators; a vulcanizing activator such as stearic acid and zinc oxide; an organic peroxide such as dicumyl peroxide and di-tertiary butyl peroxide; a reinforcing agent such as silica and carbon black; fillers such as calcium carbonate, talc, alumina, clay, aluminum hydroxide and mica; a silane coupling agent; an extender oil; a processing aid; an age inhibitor; and a lubricants.

The sulfur of the vulcanizing agent may be powdered sulfur, precipitated sulfur, colloidal sulfur, insoluble sulfur or highly dispersed sulfur. The sulfur content may be 0.1 part by mass or greater and 15 parts by mass or lower, 0.3 part by mass or greater and 10 parts by mass or lower, or 0.5 part by mass or greater and 5 parts by mass or lower, with respect to 100 parts by mass as the total amount of the polymer component. The content of the vulcanizing agent other than sulfur may generally be adjusted within a similar range.

The vulcanization accelerator include thiazole-based vulcanization accelerators such as 2-mercaptobenzothiazole, dibenzothiazyldisulfide and N-cyclohexyl-2-benzothiazyl sulfenamide; thiuram-based vulcanization accelerators such as tetramethylthiuram monosulfide and tetramethylthiuram disulfide; sulfenamide-based vulcanization accelerators such as N-cyclohexyl-2-benzothiazole sulfenamide, N-tert-butyl-2-benzothiazole sulfenamide, N-oxymethylene-2-benzothiazole sulfenamide, N-oxyethylene-2-benzothiazole sulfenamide and N,N'-diisopropyl-2-benzothiazole sulfenamide; and guanidine-based vulcanization accelerators such as diphenylguanidine, diortho-tolylguanidine and ortho-tolylbiguanidine. The vulcanization accelerator content may be 0.1 part by mass or greater and 5 parts by mass or lower, or 0.2 part by mass or greater and 3 parts by mass or lower, with respect to 100 parts by mass as the total amount of the polymer component.

Examples of the silane coupling agent include vinyltrichlorsilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide and γ-trimethoxysilylpropylbenzothiazyl tetrasulfide. One or more types of these may be used. As the silane coupling agent there may be used commercial products such as Si69® and Si75®, trade names of Degussa.

Examples of the extender oil include aromatic-based mineral oils (viscosity gravity constant (V.G.C.) value: 0.900 or greater and 1.049 or lower), naphthene-based mineral oils (V.G.C. value: 0.850 or greater and 0.899 or lower) and paraffinic mineral oils (V.G.C. value: 0.790 or greater and 0.849 or lower). The polycyclic aromatic content of the extender oil may be less than 3 mass %, or less than 1 mass %. The polycyclic aromatic content is measured according to Institute of Petroleum in Britain method 346/92. The aromatic compound content (CA) of the extender oil may be 20 mass % or greater. One or more of such extender oils are generally used.

The method for producing the modified conjugated diene polymer composition may be, for example, a method in which the modified conjugated diene polymer, reinforcing agent, and other polymers and additives other than the reinforcing agent as necessary are kneaded with a known mixer such as a roll and Banbury mixer.

The kneading temperature for mixing of the additives other than the vulcanizing agent and vulcanization accelerator is typically 50° C. or higher and 200° C. or lower, and it may be 80° C. or higher and 190° C. or lower. The kneading time is typically 30 seconds or longer and 30 minutes or shorter, and it may be 1 minute or longer and 30 minutes or shorter. The kneading temperature for mixing of the vulcanizing agent and/or vulcanization accelerator is typically 100° C. or lower, and it may be a room temperature or higher and 80° C. or lower.

Vulcanizing treatment such as press vulcanization may be carried out for the modified conjugated diene polymer composition containing the vulcanizing agent and/or vulcanization accelerator. The temperature for vulcanizing treatment is typically 120° C. or higher and 200° C. or lower, and it may be 140° C. or higher and 180° C. or lower. The vulcanizing treatment time is typically from 10 minutes to 120 minutes, and it may be from 20 minutes to 80 minutes.

Since the modified conjugated diene polymer composition has excellent wet grip properties and wear resistance, it can be suitably used for formation of tires. A tire includes the modified conjugated diene polymer composition, or a vulcanizate produced by vulcanizing it.

EXAMPLES

The methods of evaluating the physical properties were as follows.
1. Mooney Viscosity (ML$_1$+4)
The Mooney viscosity of the polymer was measured at 100° C. according to JIS K6300(1994).
2. Vinyl Group Content of Polymer (Units: Mol %)
The vinyl group content of the polymer was determined by the absorption intensity obtained by infrared spectroscopic analysis, based on the absorption intensity near 910 cm$^1$, which is the absorption peak for vinyl groups.
3. Content of Structural Units Derived from Styrene (Units: Mass %)
The content of monomer units derived from styrene in the polymer was determined from the refractive index, according to JIS K6383(1995).
4. Introduction Rate of Compound Represented by Formula (1)
The mass spectrum of the polymerization solution was obtained upon completion of the polymerization reaction. The amount of unreacted compound represented by formula (1) in the polymerization solution was calculated from the peak intensity of the peak derived from the compound represented by formula (1), and the results were used to determine the proportion of the amount of the compound represented by formula (1) introduced into the modified conjugated diene polymer with respect to the amount of the compound represented by formula (1) that was used.
5. Wear Resistance
A ring-shaped vulcanized sheet was provided as a test strip for a wear resistance test. Using an Akron abrasion tester (Ueshima Seisakusho Co., Ltd.), the abrasion loss of the test strip was measured from 500 rotations to 1500 rotations, under conditions with a temperature of 23° C., a slip angle of 25°, a load of 10 pounds and a test strip rotational speed of 300 rpm. The abrasion loss of the test strip of each example was indexed with 100 as the abrasion loss of the test strip of Comparative Example 1. Smaller values indicate more excellent wear resistance.
6. Wet Grip Properties
A 1 mm- or 2 mm-wide, 40 mm-long test strip punched from a sheet-like vulcanized sheet was provided for a wet grip property test. The loss tangent (tan δ/0° C.) of the test strip at a temperature of 0° C. was measured with a viscoelasticity meter (product of Ueshima Seisakusho Co., Ltd.), under conditions with an initial strain of 10%, an amplitude of 2.5% and a frequency of 10 Hz. The loss tangent of the test strip of each example was indexed with 100 as the loss tangent of the test strip of Comparative Example 1. Larger values indicate more excellent wet grip properties.

Example 1

A stirrer-mounted stainless steel polymerization reactor was washed and dried, and then the gas in the interior of the polymerization reactor was exchanged with dry nitrogen. Next, 10.2 kg of industrial hexane, 608 g of 1,3-butadiene, 192 g of styrene, 6.1 ml of tetrahydrofuran and 4.0 ml of ethyleneglycol diethyl ether were added to the polymerization reactor.

An n-hexane solution of n-butyllithium (12.13 mmol n-butyllithium content) was added into the polymerization reactor and polymerization reaction was initiated.

The polymerization reaction was conducted for 3 hours. During the polymerization reaction, the temperature in the polymerization reactor was adjusted to 65° C., the solution in the polymerization reactor was stirred at a stirring speed of 130 rpm, and 912 g of 1,3-butadiene and 288 g of styrene were continuously supplied into the polymerization reactor.

Next, while keeping the temperature in the polymerization reactor at 65° C., the solution in the polymerization reactor was stirred at a stirring speed of 130 rpm, 12.13 mmol of 2-(bis(diethylamino)methylsilyl)-1-(dimethoxymethylsilyl)ethane was added, and stirring was continued for 15 minutes.

After adding 10 ml of a hexane solution containing 0.8 ml of methanol into the polymerization reactor, the polymerization solution was stirred for 5 minutes.

After then adding 8.0 g of 2-tert-butyl-6-(3-tert-butyl-2-hydroxy-5-methylbenzyl)-4-methylphenyl acrylate (product of Sumitomo Chemical Co., Ltd., trade name: SUMIRIZER® GM) and 4.0 g of pentaerythrityltetrakis(3-lauryl thiopropionate) (product of Sumitomo Chemical Co., Ltd., trade name: SUMIRIZER® TP-D) into the polymerization reactor, the mixture was further stirred to obtain a polymerization solution including a modified conjugated diene polymer. The solvent was evaporated off from the obtained polymerization solution at ordinary temperature for 24 hours, and the residue was dried under reduced pressure at 55° C. for 12 hours to obtain a modified conjugated diene polymer. The evaluation results for the modified conjugated diene polymer are shown in Table 1.

In a Laboplastomil there were kneaded 100 parts by mass of the obtained modified conjugated diene polymer, 78.4 parts by mass of silica (product of Degussa, trade name: ULTRASIL® VN3-G), 6.4 parts by mass of a silane coupling agent (product of Degussa, trade name: Si69®), 6.4 parts by mass of carbon black (product of Mitsubishi Chemical Corp., trade name: DIABLACK® N339), 47.6 parts by mass of an extender oil (product of Japan Energy Corp., trade name: JOMO process NC-140), 1.5 parts by mass of an age inhibitor (product of Sumitomo Chemical Co., Ltd., trade name: ANTIGEN® 3C), 1.5 parts by mass of wax (product of Ouchi Shinko Chemical Industrial Co., Ltd., trade name: SUNNOC N), and 2 parts by mass of stearic acid, to prepare a modified conjugated diene polymer composition.

To the resulting modified conjugated diene polymer composition there were added 2 parts by mass of zinc oxide, 1 part by mass of a vulcanization accelerator (product of Sumitomo Chemical Co., Ltd., trade name: SOXINOL® CZ), 1 part by mass of a vulcanization accelerator (product of Sumitomo Chemical Co., Ltd., trade name: SOXINOL® D) and 1.4 parts by mass of sulfur, and the composition was molded into a sheet with a 6-inch roll. The sheet was heated at 160° C. for 55 minutes for vulcanization to prepare a vulcanized sheet. The results of evaluating the physical properties of the vulcanized sheet are shown in Table 1.

Example 2

A stirrer-mounted stainless steel polymerization reactor was washed and dried, and then the gas in the interior of the polymerization reactor was exchanged with dry nitrogen. Next, 10.2 kg of industrial hexane, 608 g of 1,3-butadiene, 192 g of styrene, 6.1 ml of tetrahydrofuran and 4.0 ml of ethyleneglycol diethyl ether were added to the polymerization reactor.

An n-hexane solution of n-butyllithium (12.13 mmol n-butyllithium content) was added into the polymerization reactor and polymerization reaction was initiated.

The polymerization reaction was conducted for 3 hours. During the polymerization reaction, the temperature in the polymerization reactor was adjusted to 65° C., the solution in the polymerization reactor was stirred at a stirring speed of 130 rpm, and 912 g of 1,3-butadiene and 288 g of styrene were continuously supplied into the polymerization reactor.

Next, while keeping the polymerization reactor temperature at 65° C., the solution in the polymerization reactor was stirred at a stirring speed of 130 rpm, 6.07 mmol of 2-(bis(diethylamino)methylsilyl)-1-(dimethoxymethylsilyl)ethane was added, and stirring was continued for 15 minutes.

After adding 10 ml of a hexane solution containing 0.8 ml of methanol into the polymerization reactor, the polymerization solution was stirred for 5 minutes.

After then adding 8.0 g of 2-tert-butyl-6-(3-tert-butyl-2-hydroxy-5-methylbenzyl)-4-methylphenyl acrylate (product of Sumitomo Chemical Co., Ltd., trade name: SUMIRIZER® GM) and 4.0 g of pentaerythrityltetrakis(3-lauryl thiopropionate) (product of Sumitomo Chemical Co., Ltd., trade name: SUMIRIZER® TP-D) into the polymerization reactor, the mixture was further stirred to obtain a polymerization solution including a modified conjugated diene polymer. The solvent was evaporated off from the obtained polymerization solution at ordinary temperature for 24 hours, and the residue was dried under reduced pressure at 55° C. for 12 hours to obtain a modified conjugated diene polymer. The evaluation results for the modified conjugated diene polymer are shown in Table 1.

In a Laboplastomil there were kneaded 100 parts by mass of the obtained modified conjugated diene polymer, 78.4 parts by mass of silica (product of Degussa, trade name: ULTRASIL® VN3-G), 6.4 parts by mass of a silane coupling agent (product of Degussa, trade name: Si69®), 6.4 parts by mass of carbon black (product of Mitsubishi Chemical Corp., trade name: DIABLACK® N339), 47.6 parts by mass of an extender oil (product of Japan Energy Corp., trade name: JOMO process NC-140), 1.5 parts by mass of an age inhibitor (product of Sumitomo Chemical Co., Ltd., trade name: ANTIGEN® 3C), 1.5 parts by mass of wax (product of Ouchi Shinko Chemical Industrial Co., Ltd., trade name: SUNNOC N), and 2 parts by mass of stearic acid, to prepare a modified conjugated diene polymer composition.

To the resulting modified conjugated diene polymer composition there were further added 2 parts by mass of zinc oxide, 1 part by mass of a vulcanization accelerator (product of Sumitomo Chemical Co., Ltd., trade name: SOXINOL® CZ), 1 part by mass of another vulcanization accelerator (product of Sumitomo Chemical Co., Ltd., trade name: SOXINOL® D) and 1.4 parts by mass of sulfur, and the composition was molded into a sheet with a 6-inch roll. The sheet was heated at 160° C. for 55 minutes for vulcanization to prepare a vulcanized sheet. The results of evaluating the physical properties of the vulcanized sheet are shown in Table 1.

Example 3

A stirrer-mounted stainless steel polymerization reactor was washed and dried, and the gas in the interior of the polymerization reactor was exchanged with dry nitrogen. Next, 10.2 kg of industrial hexane, 608 g of 1,3-butadiene, 192 g of styrene, 6.1 ml of tetrahydrofuran and 4.0 ml of ethyleneglycol diethyl ether were added to the polymerization reactor.

An n-hexane solution of n-butyllithium (12.13 mmol n-butyllithium content) was added into the polymerization reactor and polymerization reaction was initiated.

The polymerization reaction was conducted for 3 hours. During the polymerization reaction, the temperature in the polymerization reactor was adjusted to 65° C., the solution in the polymerization reactor was stirred at a stirring speed of 130 rpm, and 912 g of 1,3-butadiene and 288 g of styrene were continuously supplied into the polymerization reactor.

Next, while keeping the polymerization reactor temperature at 65° C., the solution in the polymerization reactor was stirred at a stirring speed of 130 rpm, 12.13 mmol of 2-(bis(diethylamino)methylsilyl)-1-(trimethoxysilyl)ethane was added, and stirring was continued for 15 minutes.

After adding 10 ml of a hexane solution containing 0.8 ml of methanol into the polymerization reactor, the polymer solution was stirred for 5 minutes.

After then adding 8.0 g of 2-tert-butyl-6-(3-tert-butyl-2-hydroxy-5-methylbenzyl)-4-methylphenyl acrylate (product of Sumitomo Chemical Co., Ltd., trade name: SUMIRIZER® GM) and 4.0 g of pentaerythrityltetrakis(3-lauryl thiopropionate) (product of Sumitomo Chemical Co., Ltd., trade name: SUMIRIZER® TP-D) into the polymerization reactor, the mixture was further stirred to obtain a polymerization solution including a modified conjugated diene polymer. The solvent was evaporated off from the obtained polymerization solution at ordinary temperature for 24 hours, and the residue was dried under reduced pressure at 55° C. for 12 hours to obtain a modified conjugated diene polymer. The evaluation results for the modified conjugated diene polymer are shown in Table 1.

In a Laboplastomil there were kneaded 100 parts by mass of the obtained modified conjugated diene polymer, 78.4 parts by mass of silica (product of Degussa, trade name: ULTRASIL® VN3-G), 6.4 parts by mass of a silane coupling agent (product of Degussa, trade name: Si69®), 6.4 parts by mass of carbon black (product of Mitsubishi Chemical Corp., trade name: DIABLACK® N339), 47.6 parts by mass of an extender oil (product of Japan Energy Corp., trade name: JOMO process NC-140), 1.5 parts by mass of an age inhibitor (product of Sumitomo Chemical Co., Ltd., trade name: ANTIGEN® 3C), 1.5 parts by mass of wax (product of Ouchi Shinko Chemical Industrial Co., Ltd., trade name: SUNNOC N), and 2 parts by mass of stearic acid, to prepare a modified conjugated diene polymer composition.

To the resulting modified conjugated diene polymer composition there were further added 2 parts by mass of zinc oxide, 1 part by mass of a vulcanization accelerator (product of Sumitomo Chemical Co., Ltd., trade name: SOXINOL® CZ), 1 part by mass of another vulcanization accelerator (product of Sumitomo Chemical Co., Ltd., trade name: SOXINOL® D) and 1.4 parts by mass of sulfur, and the composition was molded into a sheet with a 6-inch roll. The sheet was heated at 160° C. for 55 minutes for vulcanization to prepare a vulcanized sheet. The results of evaluating the physical properties of the vulcanized sheet are shown in Table 1.

Example 4

A stirrer-mounted stainless steel polymerization reactor was washed and dried, and the gas in the interior of the polymerization reactor was exchanged with dry nitrogen. Next, 10.2 kg of industrial hexane, 608 g of 1,3-butadiene, 192 g of styrene, 6.1 ml of tetrahydrofuran and 4.0 ml of ethyleneglycol diethyl ether were added to the polymerization reactor.

An n-hexane solution of n-butyllithium (12.13 mmol n-butyllithium content) was added into the polymerization reactor and polymerization reaction was initiated.

The polymerization reaction was conducted for 3 hours. During the polymerization reaction, the temperature in the polymerization reactor was adjusted to 65° C., the solution in the polymerization reactor was stirred at a stirring speed of 130 rpm, and 912 g of 1,3-butadiene and 288 g of styrene were continuously supplied into the polymerization reactor.

Next, while keeping the polymerization reactor temperature at 65° C., the solution in the polymerization reactor was stirred at a stirring speed of 130 rpm, 6.07 mmol of 2-(bis(diethylamino)methylsilyl)-1-(trimethoxysilyl)ethane was added, and stirring was continued for 15 minutes.

After adding 10 ml of a hexane solution containing 0.8 ml of methanol into the polymerization reactor, the polymer solution was stirred for 5 minutes.

After then adding 8.0 g of 2-tert-butyl-6-(3-tert-butyl-2-hydroxy-5-methylbenzyl)-4-methylphenyl acrylate (product of Sumitomo Chemical Co., Ltd., trade name: SUMIRIZER® GM) and 4.0 g of pentaerythrityltetrakis(3-lauryl thiopropionate) (product of Sumitomo Chemical Co., Ltd., trade name: SUMIRIZER® TP-D) into the polymerization reactor, the mixture was further stirred to obtain a polymerization solution including a modified conjugated diene polymer. The solvent was evaporated off from the obtained polymerization solution at ordinary temperature for 24 hours, and the residue was dried under reduced pressure at 55° C. for 12 hours to obtain a modified conjugated diene polymer. The evaluation results for the modified conjugated diene polymer are shown in Table 1.

In a Laboplastomil there were kneaded 100 parts by mass of the obtained modified conjugated diene polymer, 78.4 parts by mass of silica (product of Degussa, trade name: ULTRASIL® VN3-G), 6.4 parts by mass of a silane coupling agent (product of Degussa, trade name: Si69®), 6.4 parts by mass of carbon black (product of Mitsubishi Chemical Corp., trade name: DIABLACK® N339), 47.6 parts by mass of an extender oil (product of Japan Energy Corp., trade name: JOMO process NC-140), 1.5 parts by mass of an age inhibitor (product of Sumitomo Chemical Co., Ltd., trade name: ANTIGEN® 3C), 1.5 parts by mass of wax (product of Ouchi Shinko Chemical Industrial Co., Ltd., trade name: SUNNOC N), and 2 parts by mass of stearic acid, to prepare a modified conjugated diene polymer composition.

To the resulting modified conjugated diene polymer composition there were further added 2 parts by mass of zinc oxide, 1 part by mass of a vulcanization accelerator (product of Sumitomo Chemical Co., Ltd., trade name: SOXINOL® CZ), 1 part by mass of another vulcanization accelerator (product of Sumitomo Chemical Co., Ltd., trade name: SOXINOL® D) and 1.4 parts by mass of sulfur, and the composition was molded into a sheet with a 6-inch roll. The sheet was heated at 160° C. for 55 minutes for vulcanization to prepare a vulcanized sheet. The results of evaluating the physical properties of the vulcanized sheet are shown in Table 1.

Comparative Example 1

A stirrer-mounted stainless steel polymerization reactor was washed and dried, and the gas in the interior of the polymerization reactor was exchanged with dry nitrogen. Next, 15.3 kg of industrial hexane, 912 g of 1,3-butadiene, 288 g of styrene, 9.1 ml of tetrahydrofuran and 6.0 ml of ethyleneglycol diethyl ether were added to the polymerization reactor.

An n-hexane solution of n-butyllithium (18.19 mmol n-butyllithium content) was added into the polymerization reactor and polymerization reaction was initiated.

The polymerization reaction was conducted for 3 hours. During the polymerization reaction, the temperature in the polymerization reactor was adjusted to 65° C., the solution in the polymerization reactor was stirred at a stirring speed of 130 rpm, and 1368 g of 1,3-butadiene and 432 g of styrene were continuously supplied into the polymerization reactor.

Next, while keeping the polymerization reactor temperature at 65° C., the solution in the polymerization reactor was stirred at a stirring speed of 130 rpm, 18.19 mmol of (3-(diethylamino)propyl)trimethoxysilane was added, and stirring was continued for 15 minutes.

After adding 15 ml of a hexane solution containing 1.2 ml of methanol into the polymerization reactor, the polymer solution was stirred for 5 minutes.

After then adding 12.0 g of 2-tert-butyl-6-(3-tert-butyl-2-hydroxy-5-methylbenzyl)-4-methylphenyl acrylate (product of Sumitomo Chemical Co., Ltd., trade name: SUMI- RIZER® GM) and 6.0 g of pentaerythrityltetrakis(3-lauryl thiopropionate) (product of Sumitomo Chemical Co., Ltd., trade name: SUMIRIZER® TP-D) into the polymerization reactor, the mixture was further stirred to obtain a polymerization solution including a polymer. The solvent was evaporated off from the obtained polymerization solution at ordinary temperature for 24 hours, and the residue was dried under reduced pressure at 55° C. for 12 hours to obtain a polymer. The evaluation results for the polymer are shown in Table 1.

In a Laboplastomil there were kneaded 100 parts by mass of the obtained polymer, 78.4 parts by mass of silica (product of Degussa, trade name: ULTRASIL® VN3-G), 6.4 parts by mass of a silane coupling agent (product of Degussa, trade name: Si69®), 6.4 parts by mass of carbon black (product of Mitsubishi Chemical Corp., trade name: DIABLACK® N339), 47.6 parts by mass of an extender oil (product of Japan Energy Corp., trade name: JOMO process NC-140), 1.5 parts by mass of an age inhibitor (product of Sumitomo Chemical Co., Ltd., trade name: ANTIGEN® 3C), 1.5 parts by mass of wax (product of Ouchi Shinko Chemical Industrial Co., Ltd., trade name: SUNNOC N), and 2 parts by mass of stearic acid, to prepare a polymer composition.

To the obtained polymer composition there were further added 2 parts by mass of zinc oxide, 1 part by mass of a vulcanization accelerator (product of Sumitomo Chemical Co., Ltd., trade name: SOXINOL® CZ), 1 part by mass of another vulcanization accelerator (product of Sumitomo Chemical Co., Ltd., trade name: SOXINOL® D) and 1.4 parts by mass of sulfur, and the composition was molded into a sheet with a 6-inch roll. The sheet was heated at 160° C. for 55 minutes for vulcanization to prepare a vulcanized sheet. The results of evaluating the physical properties of the vulcanized sheet are shown in Table 1.

Example 5

A stirrer-mounted stainless steel polymerization reactor was washed and dried, and the gas in the interior of the polymerization reactor was exchanged with dry nitrogen. Next, 10.2 kg of industrial hexane, 608 g of 1,3-butadiene, 192 g of styrene, 6.1 ml of tetrahydrofuran and 4.0 ml of ethyleneglycol diethyl ether were added to the polymerization reactor.

An n-hexane solution of n-butyllithium (12.13 mmol n-butyllithium content) was added into the polymerization reactor and polymerization reaction was initiated.

The polymerization reaction was conducted for 3 hours. During the polymerization reaction, the temperature in the polymerization reactor was adjusted to 65° C., the solution in the polymerization reactor was stirred at a stirring speed of 130 rpm, and 912 g of 1,3-butadiene and 288 g of styrene were continuously supplied into the polymerization reactor.

Next, while keeping the polymerization reactor temperature at 65° C., the solution in the polymerization reactor was stirred at a stirring speed of 130 rpm, 12.13 mmol of 3-(bis(diethylamino)methylsilyl)-1-(dimethoxymethylsilyl)propane was added, and stirring was continued for 15 minutes.

After adding 10 ml of a hexane solution containing 0.8 ml of methanol into the polymerization reactor, the polymer solution was stirred for 5 minutes.

After then adding 8.0 g of 2-tert-butyl-6-(3-tert-butyl-2-hydroxy-5-methylbenzyl)-4-methylphenyl acrylate (product of Sumitomo Chemical Co., Ltd., trade name: SUMIRIZER® GM) and 4.0 g of pentaerythrityltetrakis(3-lauryl thiopropionate) (product of Sumitomo Chemical Co., Ltd., trade name: SUMIRIZER® TP-D) into the polymerization reactor, the mixture was further stirred to obtain a polymerization solution including a modified conjugated diene polymer. The solvent was evaporated off from the obtained polymerization solution at ordinary temperature for 24 hours, and the residue was dried under reduced pressure at 55° C. for 12 hours to obtain a modified conjugated diene polymer. The evaluation results for the polymer are shown in Table 1.

TABLE 1

|  |  | Ex. 1 | Ex. 2 | Ex. 3 | Ex. 4 | Comp. Ex. 1 | Ex. 5 |
|---|---|---|---|---|---|---|---|
| Mooney viscosity |  | — | 42 | 50 | 51 | 84 | 51 | 42 |
| Styrene-derived structural unit content | mass % | 25 | 25 | 24 | 24 | 25 | 24 |
| Vinyl group content | mol % | 57 | 56 | 56 | 56 | 55 | 57 |
| Introduction rate of compound of formula (1) | % | 98 | 98 | 99 | 99 | — | 94 |
| Wear resistance (index) |  | — | 78 | 80 | 57 | 82 | 100 | — |
| Wet grip properties (tan δ/0° C. (index) |  | — | 106 | 105 | 103 | 101 | 100 | — |

The invention claimed is:

1. A modified conjugated diene polymer including a structural unit derived from a compound represented by formula (1) and a structural unit derived from a conjugated diene

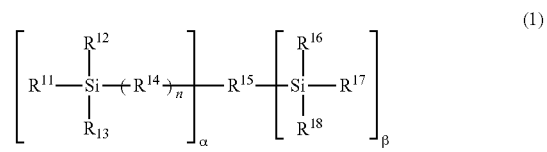

(1)

wherein in formula (1),

α and β represent integers such that 1≤α≤5, 1≤β≤5 and 2≤α+β≤6 are satisfied, n represents 0 or 1, (i) when n is 0, $R^{11}$, $R^{12}$, $R^{13}$, $R^{16}$, $R^{17}$ and $R^{18}$ each independently represent a hydrocarbyl group, substituted amino group, hydroxy group or hydrocarbyloxy group, from among $R^{11}$, $R^{12}$, $R^{13}$, $R^{16}$, $R^{17}$ and $R^{18}$, at least two are substituted amino groups and at least one is a hydroxy group or hydrocarbyloxy group, two groups selected from among $R^{11}$, $R^{12}$, $R^{13}$, $R^{16}$, $R^{17}$ and $R^{18}$ are optionally bonded either directly or indirectly at positions where a hydrogen atom has been removed from each group, $R^{15}$ represents an (α+β)-valent group resulting from removal of (α+β) hydrogen atoms from a hydrocarbon, (ii) when n is 1, $R^{11}$, $R^{12}$, $R^{13}$, $R^{16}$, $R^{17}$ and $R^{18}$ each independently represent a hydrocarbyl group, substituted amino group, hydroxy group or hydrocarbyloxy group, $R^{14}$ represents:
(a) a group resulting from removal of two hydrogen atoms from a hydrocarbon with an amino group or substituted amino group,
(b) a group resulting from removal of two hydrogen atoms from a hydrocarbon with a substituent including a heteroatom other than a nitrogen atom, or
(c) a hydrocarbylene group,
when $R^{14}$ is (a) a group resulting from removal of two hydrogen atoms from a hydrocarbon with an amino group or substituted amino group, from among $R^{11}$, $R^{12}$, $R^{13}$, $R^{16}$, $R^{17}$ and $R^{18}$, at least one is a substituted amino group and at least one is a hydroxy group or hydrocarbyloxy group,
when $R^{14}$ is (b) a group resulting from removal of two hydrogen atoms from a hydrocarbon with a substituent including a heteroatom other than a nitrogen atom, or (c) a hydrocarbylene group, from among $R^{11}$, $R^{12}$, $R^{13}$, $R^{16}$, $R^{17}$ and $R^{18}$, at least two are substituted amino groups and at least one is a hydroxy group or hydrocarbyloxy group,
at least two groups from among $R^{11}$, $R^{12}$, $R^{13}$, $R^{14}$, $R^{16}$, $R^{17}$ and $R^{18}$ are optionally bonded either directly or indirectly at positions where a hydrogen atom has been removed from each group, and
$R^{15}$ represents an $(\alpha+\beta)$-valent group resulting from removal of $(\alpha+\beta)$ hydrogen atoms from a hydrocarbon, wherein the modified conjugated diene polymer has a molecular chain which is a conjugated diene polymer including a structural unit derived from the conjugated diene, and the structural unit derived from the compound represented by formula (1) is chemically bound to one or both ends of the molecular chain of the modified conjugated diene polymer or is chemically bound as a side chain on the molecular chain of the modified conjugated diene polymer.

2. The modified conjugated diene polymer according to claim 1, wherein in formula (1), n is 0, $\alpha$ is 1, $\beta$ is 1 and $R^{15}$ is a hydrocarbylene group of 1 to 20 carbon atoms.

3. A modified conjugated diene polymer according to claim 1, wherein the compound represented by formula (1) is at least one kind of compound selected from the group consisting of 2-(bis(diethylamino)methylsilyl)-1-(dimethoxymethylsilyl)ethane and 2-(bis(diethylamino)methylsilyl)-1-(trimethoxysilyl)ethane, respectively.

4. A modified conjugated diene polymer composition containing the modified conjugated diene polymer according to claim 1 and a reinforcing agent, wherein the content of the reinforcing agent is 10 parts by mass or greater and 150 parts by mass or lower, with respect to 100 parts by mass of the modified conjugated diene polymer.

5. A tire including the modified conjugated diene polymer composition according to claim 4, or its vulcanizate.

* * * * *